(12) United States Patent
Goess-Saurau et al.

(10) Patent No.: US 11,788,651 B2
(45) Date of Patent: Oct. 17, 2023

(54) PIPE CONNECTOR

(71) Applicant: POULTON TECHNOLOGIES LIMITED, Bristol (GB)

(72) Inventors: Konrad Goess-Saurau, Wiltshire (GB); Rodney Coplestone, Wiltshire (GB)

(73) Assignee: POULTON TECHNOLOGIES LIMITED, Bristol (GB)

( * ) Notice: Subject to any disclaimer, the term of this patent is extended or adjusted under 35 U.S.C. 154(b) by 0 days.

(21) Appl. No.: 17/665,628

(22) Filed: Feb. 7, 2022

(65) Prior Publication Data

US 2022/0154857 A1    May 19, 2022

Related U.S. Application Data

(63) Continuation of application No. 16/882,920, filed on May 26, 2020, now Pat. No. 11,493,158, which is a
(Continued)

(30) Foreign Application Priority Data

Sep. 10, 2013   (GB) ........................... 1316077
Oct. 31, 2013   (GB) ........................... 1319292
(Continued)

(51) Int. Cl.
*F16L 21/00*   (2006.01)
*F16L 19/075*   (2006.01)
(Continued)

(52) U.S. Cl.
CPC ........... *F16L 21/002* (2013.01); *F16J 15/021* (2013.01); *F16L 19/075* (2013.01); *F16L 21/035* (2013.01);
(Continued)

(58) Field of Classification Search
CPC ......... Y10T 137/9029; Y10T 137/0447; F16L 2201/00; F16L 37/148; F16L 21/08;
(Continued)

(56) References Cited

U.S. PATENT DOCUMENTS

| 317,408 | A | * | 5/1885 | Moeser | ................. | F16L 23/165 |
| | | | | | | 285/341 |
| RE14,077 | E | * | 2/1916 | Hall | ........................... | 285/382.7 |
| 1,851,143 | A | * | 3/1932 | Wilson | .................... | F16L 19/12 |
| | | | | | | 403/278 |

(Continued)

FOREIGN PATENT DOCUMENTS

| AU | 69265/74 | 10/1974 |
| AU | 474254 | 10/1974 |

(Continued)

OTHER PUBLICATIONS

Australian Examination Report No. 1 dated Oct. 23, 2019 issued in Australian Patent Application No. 2019201581, 4 pp.
(Continued)

*Primary Examiner* — Eugene G Byrd
(74) *Attorney, Agent, or Firm* — NIXON & VANDERHYE P.C.

(57) ABSTRACT

An apparatus for connecting two pipes in fluid communication includes a connector body having opposing open ends, with each open end configured for receiving a free end of a pipe, and a mechanical interlock arrangement for preventing or limiting axial movement of the connector body relative to a free end of a pipe when the free end of the pipe is received in an open end of the connector body. A mechanical seal arrangement provides a metal-to-metal seal between a pipe inserted into one of the open ends and the connector body.

20 Claims, 29 Drawing Sheets

Related U.S. Application Data continuation of application No. 16/361,633, filed on Mar. 22, 2019, now Pat. No. 10,753,519, which is a continuation of application No. 14/432,955, filed as application No. PCT/GB2014/052748 on Sep. 10, 2014, now Pat. No. 10,253,908.

(30) Foreign Application Priority Data

| | | |
|---|---|---|
| Mar. 28, 2014 | (GB) | 1405658 |
| May 7, 2014 | (GB) | 1408085 |

(51) Int. Cl.

| | |
|---|---|
| *F16L 21/04* | (2006.01) |
| *F16L 37/14* | (2006.01) |
| *F16J 15/02* | (2006.01) |
| *F16L 21/035* | (2006.01) |
| *F16L 21/08* | (2006.01) |

(52) U.S. Cl.
CPC ............ *F16L 21/04* (2013.01); *F16L 21/08* (2013.01); *F16L 37/148* (2013.01); *F16L 2201/00* (2013.01); *Y10T 137/0447* (2015.04); *Y10T 137/9029* (2015.04)

(58) Field of Classification Search
CPC ....... F16L 21/04; F16L 21/035; F16L 19/075; F16L 21/002; F16J 15/021
See application file for complete search history.

(56) References Cited

U.S. PATENT DOCUMENTS

| | | | | |
|---|---|---|---|---|
| 1,957,605 A * | 5/1934 | Lamont | F16L 19/065 | 285/341 |
| 1,984,806 A * | 12/1934 | Pfefferle | F16L 21/04 | 277/618 |
| 2,114,771 A * | 4/1938 | Turner | F16L 19/075 | 285/341 |
| 2,215,659 A * | 9/1940 | Bacon | F16L 21/022 | 285/344 |
| 2,226,304 A * | 12/1940 | Dillon | F16L 17/10 | 279/157 |
| 2,474,319 A * | 6/1949 | Muller | F16L 19/086 | 285/356 |
| 2,507,261 A * | 5/1950 | Mercier | F16L 25/01 | 285/341 |
| 2,738,995 A * | 3/1956 | Risley | F16L 21/04 | 285/356 |
| 2,768,846 A | 10/1956 | Gratzmuller | | |
| 2,772,100 A * | 11/1956 | Kreissig | F16L 19/075 | 285/357 |
| 2,779,610 A * | 1/1957 | Risley | F16L 19/075 | D23/262 |
| 3,259,406 A * | 7/1966 | Kish | F16L 19/065 | 277/618 |
| 3,510,140 A * | 5/1970 | Hermann | F16L 21/035 | 285/344 |
| 3,578,805 A * | 5/1971 | Dutton | F16L 19/075 | 285/55 |
| 3,653,688 A * | 4/1972 | Sakakibara | F16L 17/025 | 403/303 |
| 3,669,475 A * | 6/1972 | Luckenbill | F16L 21/04 | 285/348 |
| 3,746,376 A * | 7/1973 | Gold | F16L 19/04 | 285/382.7 |
| 3,887,221 A * | 6/1975 | Young | F16L 31/00 | 285/911 |
| 3,992,568 A * | 11/1976 | Al | H01R 4/60 | 411/959 |
| 4,070,046 A * | 1/1978 | Felker | F16L 21/022 | 285/348 |
| 4,162,802 A * | 7/1979 | Cox | F16L 19/10 | 285/382.7 |
| 4,298,222 A * | 11/1981 | Davies | F16L 19/103 | 285/341 |
| 4,316,053 A * | 2/1982 | Rieffle | F16L 21/04 | 285/422 |
| 4,538,841 A * | 9/1985 | Royston | F16L 25/01 | 285/382.7 |
| 5,069,490 A * | 12/1991 | Halen, Jr. | F16L 21/04 | 285/348 |
| 5,351,998 A * | 10/1994 | Behrens | F16L 19/12 | 285/341 |
| 6,056,327 A * | 5/2000 | Bouldin | F16L 19/0218 | 285/353 |
| 6,322,111 B1 * | 11/2001 | Brady | F16L 21/022 | 277/648 |
| 7,677,602 B2 * | 3/2010 | Bennett | F16L 19/10 | 285/323 |
| 10,047,887 B2 * | 8/2018 | Arstein | F16L 19/103 | |
| 10,253,908 B2 | 4/2019 | Goess-Saurau et al. | | |
| 2002/0148128 A1 * | 10/2002 | Williams | F16L 19/065 | 33/501.45 |
| 2003/0107216 A1 * | 6/2003 | Gibson | F16L 19/103 | 285/353 |
| 2004/0007874 A1 * | 1/2004 | Minami | F16L 19/075 | 285/355 |
| 2004/0090067 A1 * | 5/2004 | Pridham | F16L 19/075 | 285/382.7 |
| 2005/0035593 A1 * | 2/2005 | Auray | H02G 3/0675 | 285/137.11 |
| 2005/0035594 A1 | 2/2005 | Kiely | | |
| 2005/0040645 A1 * | 2/2005 | Jones | F16L 21/08 | 285/374 |
| 2005/0077722 A1 * | 4/2005 | Kiely | H02G 3/0675 | 285/382.7 |
| 2005/0194784 A1 | 9/2005 | Jones et al. | | |
| 2005/0253380 A1 * | 11/2005 | Gibb | F16L 21/005 | 285/111 |
| 2006/0061103 A1 * | 3/2006 | Gronquist | B29C 44/1295 | 285/419 |
| 2006/0249214 A1 * | 11/2006 | Haschka | F16L 11/122 | 138/109 |
| 2008/0157522 A1 * | 7/2008 | Freudendahl | F16L 21/04 | 285/337 |
| 2009/0322030 A1 * | 12/2009 | Pallini, Jr. | E21B 33/038 | 277/336 |
| 2010/0102554 A1 * | 4/2010 | Xu | F16L 19/103 | 285/341 |
| 2010/0140932 A1 | 6/2010 | Williams et al. | | |
| 2011/0254262 A1 | 10/2011 | Manning | | |
| 2011/0278835 A1 * | 11/2011 | Kishi | F16L 21/02 | 285/348 |
| 2013/0106103 A1 | 5/2013 | Horsfall et al. | | |
| 2019/0137017 A1 * | 5/2019 | Ishihara | F16L 23/22 | |

FOREIGN PATENT DOCUMENTS

| | | | |
|---|---|---|---|
| CN | 102187140 | 9/2011 | |
| CN | 102301172 | 12/2011 | |
| CN | 102797920 | 11/2012 | |
| CN | 102822585 | 12/2012 | |
| CN | 104114926 | 10/2014 | |
| DE | 863881 | 1/1953 | |
| DE | 1938256 | 4/1970 | |
| DE | 92 12 228 U1 | 11/1992 | |
| EP | 2 392 845 A1 | 12/2011 | |
| GB | 364375 | 1/1932 | |
| GB | 456914 | 11/1936 | |
| GB | 493460 | 10/1938 | |
| GB | 2464672 | 4/2010 | |
| GB | 2447275 | 1/2012 | |
| GB | 2501988 | 11/2013 | |
| JP | 9-112761 | 5/1997 | |
| JP | 10-176775 | 6/1998 | |
| JP | 10176775 A * | 6/1998 | F16L 21/04 |
| JP | 10-238673 | 9/1998 | |
| JP | 11-141766 | 5/1999 | |

(56) References Cited

FOREIGN PATENT DOCUMENTS

| JP | 11-210951 | 8/1999 | | |
|----|-----------|--------|---|---|
| JP | 11210951 A | * | 8/1999 | ............ F16L 21/04 |
| JP | 2000-201423 | 7/2000 | | |
| JP | 2001-108170 | 4/2001 | | |
| JP | 2002-512670 | 4/2002 | | |
| JP | 2003-232474 | 8/2003 | | |
| JP | 2005-3064 | 1/2005 | | |
| JP | 2005-36946 | 2/2005 | | |
| JP | 2007-113742 | 5/2007 | | |
| JP | 2007-162741 | 6/2007 | | |
| JP | 2008-89132 | 4/2008 | | |
| JP | 2008-196608 | 8/2008 | | |
| JP | 4730079 | 4/2011 | | |
| JP | 2011-99515 | 5/2011 | | |
| JP | 2012-506013 | 3/2012 | | |
| WO | WO 98/10212 | 3/1998 | | |
| WO | WO 99/24752 | 5/1999 | | |
| WO | WO 2010/046627 | 4/2010 | | |
| WO | WO 2013/108931 | 7/2013 | | |

OTHER PUBLICATIONS

Australian Examination Report No. 1 dated Oct. 14, 2020 issued in Australian Patent Application No. 2020200986, 6 pp.
Brazilian Office Action dated Sep. 19, 2019 issued in Brazilian Patent Application No. BR112016005178-5 and English translation, 6 pp.
Canadian Office Action dated Jan. 18, 2021 issued in Canadian Patent Application No. 2,923,960, 6 pp.
Chinese Office Action dated Mar. 1, 2017 issued in Chinese Patent Application No. 201480054254.X and English translation, 16 pp.
Chinese Office Action dated Oct. 19, 2017 issued in Chinese Patent Application No. 201480054254.X and English translation, 16 pp.
Chinese Office Action dated Aug. 3, 2020 issued in Chinese Patent Application No. 201910274914.X, 12 pp.
English Translation of Japanese Office Action dated Aug. 7, 2018 issued in Japanese Patent Application No. 2016-542368, 5 pp.
European Search Report dated Feb. 12, 2020 issued in European Patent Application No. 19200177.4, 16 pp.
Great Britain Search Report dated May 2, 2014 issued in Great Britain Patent Application No. 1319292.7, 4 pp.
Indian Office Action dated Oct. 9, 2019 issued in Indian Patent Application No. 201617007570 and English translation, 6 pp.
Indian Office Action dated Sep. 18, 2020 issued in Indian Patent Application No. 202018002204, 6 pp.
International Search Report dated Dec. 2, 2014 issued in PCT International Patent Application No. PCT/GB2014/052748, 6 pp.
Japanese Office Action dated Feb. 6, 2020 issued in Japanese Patent Application No. 2019-075418 and English translation, 6 pp.
Japanese Office Action dated Mar. 16, 2021 issued in Japanese Patent Application No. 2019-075418 and English Translation, 7 pp.
Malaysian Substantive Examination Adverse Report dated Jan. 6, 2020 issued in Malaysian Patent Application No. PI 2016700542, 2 pp.
United Arab Emirates (UAE) Examination Report dated Nov. 14, 2019 issued in UAE Patent Application No. 0278/2016, 7 pp.
Chinese Office Action dated Jan. 25, 2022 issued in Chinese Patent Application No. 202011339722.1 and English translation, 21 pp.
Japanese Office Action dated Sep. 27, 2022 issued in Japanese Patent Application No. 2021-157617 and English translation, 5 pp.
Canadian Office Action dated Feb. 21, 2023 issued in Canadian Patent Application No. 3,142,764, 6 pp.

* cited by examiner

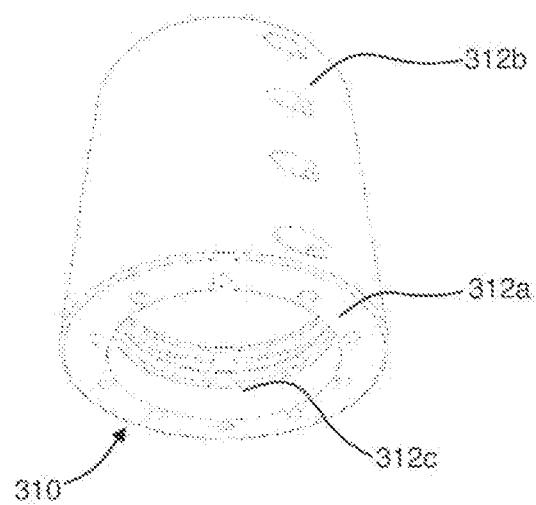
FIG. 17A
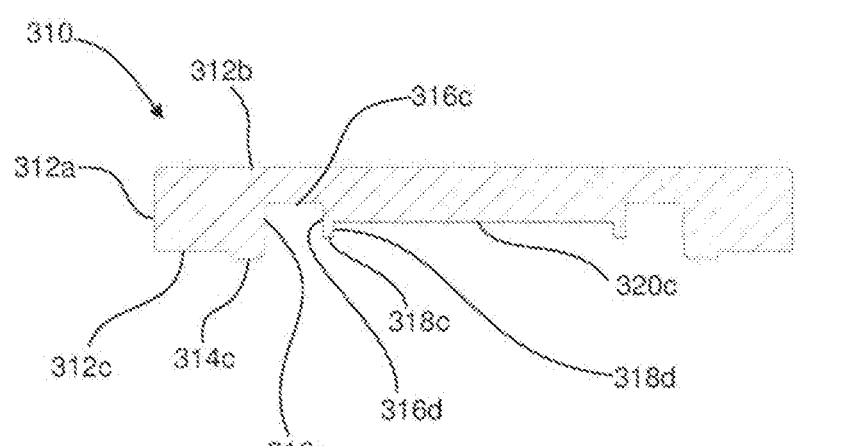
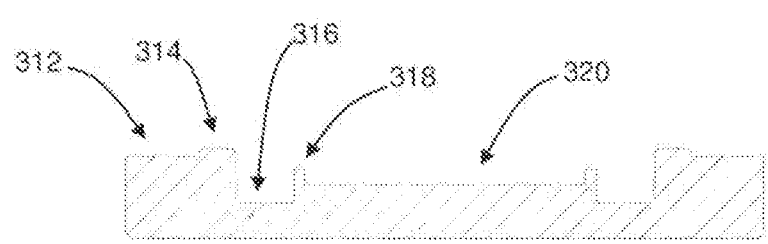
FIG. 17B

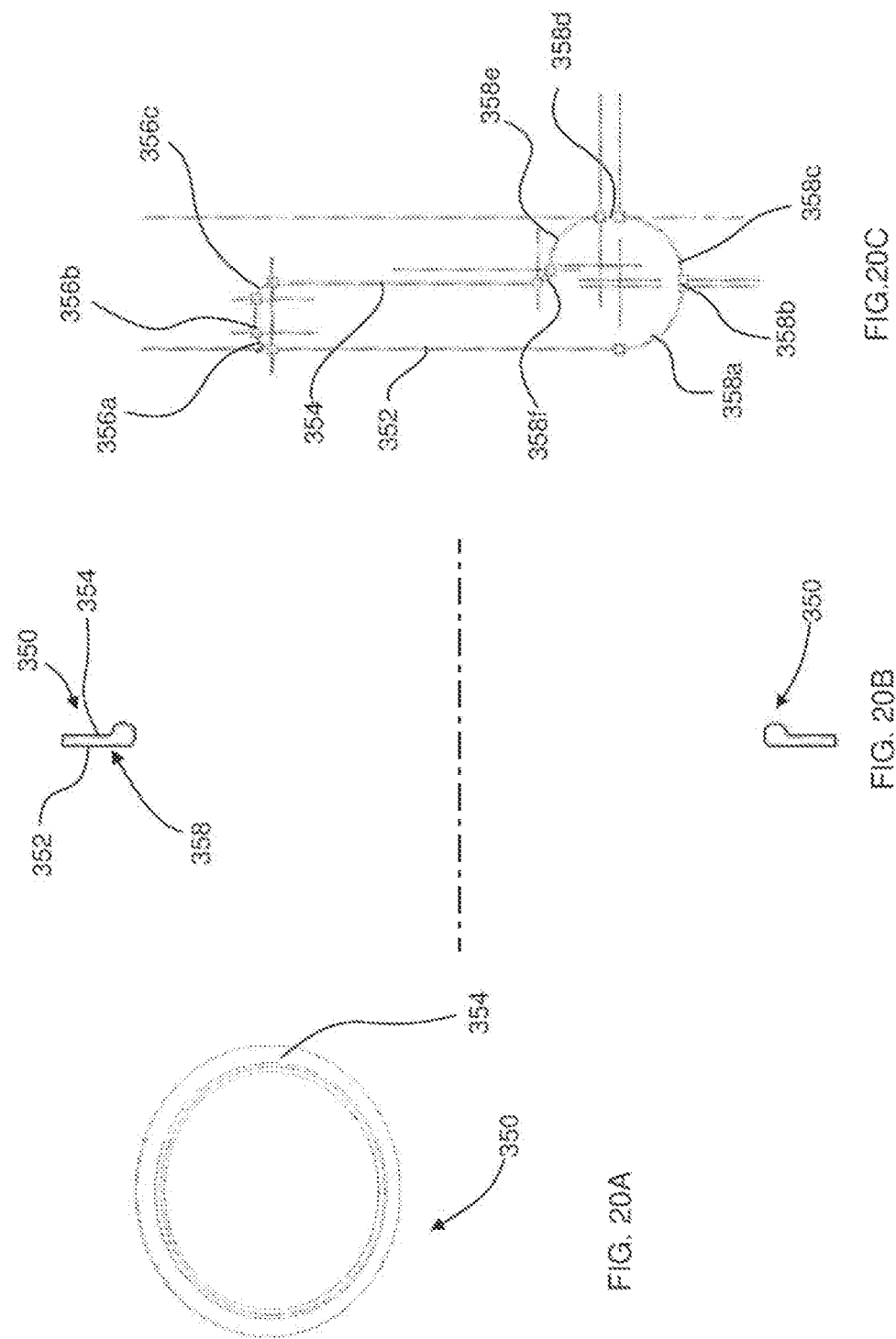

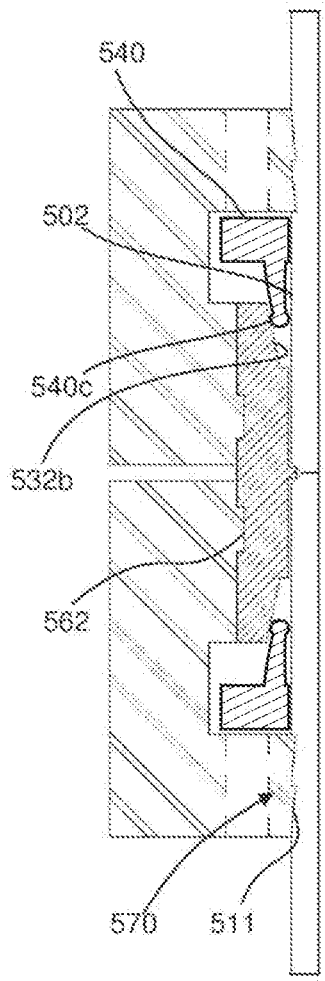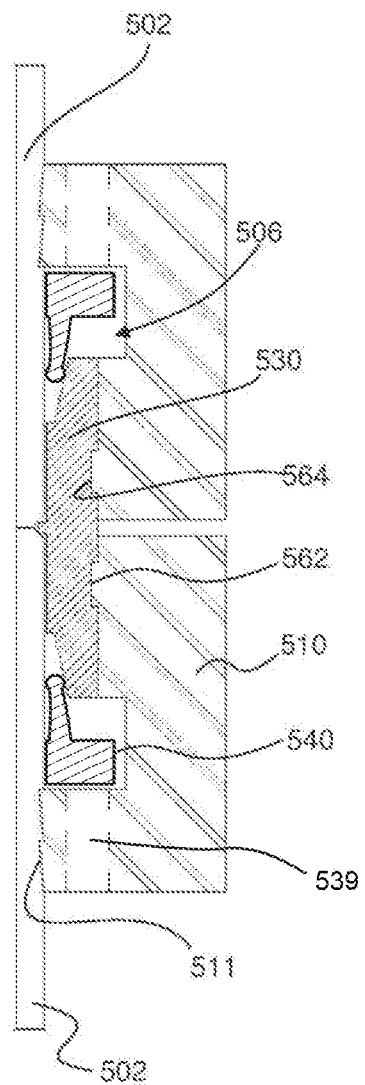
FIG. 25

PIPE CONNECTOR

CROSS-REFERENCES TO RELATED APPLICATIONS

This application is a continuation of U.S. patent application Ser. No. 16/882,920, filed May 26, 2020, which is a continuation of U.S. patent application Ser. No. 16/361,633, filed Mar. 22, 2019, now U.S. Pat. No. 10,753,519, issued Aug. 25, 2020, which is a continuation of U.S. patent application Ser. No. 14/432,955, filed Apr. 1, 2015, now U.S. Pat. No. 10,253,908, issued Apr. 9, 2019, which is the U.S. national phase of PCT International Patent Application No. PCT/GB2014/052748, filed Sep. 10, 2014, which claims the benefit of Great Britain Patent Application No. 1316077.5, filed Sep. 10, 2013, Great Britain Patent Application No. 1319292.7, filed Oct. 31, 2013, Great Britain Patent Application No. 1405658.4, filed Mar. 28, 2014, Great Britain Patent Application No. 1408085.7 filed May 7, 2014, and U.S. patent application Ser. No. 14/303,164, filed Jun. 12, 2014, the entire contents of each of which are hereby incorporated by reference in this application.

STATEMENT REGARDING FEDERALLY SPONSORED RESEARCH OR DEVELOPMENT (NOT APPLICABLE)

FIELD OF THE INVENTION

The present invention relates to an apparatus, an assembly and a method for connecting two pipes in fluid communication, e.g. two oil pipes.

BACKGROUND OF THE INVENTION

There is an ongoing requirement within the oil industry to provide cost efficient and consistent methods of connecting oil pipes together in a way that minimises the risk of oil leakage.

Typically, flanged joints are used. These have a number of disadvantages. For example, flanged joints are vulnerable and can be compromised by uneven bolt tightening. Moreover, rubber seals are generally used within these joints, and often fail due to thermal degradation, as well as being at significant risk of damage and subsequent failure from bad practice when joints are assembled on site.

Flanged joints also require welding. This is time consuming during assembly, increasing down time for pipe repairs as well as presenting a fire risk. Further, amidst recent proposals for better offshore pipeline regulation and more refined safety rules covering repairs, there is a requirement to employ qualified welders to perform any repairs, which is a considerable added expense. The installation of flange joints also requires very high precision, requiring highly skilled labour for assembly, further increasing the cost of repairs.

BRIEF SUMMARY OF THE INVENTION

A first aspect of the invention provides an apparatus for connecting two pipes in fluid communication, the apparatus comprising a connector body having opposing open ends, each open end configured for receiving a free end of a pipe; a mechanical interlock arrangement, for preventing or limiting axial movement of the connector body relative to a free end of a pipe; and a mechanical seal arrangement for providing a metal-to-metal seal between a pipe inserted into one of said open ends and the connector body.

In normal use, the assembly serves to provide the two pipes in fluid communication and prevents undesired separation of the pipes. The mechanical interlock arrangement advantageously locks all the components together to limit axial movement, without the use of flanges or the components having to be welded together. The metal-to-metal seal is provided to act between an internal surface of the connector body and a pipe received in an open end of the connector body. It will be understood that a seal is required between each pipe and the connector body. The metal-on-metal arrangement provides a very strong seal, suitable for withstanding high pressures and high temperatures. A metal seal also has a high resistance to corrosion, increasing the life of the seal, especially when compared to traditional seals, such as rubber or asbestos O-rings or gaskets.

In exemplary embodiments, the mechanical seal arrangement includes a metallic element configured to fit on a free end of a pipe, and to be received in one end of the connector body. In exemplary embodiments, the metallic element is specifically dimensioned to fit on a pipe to ensure the mechanical seal arrangement can create a strong seal, in combination with the connector body. In exemplary embodiments, the geometry of the metallic element ensures that the metallic element maintains concentricity with the pipe when being compressed in use.

In exemplary embodiments, the metallic element is an olive having a tapered portion comprising an angled surface, arranged to contact a corresponding angled surface of the connector body. In exemplary embodiments, the two angled surfaces have slightly different angles. In use, the olive surface abuts the connector body surface, forming a very strong seal.

In exemplary embodiments, the apparatus further includes a cap configured to fit over an open end of the connector body. In exemplary embodiments, the cap is used for applying a force to the metallic element, in order to assure a seal between a pipe and the connector body.

In exemplary embodiments, the cap is a nut, configured to receive an open end of the connector body.

In exemplary embodiments, the cap substantially covers an end of the connector body, in normal use. In exemplary embodiments, one end of the cap is configured to receive the free end of a pipe, e.g. with a very small degree of clearance.

In exemplary embodiments, the connector body comprises a stop, arranged to limit the movement of the cap in an axial direction with regards to the connector body.

In exemplary embodiments, the stop projects radially from an external surface of the connector body.

In alternative embodiments, the connector body has a planar internal surface. Advantageously, this can substantially limit, in use, the risk of the fluid within a pipe coming into contact with the mechanical lock arrangement.

In exemplary embodiments, the stop is a surface perpendicular to the longitudinal axis of the connector body.

In exemplary embodiments, the mechanical seal arrangement further comprises a resilient washer arranged for sustaining the force applied by the cap on the metallic element. In exemplary embodiments, the washer is intended to account for any variation in the force applied by the cap (e.g. a reduction in applied force as the bolts, or another appropriate method of applying force, loosen over time) to ensure that a strong seal is maintained between the mechanical seal arrangement and the connector body.

In exemplary embodiments, the washer is configured to be located between the cap and the metallic element. Advantageously, the washer protects the metallic element from damage, such as abrasion that might otherwise occur if the cap contacted the olive.

In exemplary embodiments, the connector body has a planar internal surface.

In exemplary embodiments, the mechanical interlock arrangement comprises at least one circumferential groove on an internal surface of the connector body. In such embodiments, the groove is intended for alignment with a corresponding groove on the external surface of the pipe to be inserted into the connector, in order to define a bore or channel between the connector body and the pipe, for receiving a locking element, e.g. a length of wire, in order to resist against separation of the pipe and connector body.

In exemplary embodiments, the cap has a circumferential groove on an internal surface, and the connector body has a circumferential groove on an external surface. In normal use, the groove on the cap lines up with the groove on the connector body, defining a bore or channel between the cap and the connector body, for receiving a locking element, e.g. as a length of wire, in order to resist against separation of the cap and connector body.

In alternative embodiments, the cap has a threaded portion on an internal surface at one end of the cap and the connector body has a threaded portion on an external surface. In use, the threaded portions engage one another, to enable to cap to be screwed onto the connector body and limit axial movement of the cap relative to the connector body. In exemplary embodiments, a circumferential groove is provided on an internal surface at the other end of the cap. In use, the groove on the cap lines up with a corresponding groove on a pipe received in the connector body, so as to define a bore or channel between the cap and the pipe, for receiving a locking element, e.g. as a length of wire.

In exemplary embodiments, the mechanical interlock arrangement comprises at least one length of wire, e.g. for locating in a bore or channel formed between the connector body and a pipe received therein, or between a bore or channel formed between the cap and a pipe received in the connector body.

In exemplary embodiments, the mechanical interlock arrangement comprises at least one length of wire, for locating in at least one of the grooves on the internal surface of the cap, and a threaded arrangement between the cap and connector body for preventing or limiting axial movement of the connector body relative to the cap.

In exemplary embodiments, the mechanical interlock arrangement comprises a groove on an outside surface of at least one pipe and a projection on an internal surface of the connector body, configured such that the projection engages with the groove to prevent or limit axial movement of the connector body relative to the pipes.

In exemplary embodiments, the mechanical interlock arrangement comprises at least one projection or barb on an internal surface of the connector body. In exemplary embodiments, the barb is circumferential. In exemplary embodiments, the barb is tapered.

In exemplary embodiments, the connector body is provided as separate first and second parts, such that they can be brought together around the pipes, in use.

In exemplary embodiments, the connector body is split along a horizontal plane to define the first and second parts.

Advantageously, installation of the apparatus is simplified, as the first and second parts of the connector body can be brought together in a transverse direction around the remaining components of the apparatus.

In exemplary embodiments, the first and second parts of the connector body comprise bores extending in a direction perpendicular to the horizontal plane, configured to accept connecting components, in order to couple the first and second parts of the connector body to each other.

In exemplary embodiments, each bore comprises an annular surface with a plane parallel to the horizontal plane, configured to be engaged by a connecting component in use.

In exemplary embodiments, the connector body is provided as separate ends or parts, such that a first part is on or around a first pipe free end and a second part is on or around a second pipe free end. In exemplary embodiments, the connector body is split along a vertical plane.

A second aspect of the invention provides a pipe assembly connecting two pipes in fluid communication, the assembly comprising two pipes, each having a free end; a connector body having opposing open ends, each open end being dimensioned to receive the free end of one of the pipes; and a mechanical seal arrangement located at each open end of the connector body, for providing a metal-to-metal seal between each pipe and the connector body.

In exemplary embodiments, all components can advantageously be supplied as one assembled unit. This can provide cost savings in terms of manufacture as well as transportation to site. It also greatly simplifies the installation process, as relatively little needs to be done on site to install the assembly, compared to existing methods.

In exemplary embodiments, each pipe comprises at least one circumferential groove on an outer surface, and the mechanical seal arrangement comprises at least one circumferential groove on an internal surface, such that the grooves on the pipe and the mechanical seal arrangement line up, defining at least one bore or channel within the pipe assembly.

In exemplary embodiments, wire is located within each channel to limit the movement of the mechanical seal arrangement relative to the pipe.

In exemplary embodiments, movement of the connector body relative to the mechanical seal arrangement is limited by a threaded arrangement.

In exemplary embodiments, the connector body comprises a shoulder, projecting radially inwardly from an internal surface of the connector body, arranged to limit the movement of the pipes in an axial direction with regards to the connector body.

In exemplary embodiments, the shoulder projects radially inwardly to an extent such that the internal diameter of the shoulder is substantially equal to the internal diameter of the pipes.

In exemplary embodiments, each pipe comprises at least one circumferential groove on an outer surface, and the connector body comprises a plurality of circumferential grooves on an internal surface, such that grooves on the pipe and the connector body line up, defining at least one bore or channel within the pipe assembly, for receiving in a locking element.

In exemplary embodiments, each mechanical seal arrangement comprises a metallic element configured to locate on the free end of one of said pipes, and contact the connector body, creating a seal.

In exemplary embodiments, the metallic element is an olive having a tapered portion comprising an angled surface, arranged to contact a corresponding angled surface of the connector body.

In exemplary embodiments, the first metallic element is an annular seal element for sealing a pipe joint, the seal element comprising:

a loading surface, an intermediate portion and a contact portion;

the loading surface being configured to receive an axial force and transmit the force via the intermediate portion to the contact portion, and the contact portion being configured to provide a seal between the pipe and a surrounding secondary seal element;

wherein the contact portion is configured to project radially beyond the intermediate portion and thereby provide a predetermined annular deformation region configured to conform to and seal against the secondary seal element upon application of a predetermined axial force.

In exemplary embodiments, the contact portion is configured to project radially outward beyond the intermediate portion.

In exemplary embodiments, the contact portion is configured to project radially inward beyond the intermediate portion.

In exemplary embodiments, the connector body is provided as separate ends or parts, such that a first part is on or around a first pipe free end and a second part is on or around a second pipe free end. In exemplary embodiments, the connector body is split along a vertical plane.

In exemplary embodiments, the assembly further comprises a cap arranged to locate on the free end of the pipe and apply a force to the metallic element.

In exemplary embodiments, the cap is configured to substantially cover the free end of the pipe and the metallic element.

In exemplary embodiments, the assembly further comprises a resilient washer, located between the cap and the metallic element, to assure the force applied by the cap on the metallic element in use.

In exemplary embodiments, the connector body comprises a shoulder, projecting radially inwardly from an internal surface of the connector body. Insertion of the free end of each pipe is limited by the internal shoulder, such that the connecting body can be repeatably located in the correct place relative to the pipes.

In exemplary embodiments, the internal diameter of the shoulder is substantially equal to the internal diameter of the pipes. This minimises the amount of turbulence within the fluid flow, further reducing the risk of leakage and increasing the efficiency within the pipe.

In exemplary embodiments, each pipe comprises at least one circumferential groove on an outer surface, and the connector body comprises a plurality of circumferential grooves on an internal surface, such that grooves on the pipe and the connector body line up, defining at least one channel within the pipe assembly. In exemplary embodiments, as the internal shoulder of the connecting body consistently locates the pipes in a correct position relative to the connecting body, the corresponding grooves line up, creating channels within the pipe assembly.

In alternative embodiments, an entire internal surface of the connector may be planar, with no internal shoulder.

In exemplary embodiments, an internal surface of the cap is provided with at least one groove. In exemplary embodiments, an external surface of each pipe includes at least one corresponding groove. In use, the groove on the cap aligns with the groove on the pipe, to define a bore or channel for receiving a locking element (e.g. a length of wire) for resisting axial separation of the cap and pipe. In exemplary embodiments, each groove on the pipe is provided at a location spaced from the free end of the pipe. In such embodiments, in use, when locking wires have been inserted into the channels, this greatly reduces the risk of the fluid within the pipe coming into contact with the locking wires, which is undesirable.

In those embodiments where the wire is threaded between each cap and the pipe, a threaded connection is provided between the cap and the connector body, by means of which the cap is screwed onto the connector body.

In exemplary embodiments, the mechanical interlock arrangement comprises a groove on an outside surface of at least one pipe and a projection on an internal surface of the connector body, configured such that the projection engages with the groove to prevent or limit axial movement of the connector body relative to the pipes.

In exemplary embodiments, the mechanical interlock arrangement comprises at least one projection or barb on an internal surface of the connector body. In exemplary embodiments, the barb is circumferential. In exemplary embodiments, the barb is tapered.

In exemplary embodiments, the connector body is provided as separate first and second parts, such that they can be brought together around the pipes, in use.

In exemplary embodiments, the connector body is split along a horizontal plane to define the first and second parts.

Advantageously, installation of the apparatus is simplified, as the first and second parts of the connector body can be brought together in a transverse direction around the remaining components of the apparatus.

In exemplary embodiments, the first and second parts of the connector body comprise bores extending in a direction perpendicular to the horizontal plane, configured to accept connecting components, in order to couple the first and second parts of the connector body to each other.

In exemplary embodiments, each bore comprises an annular surface with a plane parallel to the horizontal plane, configured to be engaged by a connecting component in use.

In exemplary embodiments, the connector body is provided as separate ends or parts, such that a first part is on or around a first pipe free end and a second part is on or around a second pipe free end. In exemplary embodiments, the connector body is split along a vertical plane.

A third aspect of the invention provides a method of connecting two pipes in fluid communication, the method comprising providing two pipes, each pipe having a free end; locating a metal-to-metal seal element on the free end of each pipe; and locating each free end of the pipe within a connector body, such that the connector body bridges the two pipes; wherein the metal-to-metal seal elements provide a metal-to-metal seal between a respective pipe and the connector body.

Advantageously, the method of connecting the two pipes is very simple and easily repeatable, meaning that minimal training is required to perform the method. Also, in the case of pipe repairs, downtime is greatly reduced compared to current methods, minimising the cost of any repairs. Moreover, the method avoids the need for flanges used commonly for coupling two pipes together in fluid communication.

In exemplary embodiments, the method comprises the step of providing a cap configured to locate on the free end of each pipe, wherein the cap is configured to receive an open end of the connector body and applying a force to the metallic element, in order to assure a seal between the pipe and the connector body.

In exemplary embodiments, the method also comprises the step of providing a mechanical interlock arrangement, for preventing or limiting axial movement of the connector body relative to the pipes.

In exemplary embodiments, the method further comprises forming a circumferential groove on an outside surface of at least one pipe, and lining up the circumferential groove with at least one of a plurality of circumferential grooves on an internal surface of the connector body, in order to define at least one channel.

In alternative embodiments, the method further comprises forming at least one circumferential groove on an outside surface of at least one pipe, and lining up the circumferential groove with at least one of a plurality of circumferential grooves on an internal surface of the cap, in order to define at least one channel.

In exemplary embodiments, the method further comprises threading a length of wire through the at least one channel, in order to prevent or limit axial movement of the connector body relative to the free ends of the pipes.

In those embodiments where the wire is threaded between each cap and the pipe, a threaded connection is provided between the cap and the connector body, by means of which the cap is screwed onto the connector body.

In exemplary embodiments, the mechanical interlock arrangement comprises forming a groove on an outside surface of at least one pipe and providing a projection on an internal surface of the connector body, and engaging the projection with the groove to prevent or limit axial movement of the connector body relative to the pipes.

In exemplary embodiments, the mechanical interlock arrangement comprises at least one projection or barb on an internal surface of the connector body. In exemplary embodiments, the barb is circumferential. In exemplary embodiments, the barb is tapered.

In exemplary embodiments, the method further comprises providing a resilient washer between the cap and the seal element, for applying a force to the seal element.

In exemplary embodiments, the mechanical seal arrangement also includes a threaded portion on an internal surface and the connector body includes a threaded portion on an outside surface, and the method includes engaging the threaded portions in order to prevent or limit axial movement of the connector body relative to the mechanical seal arrangement.

In exemplary embodiments, the mechanical seal arrangement also includes a circumferential groove, which defines a channel in combination with a circumferential groove on an outside surface of the connector body, and a length of wire is threaded through the channel in order to prevent or limit axial movement of the mechanical seal arrangement relative to the connector body.

A further aspect of the invention provides a coupling arrangement for connecting a pipe to a further pipe or a connector, the coupling arrangement comprising a connector body having a mechanical engagement arrangement for preventing or limiting axial movement of the connector body relative to a free end of the pipe; and a mechanical seal arrangement for providing a metal-to-metal seal between the pipe and the connector body.

In exemplary embodiments, the mechanical seal arrangement includes a first metallic element configured to fit on a free end of a pipe.

In exemplary embodiments, the first metallic element is specifically dimensioned to fit on a pipe to ensure the mechanical seal arrangement can create a strong seal, in combination with the connector body.

In exemplary embodiments, the mechanical seal arrangement further includes a second metallic element, configured to be located between the first metallic element and an internal surface of the connector body, such that the seal is created between the first and second metallic elements.

In exemplary embodiments, the first metallic element is an annular seal element for sealing a pipe joint, the seal element comprising:

a loading surface, an intermediate portion and a contact portion;

the loading surface being configured to receive an axial force and transmit the force via the intermediate portion to the contact portion, and the contact portion being configured to provide a seal between the pipe and a surrounding secondary seal element;

wherein the contact portion is configured to project radially beyond the intermediate portion and thereby provide a predetermined annular deformation region configured to conform to and seal against the secondary seal element or pipe upon application of a predetermined axial force.

In exemplary embodiments, the contact portion is configured to project radially outward beyond the intermediate portion. In exemplary embodiments, the contact portion is configured to project radially inward beyond the intermediate portion.

In exemplary embodiments, the contact portion is substantially part circular in cross-section. In exemplary embodiments, the profile of the intermediate portion is at least in part concave in cross-section. In exemplary embodiments, the intermediate portion is tapered towards the contact portion. In exemplary embodiments, the seal element is metallic.

In exemplary embodiments, the metallic element is an olive having a tapered portion comprising an angled surface, arranged to contact a corresponding angled surface of the connector body. In exemplary embodiments, the two angled surfaces have slightly different angles. In use, the olive surface abuts the connector body surface, forming a very strong seal.

In exemplary embodiments, the second metallic element is a sleeve, configured to encircle the free end of the pipe in use. In exemplary embodiments, the sleeve is configured to bridge the free ends of the pipes in use.

In exemplary embodiments the coupling arrangement further comprises a mechanism for applying a force to the first metallic element, in order to assure a seal between a pipe and the connector body.

In exemplary embodiments, the connector body comprises one or more apertures defining a plurality of channels or bores through a portion of the connector body, from a front surface of the connector body to a radial internal surface, the radial internal surface being located substantially adjacent the first metallic element in use.

In exemplary embodiments, each channel or bore comprises an internal thread such that a bolt, with a corresponding external thread, can be rotatably inserted into each channel to provide a force that acts on the first metallic element in an axial direction.

In exemplary embodiments, the mechanical engagement arrangement comprises at least one projection or barb on an internal surface of the connector body.

In exemplary embodiments, the barb is circumferential.

In exemplary embodiments, the barb is tapered.

In exemplary embodiments, the connector body is provided as separate first and second parts, such that they can be brought together around the pipe, in use.

In exemplary embodiments, the outer profile of the connector body is substantially square in cross-section.

In exemplary embodiments, the connector body is split along a horizontal plane to define the first and second parts.

In exemplary embodiments, the mechanical interlock arrangement comprises a groove on an outside surface of at least one pipe and a projection on an internal surface of the connector body, configured such that the projection engages with the groove to prevent or limit axial movement of the connector body relative to the pipes.

In exemplary embodiments, the mechanical interlock arrangement comprises at least one circumferential groove on an internal surface of the connector body. In such embodiments, the groove is intended for alignment with a corresponding groove on the external surface of the pipe to be inserted into the connector, in order to define a bore or channel between the connector body and the pipe, for receiving a locking element, e.g. a length of wire, in order to resist against separation of the pipe and connector body.

In exemplary embodiments, the mechanical interlock arrangement comprises at least one length of wire, e.g. for locating in a bore or channel formed between the connector body and a pipe received therein.

Advantageously, installation of the apparatus is simplified, as the first and second parts of the connector body can be brought together in a transverse direction around the remaining components of the apparatus.

In exemplary embodiments, the first and second parts of the connector body comprise bores extending in a direction perpendicular to the horizontal plane, configured to accept connecting components, in order to couple the first and second parts of the connector body to one another.

In exemplary embodiments, the connector body is provided as separate ends or parts, such that a first part is on or around a first pipe free end and a second part is on or around a second pipe free end. In exemplary embodiments, the connector body is split along a vertical plane.

In exemplary embodiments, each bore comprises an annular surface with a plane parallel to the horizontal plane, configured to be engaged by a connecting component in use.

A further aspect of the invention provides an annular seal element for sealing a pipe joint, the seal element comprising:

a loading surface, an intermediate portion and a contact portion;

the loading surface being configured to receive an axial force and transmit the force via the intermediate portion to the contact portion, and the contact portion being configured to provide a seal between the pipe and a surrounding secondary seal element;

wherein the contact portion is configured to project radially beyond the intermediate portion and thereby provide a predetermined annular deformation region configured to conform to and seal against the secondary seal element or pipe upon application of a predetermined axial force.

In exemplary embodiments, the contact portion is configured to project radially outward beyond the intermediate portion.

In exemplary embodiments, the contact portion is configured to project radially inward beyond the intermediate portion.

In exemplary embodiments, the contact portion is substantially part circular in cross-section.

In exemplary embodiments, the profile of the intermediate portion is at least in part concave in cross-section.

In exemplary embodiments, the intermediate portion is tapered towards the contact portion.

In exemplary embodiments, the seal element is metallic.

A further aspect of the invention provides an apparatus for connecting two pipes in fluid communication, the apparatus comprising a connector body having opposing open ends, each open end configured for receiving a free end of a pipe; a mechanical interlock arrangement, for preventing or limiting axial movement of the connector body relative to a free end of a pipe; and a mechanical seal arrangement for providing a metal-to-metal seal with the connector body.

The metal-to-metal seal is provided between an internal surface of the connector body and a pipe received in an open end of the connector body, in use. The metal on metal arrangement provides a very strong seal, suitable for withstanding high pressures and high temperatures. A metal seal also has a high resistance to corrosion, increasing the life of the seal, especially when compared to traditional seals, such as rubber or asbestos O-rings or gaskets. The mechanical interlock arrangement advantageously locks all the components together to limit axial movement, without the use of flanges or the components having to be welded together.

In exemplary embodiments, the mechanical seal arrangement includes a metallic element configured to fit on a free end of a pipe, and to be received in one end of the connector body. In exemplary embodiments, the metallic element is specifically dimensioned to fit on a pipe to ensure the mechanical seal arrangement can create a strong seal, in combination with the connector body. In exemplary embodiments, the geometry of the metallic element ensures that the metallic element maintains concentricity with the pipe when being compressed in use.

In exemplary embodiments, the metallic element is an olive having a tapered portion comprising an angled surface, arranged to contact a corresponding angled surface of the connector body. In exemplary embodiments, the two angled surfaces have slightly different angles. In use, the surfaces come into contact and the olive surface abuts the connector body surface, forming a very strong seal.

In exemplary embodiments, the first metallic element is an annular seal element for sealing a pipe joint, the seal element comprising:

a loading surface, an intermediate portion and a contact portion;

the loading surface being configured to receive an axial force and transmit the force via the intermediate portion to the contact portion, and the contact portion being configured to provide a seal between the pipe and a surrounding secondary seal element;

wherein the contact portion is configured to project radially beyond the intermediate portion and thereby provide a predetermined annular deformation region configured to conform to and seal against the secondary seal element upon application of a predetermined axial force.

In exemplary embodiments, the contact portion is configured to project radially outward beyond the intermediate portion.

In exemplary embodiments, the contact portion is configured to project radially inward beyond the intermediate portion.

In exemplary embodiments, the contact portion is substantially circular in cross-section. In exemplary embodiments, the profile of the intermediate portion is concave in cross-section. In exemplary embodiments, the intermediate portion is tapered towards the contact portion. In exemplary embodiments, the seal element is metallic.

In exemplary embodiments, the mechanical seal arrangement further includes a cap, configured for applying a force to the metallic element in use.

In exemplary embodiments, the cap is a nut, configured to receive an open end of the connector body.

In exemplary embodiments, the connector body comprises a stop, arranged to limit the movement of the nut in an axially inward direction with regards to the connector body, such that, in use, the nut substantially covers an end of the connector body.

In exemplary embodiments, the mechanical seal arrangement further comprises a resilient washer arranged for sustaining the force applied by the cap on the metallic element. In exemplary embodiments, the washer accounts for any variation in the force applied by the cap (e.g. a reduction in applied force as the bolts, or another appropriate method of applying force, loosen over time) to ensure that a strong seal is maintained between the mechanical seal arrangement and the connector body.

In exemplary embodiments, the washer is configured to be located between the cap and the metallic element. In exemplary embodiments, in use, the washer advantageously protects the metallic element from damage, such as abrasion that would occur if the tightening means contacted the olive.

In exemplary embodiments, the connector body has at least one circumferential groove on an internal surface.

In exemplary embodiments, the cap has a circumferential groove on an internal surface, and the connector body has a circumferential groove on an external surface, and the groove on the cap lines up with the groove on the connector body in use, defining a channel between the cap and the connector body.

In exemplary embodiments, the connector body is provided as separate first and second parts, such that they can be brought together around the pipes, in use.

In exemplary embodiments, the connector body is split along a horizontal plane to define the first and second parts.

Advantageously, installation of the apparatus is simplified, as the first and second parts of the connector body can be brought together in a transverse direction around the remaining components of the apparatus.

In exemplary embodiments, the first and second parts of the connector body comprise bores extending in a direction perpendicular to the horizontal plane, configured to accept connecting components, in order to couple the first and second parts of the connector body to each other.

In exemplary embodiments, each bore comprises an annular surface with a plane parallel to the horizontal plane, configured to be engaged by a connecting component in use.

In exemplary embodiments, the connector body is provided as separate ends or parts, such that a first part is on or around a first pipe free end and a second part is on or around a second pipe free end. In exemplary embodiments, the connector body is split along a vertical plane.

In exemplary embodiments, the mechanical interlock arrangement comprises at least one length of wire, for locating in one of the groove on the internal surface of the connector body or the channel defined between the cap and the connector body.

In exemplary embodiments, the mechanical interlock arrangement comprises a groove on an outside surface of at least one pipe and a projection on an internal surface of the connector body, configured such that the projection engages with the groove to prevent or limit axial movement of the connector body relative to the pipes.

In exemplary embodiments, the mechanical interlock arrangement comprises at least one projection or barb on an internal surface of the connector body. In exemplary embodiments, the barb is circumferential. In exemplary embodiments, the barb is tapered.

A further aspect of the invention provides a pipe assembly connecting two pipes in fluid communication comprising two pipes, each having a free end; a connector body having opposing open ends, each open end being dimensioned to receive the free end of one of the pipes; and a mechanical seal arrangement located at each open end of the connector body, for providing a metal-to-metal seal with the connector body.

In exemplary embodiments, all components can advantageously be supplied as one assembled unit. This can provide cost savings in terms of manufacture as well as transportation to site. It also greatly simplifies the installation process, as relatively little needs to be done on site to install the assembly, compared to existing methods.

In exemplary embodiments, the connector body comprises a shoulder, projecting radially inwardly from an internal surface of the connector body, arranged to limit the movement of the pipes in an axially inward direction with regards to the connector body. In exemplary embodiments, the free end of each pipe is limited by the internal shoulder, such that the connecting body is consistently located in the correct place relative to the pipes.

In exemplary embodiments, the shoulder extends around the internal surface of the sleeve circumferentially, and projects radially inwardly until the internal diameter of the shoulder is substantially equal to the internal diameter of the pipes. In exemplary embodiments, this minimises the amount of turbulence within the fluid flow, further reducing the risk of leakage and increasing the efficiency within the pipe.

In exemplary embodiments, each pipe comprises at least one circumferential groove on an outer surface, and the connector body comprises a plurality of circumferential grooves on an internal surface, such that grooves on the pipe and the connector body line-up, defining at least one channel within the pipe assembly. In exemplary embodiments, as the internal shoulder of the connecting body consistently locates the pipes in a correct position relative to the connecting body, the corresponding grooves line up, creating channels within the pipe assembly.

In exemplary embodiments, the mechanical interlock arrangement comprises a groove on an outside surface of at least one pipe and a projection on an internal surface of the connector body, configured such that the projection engages with the groove to prevent or limit axial movement of the connector body relative to the pipes.

In exemplary embodiments, the mechanical interlock arrangement comprises at least one projection or barb on an internal surface of the connector body. In exemplary embodiments, the barb is circumferential. In exemplary embodiments, the barb is tapered.

In exemplary embodiments, each mechanical seal arrangement comprises a metallic element configured to locate on the free end of one of said pipes, and contact the connector body, creating a seal.

In exemplary embodiments, the metallic element is an olive having a tapered portion comprising an angled surface, arranged to contact a corresponding angled surface of the connector body.

In exemplary embodiments, the first metallic element is an annular seal element for sealing a pipe joint, the seal element comprising:

a loading surface, an intermediate portion and a contact portion;

the loading surface being configured to receive an axial force and transmit the force via the intermediate portion to the contact portion, and the contact portion being configured to provide a seal between the pipe and a surrounding secondary seal element;

wherein the contact portion is configured to project radially beyond the intermediate portion and thereby provide a predetermined annular deformation region configured to conform to and seal against the secondary seal element upon application of a predetermined axial force.

In exemplary embodiments, the contact portion is configured to project radially outward beyond the intermediate portion.

In exemplary embodiments, the contact portion is configured to project radially inward beyond the intermediate portion.

In exemplary embodiments, the contact portion is substantially circular in cross-section. In exemplary embodiments, the profile of the intermediate portion is concave in cross-section. In exemplary embodiments, the intermediate portion is tapered towards the contact portion. In exemplary embodiments, the seal element is metallic.

In exemplary embodiments, each mechanical seal arrangement further comprises a cap arranged to locate on the free end of the pipe and apply a force to the metallic element.

In exemplary embodiments, the cap substantially covers the free end of the pipe and the metallic element.

In exemplary embodiments, each mechanical seal arrangement further comprises a resilient washer, located between the cap and the metallic element, to ensure the force applied by the cap on the metallic element is sustained in use.

In exemplary embodiments, the connector body is provided as separate first and second parts, such that they can be brought together around the pipes, in use.

In exemplary embodiments, the connector body is split along a horizontal plane to define the first and second parts.

Advantageously, installation of the apparatus is simplified, as the first and second parts of the connector body can be brought together in a transverse direction around the remaining components of the apparatus.

In exemplary embodiments, the first and second parts of the connector body comprise bores extending in a direction perpendicular to the horizontal plane, configured to accept connecting components, in order to couple the first and second parts of the connector body to each other.

In exemplary embodiments, each bore comprises an annular surface with a plane parallel to the horizontal plane, configured to be engaged by a connecting component in use.

In exemplary embodiments, the connector body is provided as separate ends or parts, such that a first part is on or around a first pipe free end and a second part is on or around a second pipe free end. In exemplary embodiments, the connector body is split along a vertical plane.

A further aspect of the invention provides a method of connecting two pipes in fluid communication, comprising providing two pipes, each pipe having a free end; locating a mechanical seal arrangement for creating a metal-to-metal seal on the free end of each pipe; and locating each free end of the pipe within a connector body, such that the connector body bridges the two pipes; wherein the mechanical seal arrangement is configured to provide a metal-to-metal seal with the connector body.

In exemplary embodiments, the assembly method of connecting the two pipes is very simple and easily repeatable, meaning minimal training is therefore required to perform the method. Also, in the case of pipe repairs, downtime is greatly reduced compared to current methods, minimising the cost of any repairs.

In exemplary embodiments, the method further comprises providing a mechanical interlock arrangement, for preventing or limiting axial movement of the connector body relative to the free ends of the pipes.

In exemplary embodiments, the method further comprises forming a circumferential groove on an outside surface of at least one pipe, and lining up the circumferential groove with at least one of a plurality of circumferential grooves on an internal surface of the connector body, in order to define at least one channel.

In exemplary embodiments, the method further comprises threading a length of wire through the at least one channel, in order to prevent or limit axial movement of the connector body relative to the free ends of the pipes.

In exemplary embodiments, the mechanical seal arrangement also includes a circumferential groove, which defines a channel in combination with a circumferential groove on an outside surface of the connector body, and wherein a length of wire is threaded through the channel in order to prevent or limit axial movement of the mechanical seal arrangement relative to the connector body.

In exemplary embodiments, the mechanical interlock arrangement comprises forming a groove on an outside surface of at least one pipe and providing a projection on an internal surface of the connector body, and engaging the projection with the groove to prevent or limit axial movement of the connector body relative to the pipes.

In exemplary embodiments, the mechanical interlock arrangement comprises at least one projection or barb on an internal surface of the connector body. In exemplary embodiments, the barb is circumferential. In exemplary embodiments, the barb is tapered.

In exemplary embodiments, the method further comprises applying a force to the mechanical seal arrangement to strengthen the metal-on-metal seal.

A further aspect of the invention provides an apparatus for connecting two pipes in fluid communication, the apparatus comprising a connector body configured for bridging a first and a second pipe, each pipe having a free end; a mechanical interlock arrangement, for preventing or limiting axial movement of the connector body relative to the free ends of the first and second pipes; and a mechanical seal arrangement for providing a metal-to-metal seal between the pipes and the connector body.

In normal use, the assembly serves to provide the two pipes in fluid communication and prevents undesired separation of the pipes. The mechanical interlock arrangement advantageously locks all the components together to limit axial movement, without the use of flanges or the components having to be welded together.

In exemplary embodiments, the metal-to-metal seal acts between an internal surface of the connector body and the pipes bridged by the connector body. It will be understood that a seal is required between each pipe and the connector body. A metal-on-metal arrangement provides a very strong seal, suitable for withstanding high pressures and high temperatures. A metal seal also has a high resistance to corrosion, increasing the life of the seal, especially when compared to traditional seals, such as rubber or asbestos O-rings or gaskets.

In exemplary embodiments, the mechanical seal arrangement includes a first metallic element configured to fit on a free end of a first pipe. In exemplary embodiments, the first metallic element is specifically dimensioned to fit on a pipe, for ensuring that the mechanical seal arrangement can create a strong seal, in combination with the connector body. In exemplary embodiments, the geometry of the first metallic element ensures that the first metallic element maintains concentricity with the pipe in use.

In exemplary embodiments, the mechanical seal arrangement includes a second metallic element, configured to be located between the first metallic element and an internal surface of the connector body. As such, a seal is created between the first and second metallic elements.

Advantageously, the mechanical seal arrangement is housed generally within the connector body. This greatly decreases the risk of catastrophic failure of the apparatus (e.g. a large blow out). If a component fails, there will simply be leakage of the fluid within the assembly, e.g. along a tortuous path. In most cases, it is believed that this could be easily detected, so that the problem can be attended to as soon as possible.

In exemplary embodiments, the first metallic element is an olive having a tapered portion comprising an angled surface, arranged to contact a corresponding angled surface of the second metallic element. In exemplary embodiments, the second metallic element is a sleeve, configured to encircle the two free ends of the pipes, in use. In exemplary embodiments, the sleeve is configured to bridge the free ends of the pipes in use. In exemplary embodiments, the two angled surfaces have different angles. In use, the olive surface abuts the sleeve surface, forming a very strong seal.

In alternative embodiments, the sleeve is integral with the connector body, such that, in use, the seal is created between engaging surfaces of the olive and the connector body.

In exemplary embodiments, the first metallic element is an annular seal element for sealing a pipe joint, the seal element comprising:

a loading surface, an intermediate portion and a contact portion;

the loading surface being configured to receive an axial force and transmit the force via the intermediate portion to the contact portion, and the contact portion being configured to provide a seal between the pipe and a surrounding secondary seal element;

wherein the contact portion is configured to project radially beyond the intermediate portion and thereby provide a predetermined annular deformation region configured to conform to and seal against the secondary seal element upon application of a predetermined axial force.

In exemplary embodiments, the contact portion is configured to project radially outward beyond the intermediate portion.

In exemplary embodiments, the contact portion is configured to project radially inward beyond the intermediate portion.

In exemplary embodiments, the contact portion is substantially circular in cross-section. In exemplary embodiments, the profile of the intermediate portion is concave in cross-section. In exemplary embodiments, the intermediate portion is tapered towards the contact portion. In exemplary embodiments, the seal element is metallic.

In exemplary embodiments, the apparatus further comprises a mechanism for applying a force to the first metallic element, in order to assure a seal between a pipe and the connector body.

In exemplary embodiments, the connector body comprises one or more apertures defining a plurality of channels through a portion of the connector body, from the front surface of the connector body to a radial internal surface, the radial internal surface being located substantially adjacent the first metallic element in use. Force applying components, such as bolts, can be inserted in the channels within the connector body to apply a force to the first metallic element, to induce axial movement of the first metallic element in the direction of the second metallic element.

In exemplary embodiments, each channel comprises an internal thread such that a bolt, with a corresponding external thread, can be rotatably inserted into each channel to provide a force that acts on the first metallic element in an axial direction.

In exemplary embodiments, the mechanical seal arrangement further comprises a resilient washer arranged for sustaining the force applied on the first metallic element. In exemplary embodiments, the washer is intended to account for any variation in the force (e.g. a reduction in applied force as the bolts, or another appropriate method of applying force, loosen over time) to ensure that a strong seal is maintained between the mechanical seal arrangement and the connector body.

In exemplary embodiments, the washer is configured to be located between the radial internal surface of the connector body comprising the apertures, and the first metallic element. Advantageously, the washer protects the first metallic element from damage, such as abrasion that might otherwise occur if the force applying components contacted the first metallic element directly.

In exemplary embodiments, the mechanical interlock arrangement comprises at least one projection on an internal surface of the connector body. In such embodiments, the projection is intended for alignment with a corresponding groove on the external surface of the pipe to be inserted into the connector. In use, the projection and groove engage one another, to substantially prevent or limit axial movement of the connector body relative to the free ends of the pipes.

In exemplary embodiments, one or both of the projections on the connector body and the groove on the pipe are circumferential.

In exemplary embodiments, the mechanical interlock arrangement comprises at least one circumferential groove on an internal surface of the connector body. In such embodiments, the groove is intended for alignment with a corresponding groove on the external surface of the pipe to be inserted into the connector, in order to define a bore or channel between the connector body and the pipe, for receiving a locking element, e.g. a length of wire, in order to resist against separation of the pipe and connector body.

In exemplary embodiments, the mechanical interlock arrangement comprises at least one length of wire, e.g. for locating in a bore or channel formed between the connector body and a pipe received therein.

In exemplary embodiments, the mechanical interlock arrangement comprises at least one projection or barb on an internal surface of the connector body. In exemplary embodiments, the barb is circumferential. In exemplary embodiments, the barb is tapered.

In exemplary embodiments, the connector body is provided as separate first and second parts, such that they can be brought together around the pipes, in use.

In exemplary embodiments, the connector body is split along a horizontal plane to define the first and second parts.

Advantageously, installation of the apparatus is simplified, as the first and second parts of the connector body can be brought together in a transverse direction around the remaining components of the apparatus.

In exemplary embodiments, the connector body is provided as separate ends or parts, such that a first part is on or around a first pipe free end and a second part is on or around a second pipe free end. In exemplary embodiments, the connector body is split along a vertical plane.

In exemplary embodiments, the first and second parts of the connector body comprise bores extending in a direction perpendicular to the horizontal plane, configured to accept connecting components, in order to couple the first and second parts of the connector body to each other.

In exemplary embodiments, each bore comprises an annular surface with a plane parallel to the horizontal plane, configured to be engaged by a connecting component in use.

A further aspect of the invention provides a pipe assembly connecting two pipes in fluid communication, the assembly comprising two pipes, each having a free end, a connector body bridging the pipes; and a mechanical seal arrangement for providing a metal-to-metal seal between each pipe and the connector body.

Similarly to the previous aspect of the invention, in normal use, the assembly serves to connect the two pipes in fluid communication. It will be understood that a seal is required between each pipe and the connector body. The metal-on-metal arrangement provides a very strong seal, suitable for withstanding high pressures and high temperatures. A metal seal also has a high resistance to corrosion, increasing the life of the seal, especially when compared to traditional seals, such as rubber or asbestos O-rings or gaskets.

In exemplary embodiments, the mechanical seal arrangement comprises a first metallic element and a second metallic element, the first and second metallic elements arranged to engage each other to create a metal-to-metal seal.

In exemplary embodiments, the first metallic element is an olive having a tapered portion comprising an angled surface, arranged to contact a corresponding angled surface of the second metallic element. In exemplary embodiments, the second metallic element is a sleeve, configured to fit within the connector body and encircle the two free ends of the pipes. In exemplary embodiments, the sleeve is configured to bridge the free ends of the pipes in use. In exemplary embodiments, the two angled surfaces have slightly different angles.

In alternative embodiments, the sleeve is integral with the connector body, such that, in use, the seal is created between engaging surfaces of the olive and the connector body.

In exemplary embodiments, the first metallic element is an annular seal element for sealing a pipe joint, the seal element comprising:
a loading surface, an intermediate portion and a contact portion;
the loading surface being configured to receive an axial force and transmit the force via the intermediate portion to the contact portion, and the contact portion being configured to provide a seal between the pipe and a surrounding secondary seal element;
wherein the contact portion is configured to project radially beyond the intermediate portion and thereby provide a predetermined annular deformation region configured to conform to and seal against the secondary seal element upon application of a predetermined axial force.

In exemplary embodiments, the contact portion is configured to project radially outward beyond the intermediate portion.

In exemplary embodiments, the contact portion is configured to project radially inward beyond the intermediate portion.

In exemplary embodiments, the contact portion is substantially circular in cross-section. In exemplary embodiments, the profile of the intermediate portion is concave in cross-section. In exemplary embodiments, the intermediate portion is tapered towards the contact portion. In exemplary embodiments, the seal element is metallic.

In exemplary embodiments, the assembly further comprises a mechanism arranged to act on the first metallic element, applying a force, to induce axial movement of the first metallic element in the direction of the second metallic element.

In exemplary embodiments, the connector body comprises one or more apertures defining a plurality of channels through a portion of the connector body, from the front surface of the connector body to a radial internal surface substantially adjacent the first metallic element.

In exemplary embodiments, the assembly further comprises a resilient washer, located between the connector body and the first metallic element, to assure the force applied on the first metallic element in use.

In exemplary embodiments, a mechanical interlock arrangement is provided.

The mechanical interlock arrangement helps to prevent undesired separation of the pipes. It also greatly simplifies the installation process, as relatively little needs to be done on site to install the assembly, compared to existing methods.

In exemplary embodiments, the mechanical interlock arrangement comprises at least one projection on an internal surface of the connector body. In such embodiments, the projection is intended for alignment with a corresponding groove on the external surface of the pipe to be inserted into the connector. In use, the projection and groove engage one another, to substantially prevent or limit axial movement of the connector body relative to the free ends of the pipes.

In exemplary embodiments, one or both of the projections on the connector body and the groove on the pipe are circumferential.

In exemplary embodiments, the mechanical interlock arrangement comprises at least one circumferential groove on an internal surface of the connector body. In such embodiments, the groove is intended for alignment with a corresponding groove on the external surface of the pipe to be inserted into the connector, in order to define a bore or channel between the connector body and the pipe, for receiving a locking element, e.g. a length of wire, in order to resist against separation of the pipe and connector body.

In exemplary embodiments, the mechanical interlock arrangement comprises at least one length of wire, e.g. for locating in a bore or channel formed between the connector body and a pipe received therein.

In exemplary embodiments, the mechanical interlock arrangement comprises at least one projection or barb on an internal surface of the connector body.

In exemplary embodiments, the barb is circumferential.

In exemplary embodiments, the barb is tapered.

In exemplary embodiments, the connector body is provided as separate first and second parts, the first and second parts having been brought together around the pipes.

In exemplary embodiments, the connector body is split along a horizontal plane to define the first and second parts.

In exemplary embodiments, the connector body is provided as separate ends or parts, such that a first part is on or around a first pipe free end and a second part is on or around a second pipe free end. In exemplary embodiments, the connector body is split along a vertical plane.

In exemplary embodiments, the first and second parts of the connector body comprise bores extending in a direction perpendicular to the horizontal plane, configured to accept connecting components, in order to couple the first and second parts of the connector body to each other.

In exemplary embodiments, each bore comprises an annular surface with a plane parallel to the horizontal plane, configured to be engaged by a connecting component in use.

A further aspect of the invention provides a method of connecting two pipes in fluid communication, the method comprising providing two pipes, each pipe having a free end; locating a first part of a metal-to-metal seal arrangement on the free end of each pipe; and locating each free end of the pipe within a connector body having a second part of a metal-to-metal seal arrangement, such that the connector body bridges the two pipes; wherein the first and second metal-to-metal seal arrangements provide a metal-to-metal seal between a respective pipe and the connector body.

Advantageously, the method of connecting the two pipes is very simple and easily repeatable, meaning that minimal training is required to perform the method. Also, in the case of pipe repairs, downtime is greatly reduced compared to current methods, minimising the cost of any repairs. Moreover, the method avoids the need for flanges used commonly for coupling two pipes together in fluid communication.

In exemplary embodiments, the method comprises the step of applying a force to the first part of the seal arrangement, in order to assure a seal between the pipe and the connector body.

In exemplary embodiments, the method also comprises the step of providing a mechanical interlock arrangement, for preventing or limiting axial movement of the connector body relative to the pipes.

In exemplary embodiments, the mechanical interlock arrangement comprises forming a groove on an outside surface of at least one pipe and providing a projection on an internal surface of the connector body, and engaging the projection with the groove to prevent or limit axial movement of the connector body relative to the pipes.

In exemplary embodiments, the mechanical interlock arrangement comprises at least one circumferential groove on an internal surface of the connector body. In such embodiments, the groove is intended for alignment with a corresponding groove on the external surface of the pipe to be inserted into the connector, in order to define a bore or channel between the connector body and the pipe, for receiving a locking element, e.g. a length of wire, in order to resist against separation of the pipe and connector body.

In exemplary embodiments, the mechanical interlock arrangement comprises at least one length of wire, e.g. for locating in a bore or channel formed between the connector body and a pipe received therein.

In exemplary embodiments, the mechanical interlock arrangement comprises at least one projection or barb on an internal surface of the connector body. In exemplary embodiments, the barb is circumferential. In exemplary embodiments, the barb is tapered.

In exemplary embodiments, the method further comprises providing a resilient washer between the connector body and the first part of the seal arrangement, for applying a force to the seal element.

A further aspect of the invention provides a coupling arrangement comprising a connector and a pipe, the connector having a female open end configured to receive a male free end of the pipe, the coupling arrangement further comprising a mechanical seal arrangement configured to form a metal-to-metal seal between the connector and the pipe, wherein the mechanical seal arrangement comprises a first angled surface and a second angled surface, the first and second angled surfaces being arranged to engage each other to form the metal-to-metal seal.

The coupling arrangement has multiple advantages and applications. For example, the coupling arrangement can form part of a known expansion joint without the need for any welding.

In exemplary embodiments, the mechanical seal arrangement includes a first metallic element configured to fit on the free end of the pipe, the metallic element including the first angled surface.

In exemplary embodiments, the connector comprises the second angled surface, e.g. part of a metal sleeve or other metallic element housed within the connector, or an integral part of the connector body or socket defining the female open end.

In exemplary embodiments, the first metallic element is an olive having a tapered portion comprising the first angled surface, arranged to contact the second angled surface of the connector. In exemplary embodiments, the first and second angled surfaces have different angles. In use, the first angled surface abuts the second angled surface, forming a strong seal.

In exemplary embodiments, the first metallic element is an annular seal element for sealing a pipe joint, the seal element comprising:

a loading surface, an intermediate portion and a contact portion;

the loading surface being configured to receive an axial force and transmit the force via the intermediate portion to the contact portion, and the contact portion being configured to provide a seal between the pipe and a surrounding secondary seal element;

wherein the contact portion is configured to project radially beyond the intermediate portion and thereby provide a predetermined annular deformation region configured to conform to and seal against the secondary seal element upon application of a predetermined axial force.

In exemplary embodiments, the contact portion is configured to project radially outward beyond the intermediate portion.

In exemplary embodiments, the contact portion is configured to project radially inward beyond the intermediate portion.

In exemplary embodiments, the contact portion is substantially circular in cross-section. In exemplary embodiments, the profile of the intermediate portion is concave in cross-section. In exemplary embodiments, the intermediate portion is tapered towards the contact portion. In exemplary embodiments, the seal element is metallic.

In exemplary embodiments, the apparatus further comprises a mechanism for applying a force to the metallic element, in order to assure a seal between the pipe and the connector.

In exemplary embodiments, the coupling arrangement further comprises a cap, configured to encircle the pipe, the cap defining a cavity for housing the first metallic element.

In exemplary embodiments, the cap comprises one or more apertures defining a plurality of channels through a portion of the cap, from a front surface of the cap to a radial internal surface, the radial internal surface being located substantially adjacent the first metallic element in use.

Force applying components, such as bolts, can be inserted in the channels within the cap to apply a force to the first metallic element, to induce axial movement of the metallic element in the direction of the second angled surface of the connector.

In exemplary embodiments, each channel comprises an internal thread such that a bolt, with a corresponding external thread, can be rotatably inserted into each channel to provide a force that acts on the metallic element in an axial direction.

In exemplary embodiments, the mechanical seal arrangement further comprises a resilient washer arranged for sustaining the force applied on the first metallic element, the resilient washer being located within the cavity defined by the cap. In exemplary embodiments, the washer is intended to substantially account for any variation in the force (e.g. a reduction in applied force as the bolts, or another appropriate method of applying force, loosen over time) to ensure that a strong seal is maintained between the pipe and the connector.

In exemplary embodiments, the washer is configured to be located between the radial internal surface of the cap comprising the apertures, and the first metallic element. Advantageously, the washer protects the first metallic element from damage, such as abrasion that might otherwise occur if the force applying components contacted the first metallic element directly.

In exemplary embodiments, the coupling arrangement further comprises a mechanical interlock arrangement, for preventing or limiting axial movement of the connector relative to the free end of the pipe.

In exemplary embodiments, the mechanical interlock arrangement comprises a first projection on an internal surface of the cap. In such embodiments, the first projection is intended for alignment with a corresponding groove on an external surface of the pipe to be inserted into the connector. In use, the first projection and the groove on the pipe engage one another.

In exemplary embodiments, one or both of the projections and the groove are circumferential.

In exemplary embodiments the mechanical interlock arrangement further comprises a second projection on the internal surface of the cap. In such embodiments, the second projection is intended for alignment with a corresponding groove on an external surface of the connector. In use, the second projection and the groove on the connector engage one another.

In alternative embodiments, the internal surface of the cap has a thread and the external surface of the connector has a corresponding thread, such that the cap can be screwed on to the connector to prevent or limit axial movement of the connector relative to the free end of the pipe.

In exemplary embodiments, the cap comprises separate first and second parts, such that, after assembly, they encircle the pipe.

In exemplary embodiments, the cap is split along a horizontal plane to define the first and second parts.

Advantageously, installation of the coupling arrangement is simplified, as the first and second parts of the cap can be brought together in a transverse direction around the remaining components of the coupling arrangement.

In exemplary embodiments, the first and second parts of the cap comprise bores extending in a direction perpendicular to the horizontal plane, configured to accept connecting components, in order to couple the first and second parts of the cap to each other.

In exemplary embodiments, each bore comprises an annular surface with a plane parallel to the horizontal plane, configured to be engaged by a connecting component in use.

In exemplary embodiments, the mechanical interlock arrangement comprises at least one circumferential groove on an internal surface of the connector body. In such embodiments, the groove is intended for alignment with a corresponding groove on the external surface of the pipe to be inserted into the connector, in order to define a bore or channel between the connector body and the pipe, for receiving a locking element, e.g. a length of wire, in order to resist against separation of the pipe and connector body.

In exemplary embodiments, the mechanical interlock arrangement comprises at least one length of wire, e.g. for locating in a bore or channel formed between the connector body and a pipe received therein.

In exemplary embodiments, the mechanical interlock arrangement comprises at least one projection or barb on an internal surface of the connector body. In exemplary embodiments, the barb is circumferential. In exemplary embodiments, the barb is tapered.

Other aspects and features of the invention will be apparent from the claims and the following description.

BRIEF DESCRIPTION OF THE DRAWINGS

Embodiments of the invention will now be described with reference to the accompanying drawings, in which:

FIG. 17A is a perspective view of a connector body, a component of the pipe assembly of FIG. 13;

FIG. 17B is a cross-sectional view of the connector body of FIG. 17A;

FIG. 20A is a perspective view of a resilient washer, a component of the pipe assembly of FIG. 13;

FIG. 20B is a cross-sectional view of the resilient washer of FIG. 20A;

FIG. 20C is a close up cross-sectional view of the resilient washer of FIG. 20A;

FIG. 22 is a cross-sectional view of the coupling arrangement of FIG. 21; and.

FIG. 25 is a cross-sectional view of the pipe assembly of FIG. 24;

DETAILED DESCRIPTION OF THE INVENTION

Figure 1:
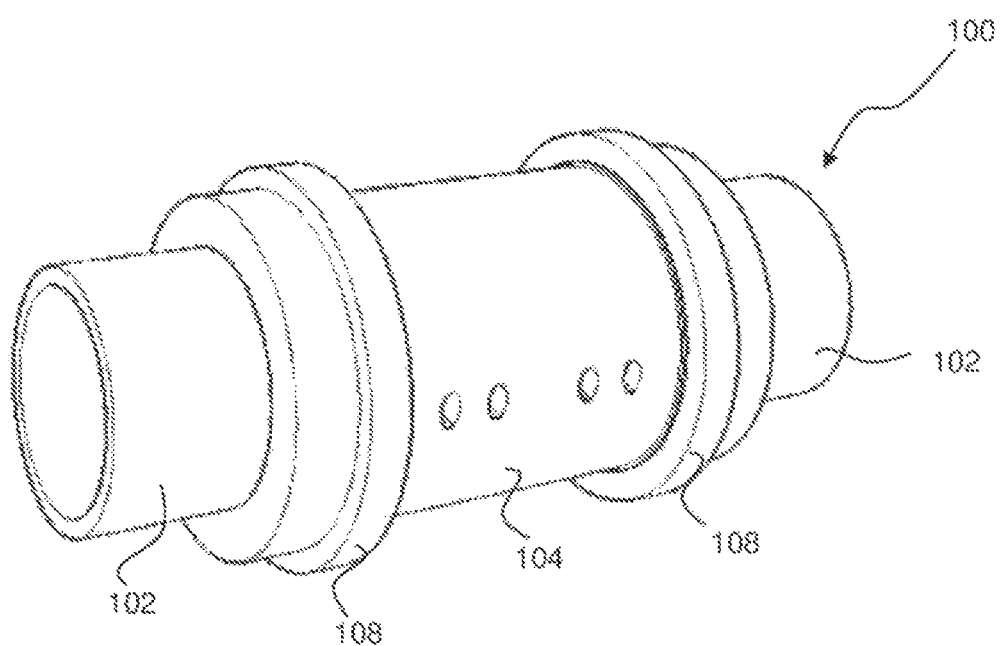
FIG. 1 is a perspective view of a pipe assembly according to an aspect of the invention.
Figure 2:
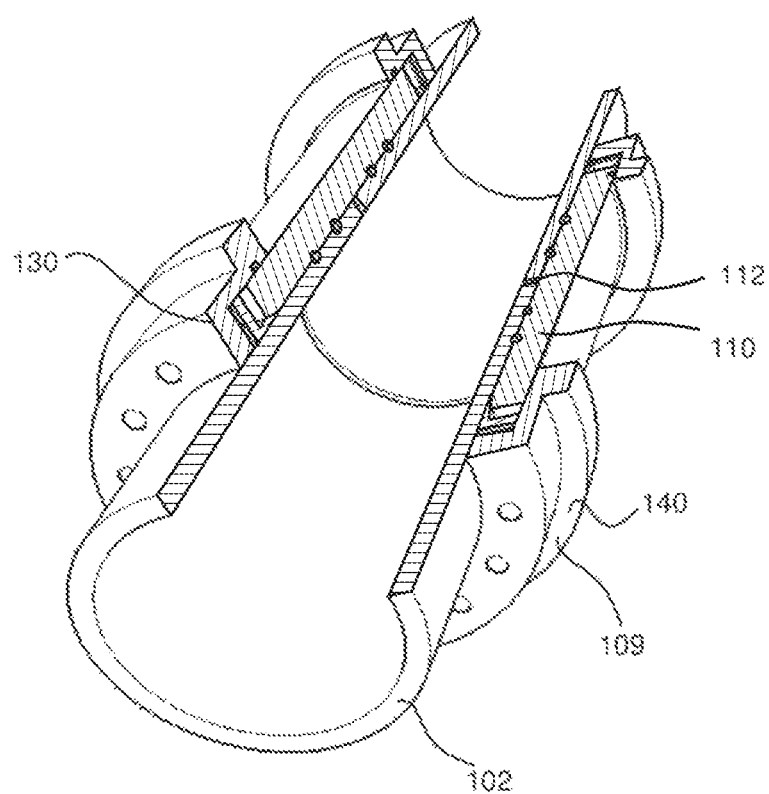
FIG. 2 is a cut-away perspective view of the pipe assembly of FIG. 1, showing the components that make up the pipe assembly.
Figure 3:
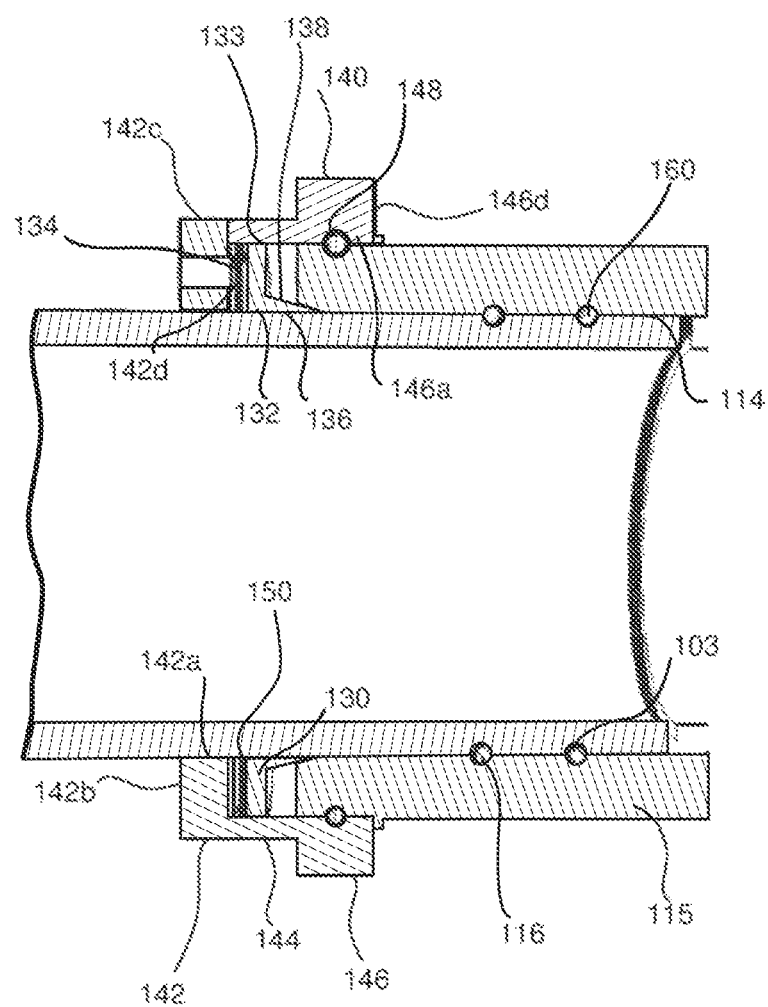
FIG. 3 is a cross-sectional view of the pipe assembly of FIG. 1.

Referring firstly to FIGS. 1 to 3, an assembly connecting two pipes in fluid communication is indicated generally at 100. The assembly includes two pipes 102, bridged by a connector body 104. The connector body 104 has opposing open ends, configured to accept a free end of a pipe 102.

As will be described in more detail below, axial movement of the pipes 102 relative to the connector body 104 is prevented or limited by a mechanical interlock arrangement 106. In this embodiment, the mechanical lock arrangement 106 includes a plurality of lengths of wire 160, engaging in grooves formed in the pipes 102 and connector body 104. A mechanical seal arrangement 108 provides a seal between the pipes and the connector body. The mechanical seal arrangement 108 includes a metallic element such as, in this embodiment, a metal olive 130. The mechanical seal arrangement 108 further includes a cap 109, such as a nut 140. In this embodiment, the nut 140 is located at each opposing end of the connector body 104 and is used to provide a compressive force on the olive 130, creating a seal between the olive 130 and the connector body 104.

In this embodiment, each pipe 102 is approximately 100 mm in diameter (i.e. a relatively large diameter pipe suitable for transporting oil, or the like, at high pressure). Each pipe 102 has two grooves 103, located generally adjacent the free end of the pipe 102. Each groove 103 extends around an entire external circumference of the pipe 102. The grooves 103 are generally semi-circular in cross-section and can be formed by any suitable method, such as machining. It will be appreciated, however, that each groove 103 may be of any suitable shape in cross-section and may only extend for a partial external circumference of the pipe.

Figure 4:
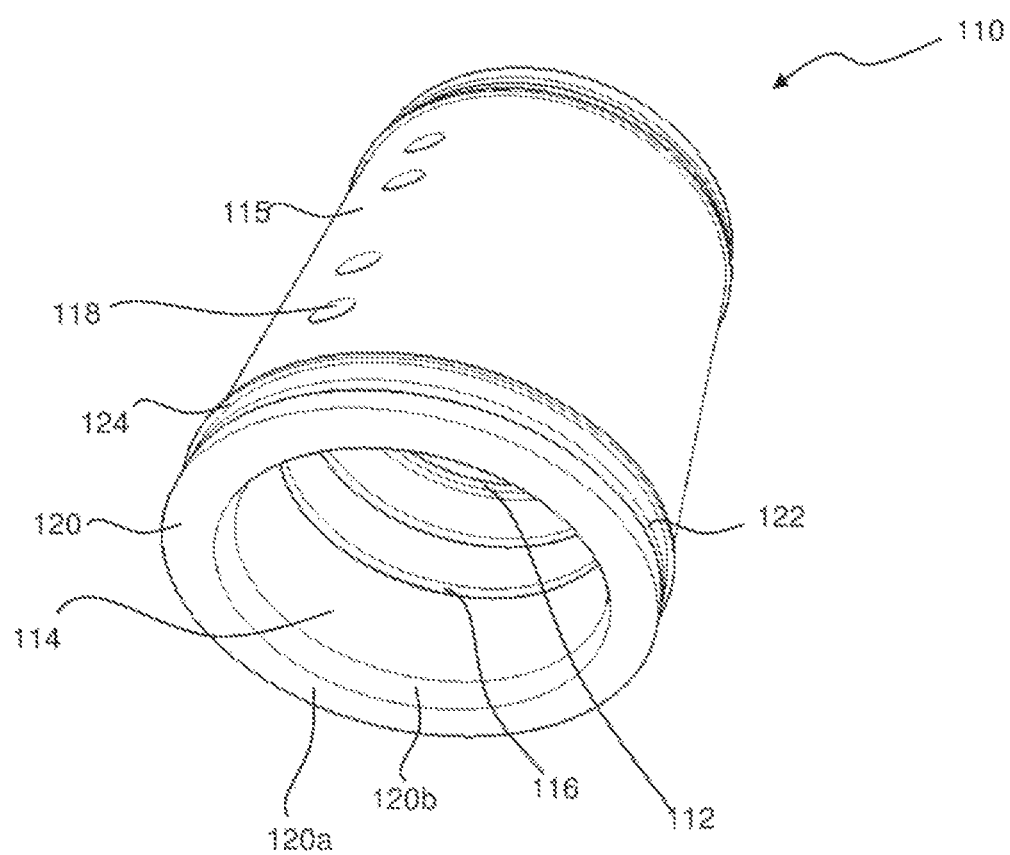
FIG. 4 is a perspective view of a connector body, a component of the pipe assembly of FIG. 1.

Referring to FIG. 4, the connector body 104 defines a sleeve 110 in the form of a generally hollow cylinder having opposing open ends, approximately 200 mm in length with a bore of between 100.08 and 100.11 mm in this embodiment, such that it can receive the free ends of the two pipes 102 with a small clearance. The sleeve 110 has an internal shoulder 112 projecting from an internal surface 114. The internal shoulder 112 acts as a stop for the free ends of the pipes 102, in use. The internal shoulder 112 extends around an entire internal circumference of the sleeve 110, though it will be appreciated that the internal shoulder 112 may only extend around one or more portions of the internal circumference of the sleeve 110. In this embodiment, the internal shoulder 112 is located in the centre of the sleeve 110 longitudinally, such that an equal amount of the each pipe 102 is received in each open end of the sleeve 110. This position has been found to give a desirable force distribution when the sleeve 110 is in use, though it will be appreciated that the internal shoulder 112 can be located in any suitable position within the sleeve 110, or may be removed completely, e.g. in some instances of the sleeve being used to repair two broken pipes.

The internal surface 114 of the sleeve 110 also has a plurality of grooves 116. In this embodiment, there are four grooves 116, with two grooves 116 located on either side of the internal shoulder 112 longitudinally. Each groove 116 extends around the entire internal circumference of the sleeve 110 and is generally semi-circular in cros s-section. Each groove 116 connects to an aperture 118. There are therefore four apertures 118 in total, distributed in horizontal alignment along one side of the sleeve 110. Each aperture 118 passes from an external surface 115 of the sleeve to the internal surface 114, creating a plurality of passages from the external surface 115 to the grooves 116.

The sleeve 110 has opposing end surfaces 120. As can be seen most clearly from FIG. 3, the end surfaces 120 of the sleeve 110 are made up of a first surface portion 120a and a second surface portion 120b. The surface portion 120a is radial, i.e. it projects in a substantially perpendicular direction to the longitudinal axis of the sleeve 110, and is substantially flat in this embodiment. Connecting the surface portion 120a to the internal surface 114 is the surface portion 120b. The surface portion 120b is angled, having an angle of approximately 12° to the longitudinal axis of the sleeve 110 and 24° inclusive in this embodiment. The angled surface portion 120b is substantially flat in this embodiment.

Substantially adjacent the end surfaces 120 at each end of the sleeve 110, on the external surface 115, is a groove 122. The groove 122 extends around the entire external circumference of the sleeve 110 and is generally semi-circular in cross-section. Laterally inward of the groove 122 is a shoulder 124. In this embodiment, the shoulder 124 extends around an entire external circumference of the sleeve 110, but it will be appreciated that the shoulder 124 may only extend for one or more portions of the external circumference of the sleeve 110.

Figure 5:
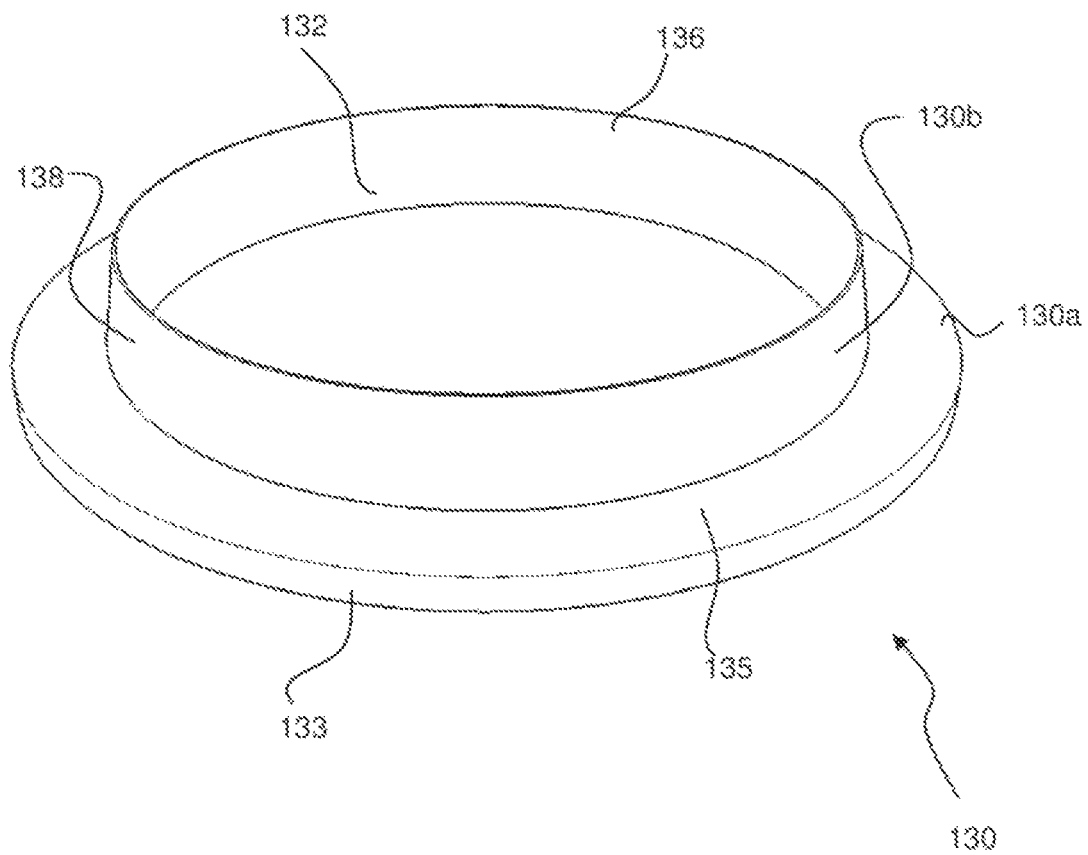
FIG. 5 is a perspective view of an olive, a component of the pipe assembly of FIG. 1.

Referring to FIGS. 3 and 5, the olive 130 is composed of two annular portions 130a and 130b. The annular portion 130a is generally rectangular in cross section, i.e. an internal surface 132 and an external surface 133 of the annular portion 130a are parallel. The annular portion 130a has a front surface 134 that connects the internal surface 132 and the external surface 133. Projecting in a generally perpendicular direction from the front surface 134 is the annular portion 130b. The annular portion 130b is generally tapered. The annular portion 130b has a smaller external diameter than the annular portion 130a. The annular portion 130b has an internal surface 136 that is coplanar to the internal surface 132, such that the two surfaces form a continuous planar surface, creating a constant bore through the olive 130. The annular portion 130b also has an external surface 138. The external surface 138 is angled, at approximately 10° to the plane of the internal surface 136 and 20° inclusive, to create the taper of the annular portion 130b. The external surface 138 is generally flat. Connecting the external surface 138 to the external surface 133 is a rear surface 135 of the olive 130.

Figure 6:
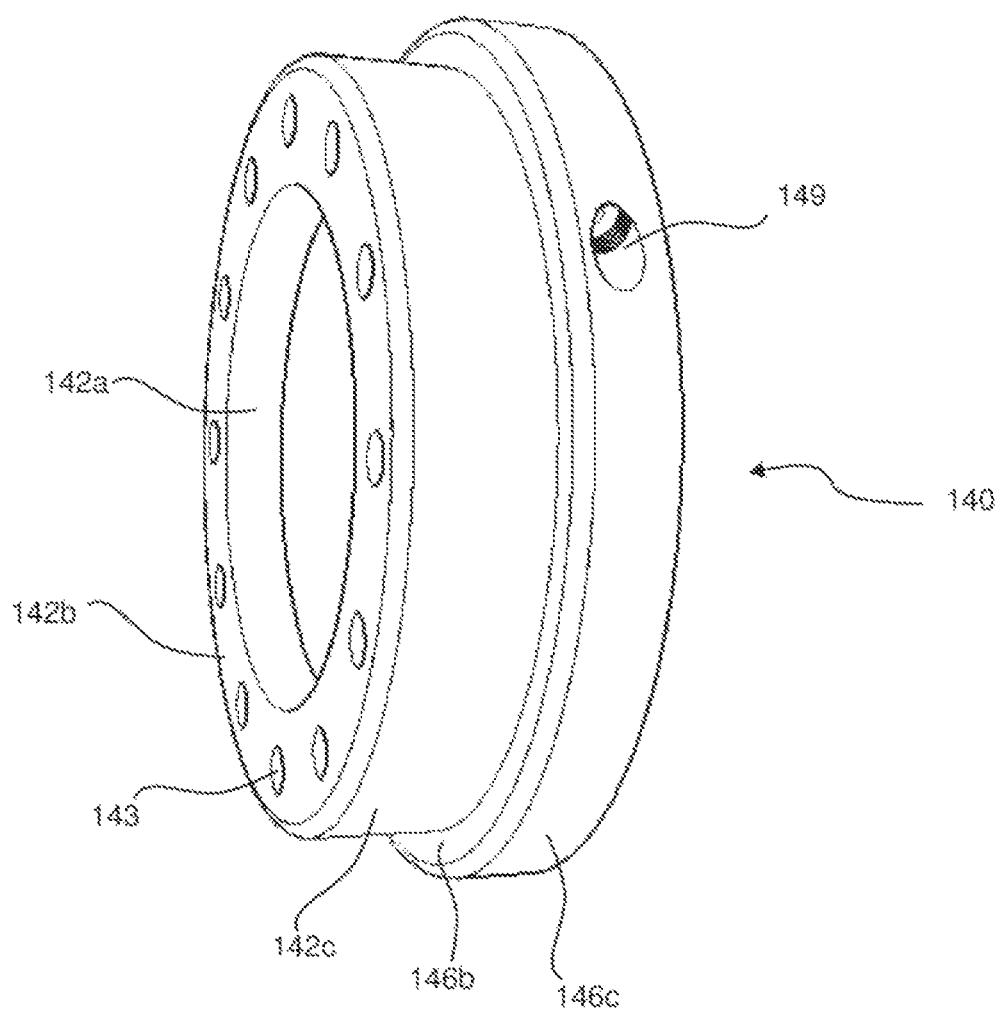
FIG. 6 is a perspective view of a nut, a component of the pipe assembly of FIG. 1.

Referring to FIGS. 3 and 6, the nut 140 is generally hat-shaped in cross-section. The nut 140 generally comprises an annular portion 142, an annular portion 146, and a bridging portion 144 connecting the annular portion 142 to the annular portion 146. The bore of the annular portion 142 is between 100.08 and 100.11 mm in this embodiment (i.e. sufficient to fit a 100 mm pipe, with a small clearance). The bore of the bridging portion 144 and the annular portion 146 are greater than the bore of the annular portion 142, and are approximately equal to the external diameter of the sleeve 110 and the external diameter of the annular portion 130a of the olive 130; in this embodiment about 150 mm. For the purposes of this description, it will be assumed that the annular portion 142 is the front of the nut 140 and the annular portion 146 is the rear of the nut 140.

The annular portion 142 has an internal surface 142a, an external surface 142c and a front surface 142b, that connects the internal surface 142a and the external surface 142c. The internal surface 142a and the external surface 142c are parallel, and the front surface 142b is perpendicular to both surfaces. Distributed evenly around the front surface 142b, on an appropriate pitch circle, are a plurality of apertures 143. In this embodiment, there are twelve circular apertures 143, but any suitable shape and number of apertures 143 may be included. The apertures 143 pass through the entire depth of the annular portion 142, i.e. from the front surface 142b to a rear surface 142d.

The bridging portion 144 connects the annular portion 142 to the annular portion 146. The bridging portion 144 has an internal surface 144a and an external surface 144c. The external surface 144c is coplanar to the external surface 142c, such that the two surfaces form a continuous planar surface. The internal surface 144a is parallel to the external surface 144c.

Connected to the bridging portion 144 is the annular portion 146. The annular portion 146 has an internal surface 146a, a rear surface 146d, an external surface 146c, and a front surface 146b. The internal surface 146a is coplanar to the internal surface 144a, such that the two surfaces form a continuous planar surface. The external surface 146c is parallel to the internal surface 146a. The rear surface 146d connects the external surface 146c to the internal surface 146a. The rear surface 146d is perpendicular to the external surface 146c and the internal surface 146a. The front surface 146b is parallel to the rear surface 146d, and connects the external surface 146c to the external surface 144c.

On the internal surface 146a of the annular portion 146 is a groove 148. In this embodiment, the groove 148 extends around the entire internal circumference of the annular portion 146 of the nut 140 and is generally semi-circular in cross-section. On the external surface 146c is an aperture 149. The aperture 149 is located longitudinally level with the groove 148, creating a passage from the external surface 146c to the groove 148.

Figure 7:
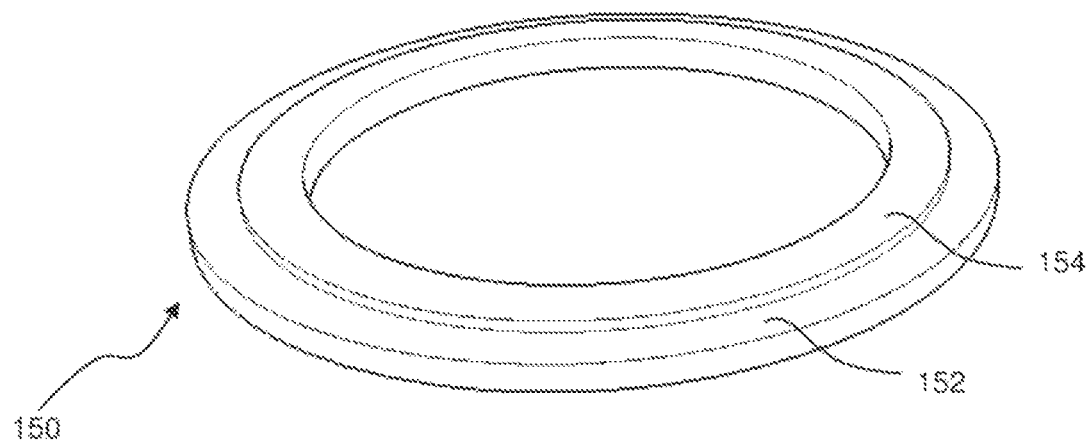
FIG. 7 is a perspective view of a resilient washer, a component of the pipe assembly
of FIG. 1.

In this embodiment, the assembly 100 further includes a resilient washer 150. Referring now to FIG. 7, the washer 150 is a spring washer. The washer 150 is annular, with a semi-circular cross section. In this embodiment, the washer comprises a shoulder 154 protruding in a direction perpendicular to a top surface 152 of the washer 154. The shoulder 154 is also annular, with an internal diameter equal to the internal diameter of the remainder of the washer 150, such that the washer 150 has a constant bore through its centre. The washer 150 is typically made of metal, such as steel. Preferably a sprung steel will be used, with a high yield strength and high elastic modulus, such as medium/high carbon-steel, but any suitable material can be used. It will also be appreciated that any suitable type of resilient washer may be used.

To assemble the components of the assembly 100, firstly the grooves 103 are formed in the appropriate places on the free ends of the pipes 102. Then, taking each pipe 102 individually, the nut 140 is slid onto the pipe 102. Next, the washer 150 is slid on to the pipe 102. The washer 150 is dimensioned to have an internal diameter similar to the pipe 102 and an external diameter similar to the bore of the bridging portion 144 of the nut 140. Therefore, the washer 150 fits in the bore of the bridging portion 144 and contacts the rear surface 142d of the annular portion 142. The olive 130 is then slid on to the pipe 102, such that the front surface 134 of the annular portion 130a contacts the washer 150, and the olive 130 is housed within the bore of the bridging portion 144. The washer 150 is arranged such that the shoulder 154 of the washer 150 abuts the front surface 134 of the olive 130 in use. This enables the washer to deflect about its shoulder to sustain the force and substantially limit the movement of the olive 130.

The sleeve 110 is slid on to the pipe 102 next, until the free end of the pipe 102 comes into contact with the shoulder 112. The shoulder 112 is dimensioned to project outwardly from the internal surface 114 of the sleeve to a distance such that a top surface 112a of the shoulder is substantially level with the internal diameter of the pipe 102. This minimises turbulence in the pipe 102 when it is in use, advantageously improving the efficiency of the fluid flow within the pipe 102. When the pipe 102 is in contact with the shoulder 112, the grooves 103 of the pipe 102 line up with the grooves 116 of the sleeve 110, forming channels with a circular cross section between the sleeve 110 and the pipe 102.

The nut 140 is then slid back over the sleeve 110, in the direction of the end of the pipe 102, until the rear surface 146d contacts the shoulder 124 in the external surface 115 of the sleeve 110. When the nut 140 is in contact with the shoulder 124, the groove 122 of the sleeve 110 lines up with the groove 148, creating a channel between the sleeve 110 and the nut 140.

The same process is repeated on the other pipe 102 of the joint such that the assembly bridges the gap between two pipes 102.

A separate length of wire 160 is threaded through each of the apertures 118 and the apertures 149, and through the passages created between the corresponding components. The wire 160 provides sufficient strength to prevent or limit the relative movement of the components of the assembly axially, i.e. along the longitudinal axis of the sleeve 110. Each length of wire 160 is dimensioned to fit within at least one of the passages and have an appropriate length. In this embodiment, it is held in place by square plugs. This is advantageous as a user simply needs an Allen key for installation of the assembly 110. It will be appreciated though, that any suitable method could be used to hold the wire in place.

A plurality of bolts 152 are then inserted through the apertures 143 from the front surface 142b in the direction of the rear surface 142d of each nut 140. They pass through and contact the washer 150. As the bolts 152 are tightened, a force is therefore applied to the washer 150 and is transferred to the olive 130. The washer 150 advantageously ensures that the force applied by the nut 140 is maintained in use, as it can account for any natural 'flex' that may occur between the nut 140 and the olive 130, as well as any decrease in the force applied by blots 152 over time, or if they loosen in use. It also protects the olive 130 from abrasive damage from the bolts 152.

The force applied by the bolts 152 compresses the olive 130 in the direction of the sleeve 110. Specifically, the angled surface 138 of the olive 130 engages the angled surface 120b of the sleeve 110. The angled surfaces interface and the olive 130 conforms to the greater angle of the surface 120b of the sleeve 110. This creates a strong mechanical seal between the sleeve 110 and the olive 130.

Therefore, in use, oil can pass from one pipe 102 to another pipe 102 under high pressure with a very low risk of leakage due to the strong mechanical seal created by the assembly 100.

Figure 8:
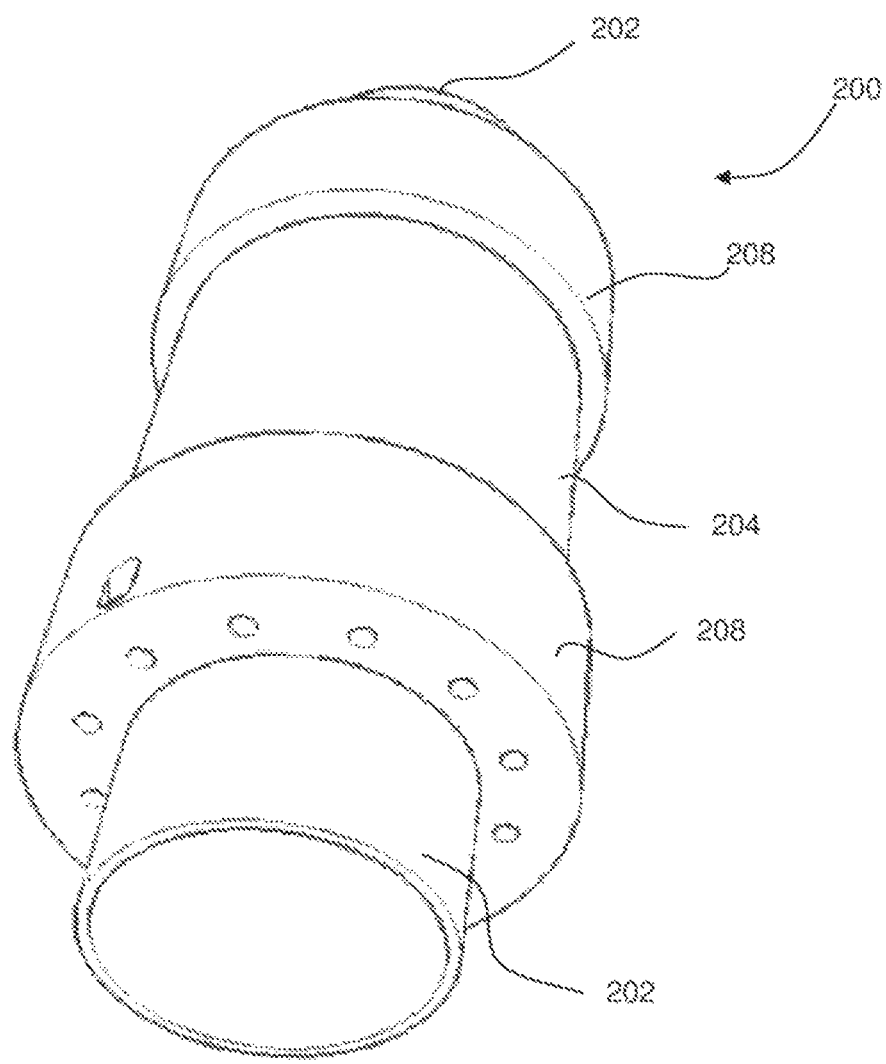
FIG. 8 is a perspective view of a pipe assembly according to an aspect of the invention.
Figure 9:
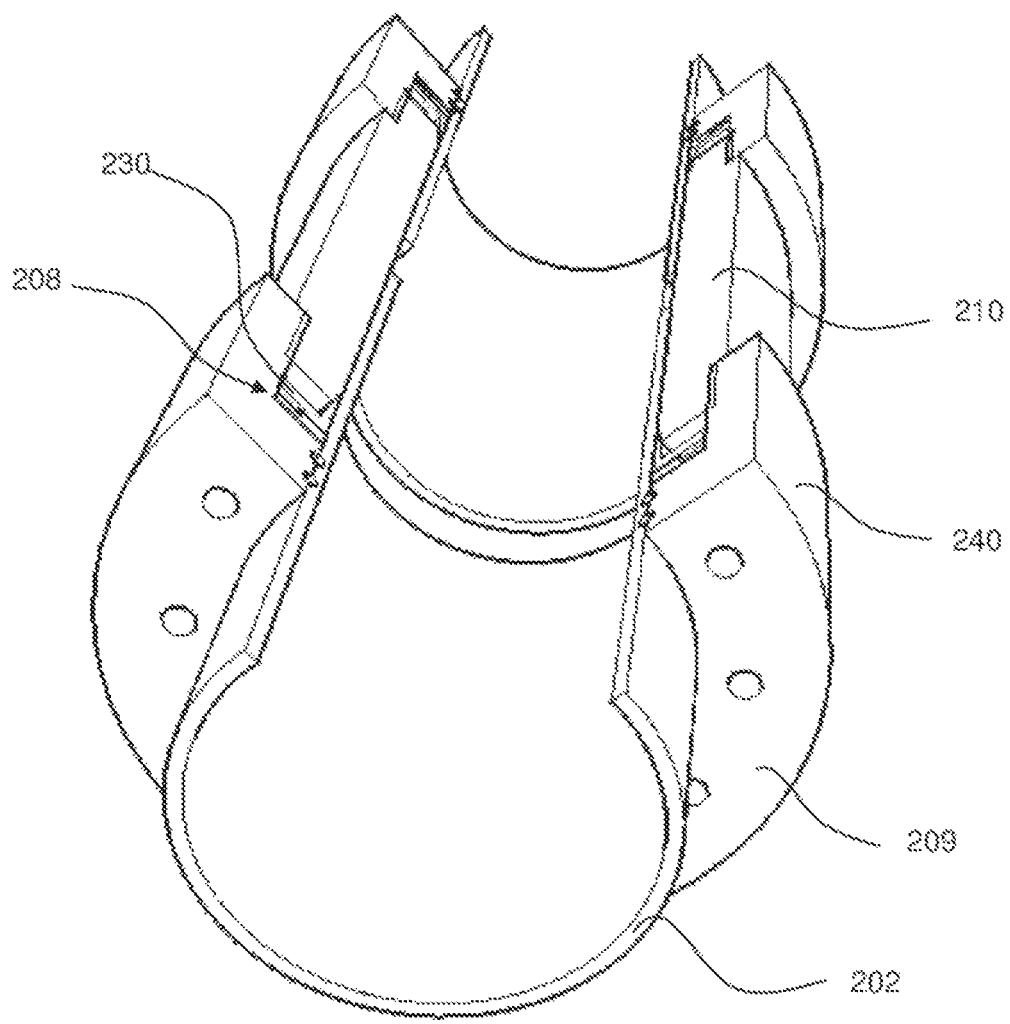
FIG. 9 is a cut-away perspective view of the pipe assembly of FIG. 8, showing the components that make up the pipe assembly.
Figure 10:
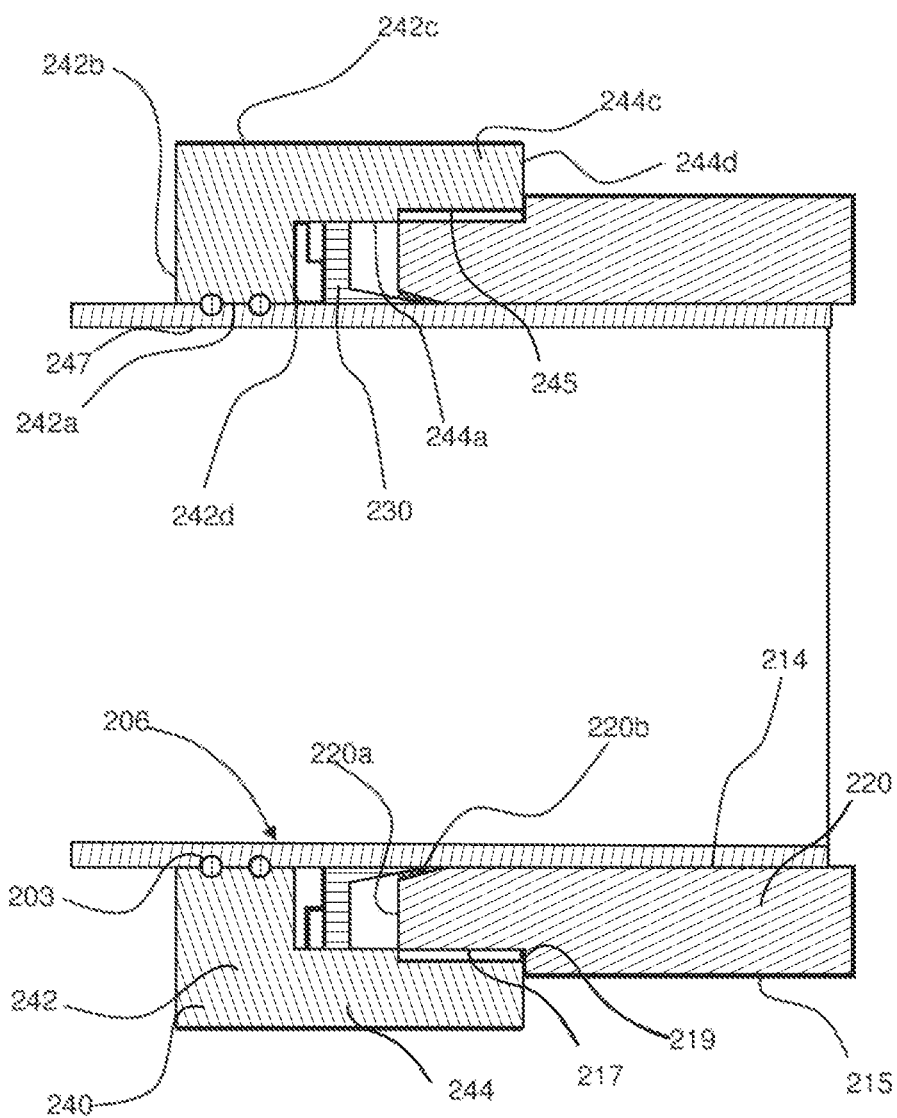
FIG. 10 is a cross-sectional view of the pipe assembly of FIG. 8.

Referring now to FIGS. 8 to 10, a second embodiment of the invention will be described. This embodiment works in a very similar way to the first embodiment but has a modified mechanical interlock arrangement. Equivalent parts of each embodiment use equivalent labels; 102, 202 etc.

A pipe assembly is indicated generally at 200. The assembly includes two pipes 202, bridged by a connector body 204. The connector body 204 has opposing open ends, configured to accept a free end of a pipe 202.

As will be described in more detail below, axial movement of the pipes 202 relative to the connector body 204 is prevented or limited by a mechanical interlock arrangement 206. In this embodiment, the mechanical interlock arrangement 206 includes a plurality of lengths of wire 260, engaging in grooves formed in the pipes 202 and grooves formed within a mechanical seal arrangement 208 (described below). The mechanical interlock arrangement also includes a threaded connection between the connector body 204 and the mechanical seal arrangement 208. The mechanical seal arrangement 208 provides a seal between the pipes and the connector body. The mechanical seal arrangement 208 includes a metallic element such as, in this embodiment, a metal olive 230. The mechanical seal arrangement 208 further includes a cap 209, such as a nut 240. In this embodiment, the nut 240 is located at each opposing end of the connector body 204 and is used to provide a compressive force on the olive 230, creating a seal between the pipes and the connector body 204.

In this embodiment, each pipe 202 is approximately 100 mm in diameter (i.e. a relatively large diameter pipe suitable for transporting oil, or the like, at high pressure). Each pipe 202 has at least one groove 203, spaced from the free end of the pipe 202. Each groove 203 extends around an entire external circumference of the pipe 202. The grooves 203 are generally semi-circular in cross-section and can be formed by any suitable method, such as machining. It will be appreciated, however, that each groove 203 may be of any suitable shape in cross-section and may only extend for a partial external circumference of the pipe.

Figure 11:
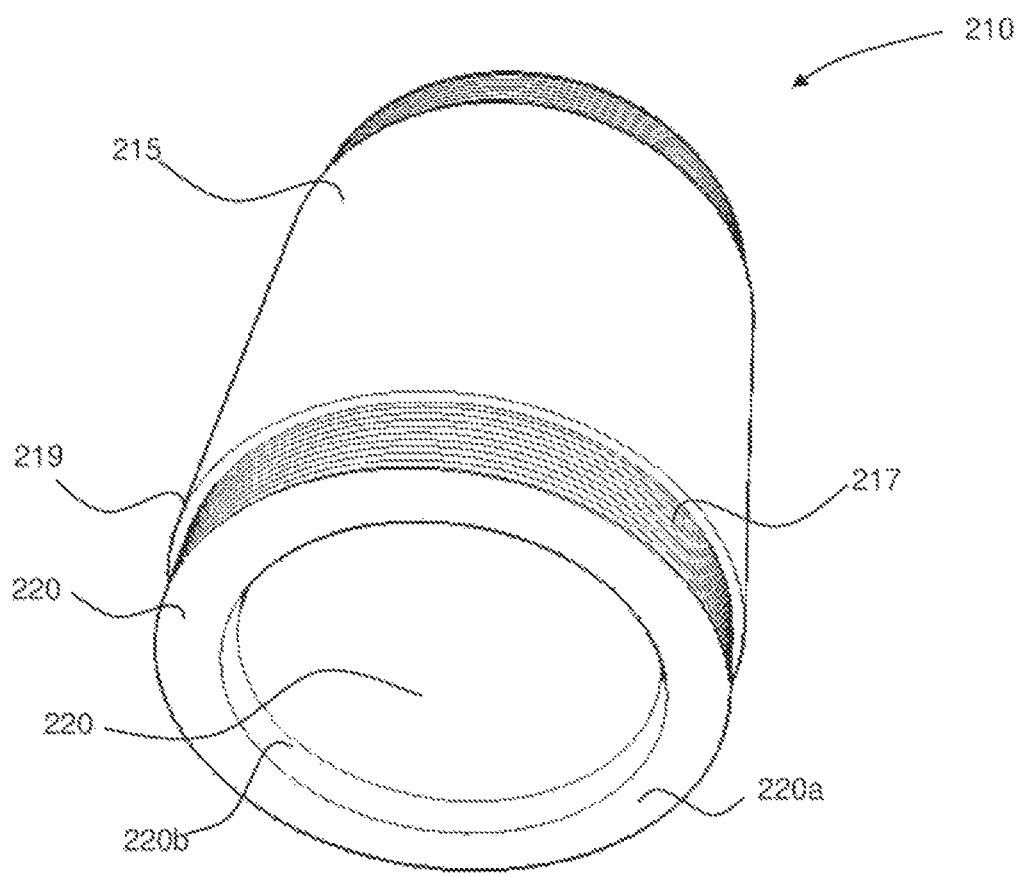
FIG. 11 is a perspective view of a connector body, a component of the pipe assembly of FIG. 8.

Referring to FIG. 11, the connector body 204 defines a sleeve 210 in the form of a generally hollow cylinder having opposing open ends, approximately 200 mm in length, and with a bore of between 100.08 and 100.11 mm in this embodiment, such that it can receive the free ends of the two pipes 202 with a small clearance. The sleeve 210 has an internal surface 214, which is generally planar.

The sleeve 210 has opposing end surfaces 220. As can be seen most clearly from FIG. 11, the end surfaces 220 of the sleeve 210 are made up of a first surface portion 220a and a second surface portion 220b. The surface portion 220a is radial, i.e. it projects in a substantially perpendicular direction to the longitudinal axis of the sleeve 210, and is substantially flat in this embodiment. Connecting the surface portion 220a to the internal surface 214 is the surface portion 220b. The surface portion 220b is angled, having an angle of approximately 12° to the longitudinal axis of the sleeve 210 and 24° inclusive in this embodiment. The angled surface portion 220b is substantially flat in this embodiment.

Substantially adjacent the end surfaces 220 at each end of the sleeve 210, between the end surface 220 and the external surface 215, is a threaded portion 217. The threaded portion 217 extends around the entire external circumference of the sleeve 210. The outer diameter of the sleeve 210 is lower for the extent of the threaded portion 217 than the outer diameter of the remainder of the sleeve 210, such that the nut 240 can be received on the end of the sleeve 210. Further, the lower outer diameter of the threaded portion 217 creates a surface 219, perpendicular to the external surface 215 of the sleeve 110 (or the longitudinal axis of the sleeve 110).

The olive 230 is composed in substantially the same way as the olive 130 of the first embodiment and will not be described again.

Figure 12A:
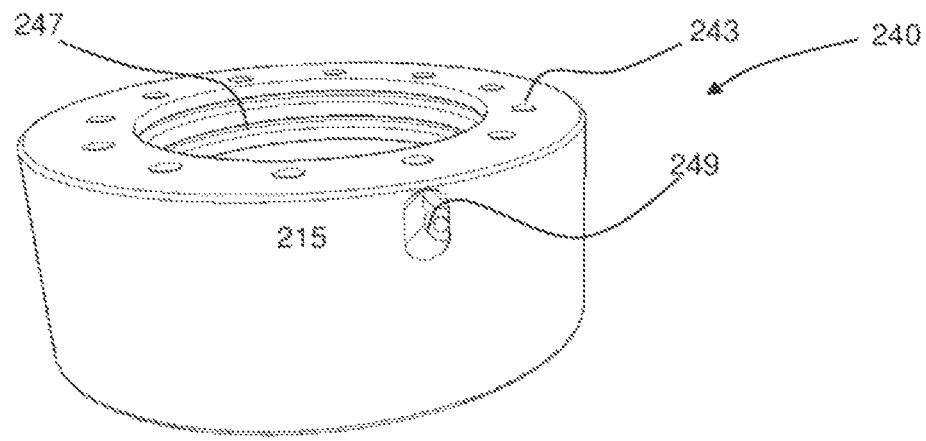
FIGS. 12A and 12B are perspective views of a nut, a component of the pipe assembly of FIG. 8.
Figure 12B:
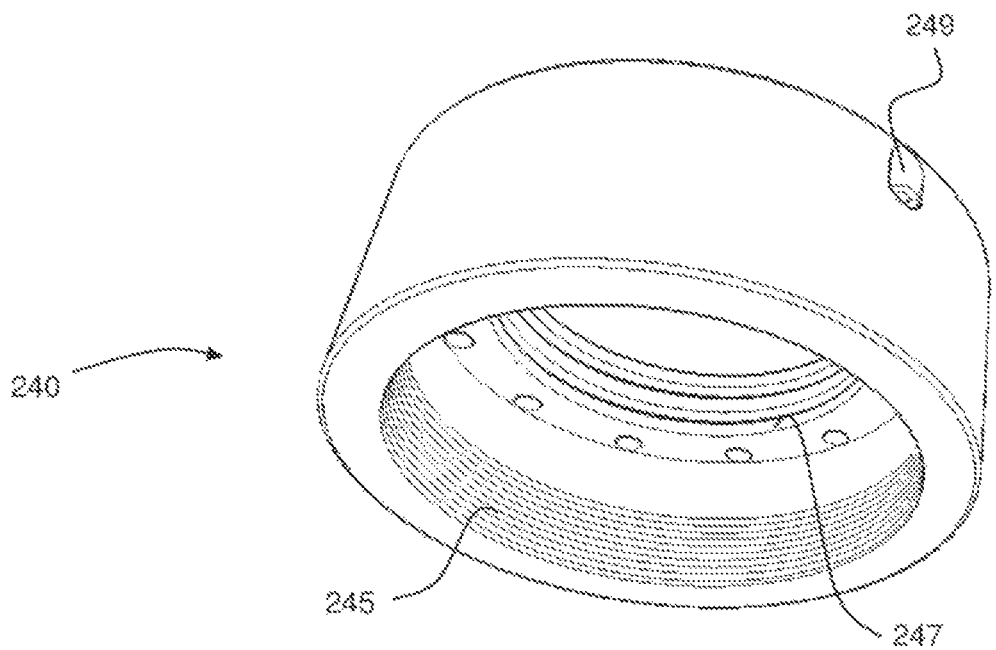

Referring to FIGS. 10, 12a and 12b, the nut 240 is generally u-shaped in cross-section. The nut 240 generally defines an annular portion 242, and an annular portion 244. The bore of the annular portion 242 is between 100.08 and 100.11 mm in this embodiment (i.e. sufficient to fit a 100 mm pipe, with a small clearance). The bore of the annular portion 244 is greater than the bore of the annular portion 242, and is approximately equal to the external diameter of the sleeve 210 and the external diameter of the annular portion 230a of the olive 230; in this embodiment about 150 mm. For the purposes of this description, it will be assumed that the annular portion 242 is the front of the nut 240 and the annular portion 244 is the rear of the nut 240.

The annular portion 242 has an internal surface 242a, an external surface 242c and a front surface 242b, that connects the internal surface 242a and the external surface 242c. The internal surface 242a and the external surface 242c are parallel, and the front surface 242b is perpendicular to both surfaces. Distributed evenly around the front surface 242b, on an appropriate pitch circle, are a plurality of apertures 243. In this embodiment, there are twelve circular apertures 243, but any suitable shape and number of apertures 243 may be included. The apertures 243 pass through the entire depth of the annular portion 242, i.e. from the front surface 242b to a rear surface 242d.

Connected to the annular portion 242 is the annular portion 244. The annular portion 244 has an internal surface 244a and an external surface 244c. The external surface 244c is coplanar to the external surface 242c, such that the two surfaces form a continuous planar surface. The internal surface 244a is parallel to the external surface 244c. The internal surface also has a rear surface 244d connecting the internal surface 244a to the external surface 244c, the rear surface 244d being perpendicular to both the internal surface 244a and the external surface 244c.

On the internal surface 244a of the annular portion 244, generally adjacent the rear surface 244d, is a threaded portion 245. In this embodiment, the threaded portion 245 extends around the entire internal circumference of the annular portion 244 of the nut 240 and corresponds to the threaded portion 217 of the sleeve 210 such that, in use, the nut 240 engages the sleeve 210 to create a secure threaded connection. This advantageously creates a large amount of rigidity in the assembly 200.

The internal surface 242a includes two grooves 247, located generally adjacent the front surface 242b of the annular portion 242. Each groove 247 extends around an entire internal circumference of the annular portion 242. The grooves 247 are generally semi-circular in cross-section and can be formed by any suitable method, such as machining. It will be appreciated, however, that each groove 247 may be of any suitable shape in cross-section, may only extend for a partial internal circumference of the annular portion 242 of the nut 240, and there may be either more or less grooves included. The external surface 242c includes at least one aperture 249. The aperture 249 is located longitudinally level with at least one groove 247, creating a passage from the external surface 244c to the grooves 247.

In this embodiment, the assembly 200 further includes a resilient washer 250, which is composed in substantially the same way as the resilient washer 150 of the first embodiment and will not be described again.

To assemble the components of the assembly 200, taking each pipe 202 individually, the two grooves 203 are machined into the pipe, the grooves being spaced from the free end such that, in use, they line up with the grooves 247 on the nut 240. Then, the nut 240 is slid onto the pipe 202. Next, the washer 250 is slid on to the pipe 202. The washer 250 is dimensioned to have an internal diameter similar to the pipe 202 and an external diameter similar to the bore of the annular portion 244 of the nut 240. Therefore, the washer 250 fits in the bore of the annular portion 244 and contacts the rear surface 242d of the annular portion 242. The olive 230 is then slid on to the pipe 202, such that the front surface 234 of the annular portion 230a contacts the washer 250, and the olive 230 is housed within the bore of the annular portion 244. The washer 250 is arranged such that the shoulder 254 of the washer 250 abuts the front surface 234 of the olive 230 in use. This enables the washer to deflect about its shoulder to sustain the force and substantially limit the movement of the olive 230.

The sleeve 210 is slid on to the pipe 202 next. The nut 240 is then screwed back over the sleeve 210, in the direction of the end of the pipe 202, until the rear surface 244d abuts the surface 219 of the sleeve 210, and the threaded portions 217 and 245 are engaged. When the nut 240 is in contact with the surface 219 of the sleeve 210, the grooves 247 of the nut 240 line up with the grooves 203 of the pipe 202, creating a channel between the nut 240 and the pipe 202.

The same process is repeated on the other pipe 202 of the joint such that the assembly bridges the gap between two pipes 202.

A separate length of wire 260 is threaded through each of the apertures 249, and through the passages created between the corresponding components. The wire 260 provides sufficient strength to prevent or limit the relative movement of the components of the assembly axially, i.e. along the longitudinal axis of the sleeve 210. Each length of wire 260 is dimensioned to fit within at least one of the passages and have an appropriate length. In this embodiment, it is held in place by square plugs. This is advantageous as a user simply needs an Allen key for installation of the assembly 210. It will be appreciated though, that any suitable method could be used to hold the wire in place. The wire referred to in all embodiments of the invention is generally wire rope, but is not limited to wire rope and could alternatively be solid wire. As the wires 260 are loaded during the installation of the mechanical seal arrangement and connector body, any movement of the pipes is isolated from the remainder of the components.

A plurality of bolts 252 are then inserted through the apertures 243 from the front surface 242b in the direction of the rear surface 242d of each nut 240. They pass through and contact the washer 250. As the bolts 252 are tightened, a force is therefore applied to the washer 250 and is transferred to the olive 230. The washer 250 advantageously ensures that the force applied by the nut 240 is maintained in use, as it can account for any natural 'flex' that may occur between the nut 240 and the olive 230, as well as any decrease in the force applied by the bolts 252 over time, or if they loosen in use. It also protects the olive 130 from abrasive damage from the bolts 252.

The force applied by the bolts 252 compresses the olive 230 in the direction of the sleeve 210. Specifically, the angled surface 238 of the olive 230 engages the angled surface 220b of the sleeve 210. The angled surfaces interface and the olive 230 conforms to the greater angle of the surface 220b of the sleeve 210. This creates a strong mechanical seal between the sleeve 210 and the olive 230. The tapered design encourages the performance of the seal to increase as the pressure within the pipe increases.

Therefore, in use, oil can pass from one pipe 202 to another pipe 202 under high pressure with a very low risk of leakage due to the strong mechanical seal created by the assembly 200.

Figure 13:
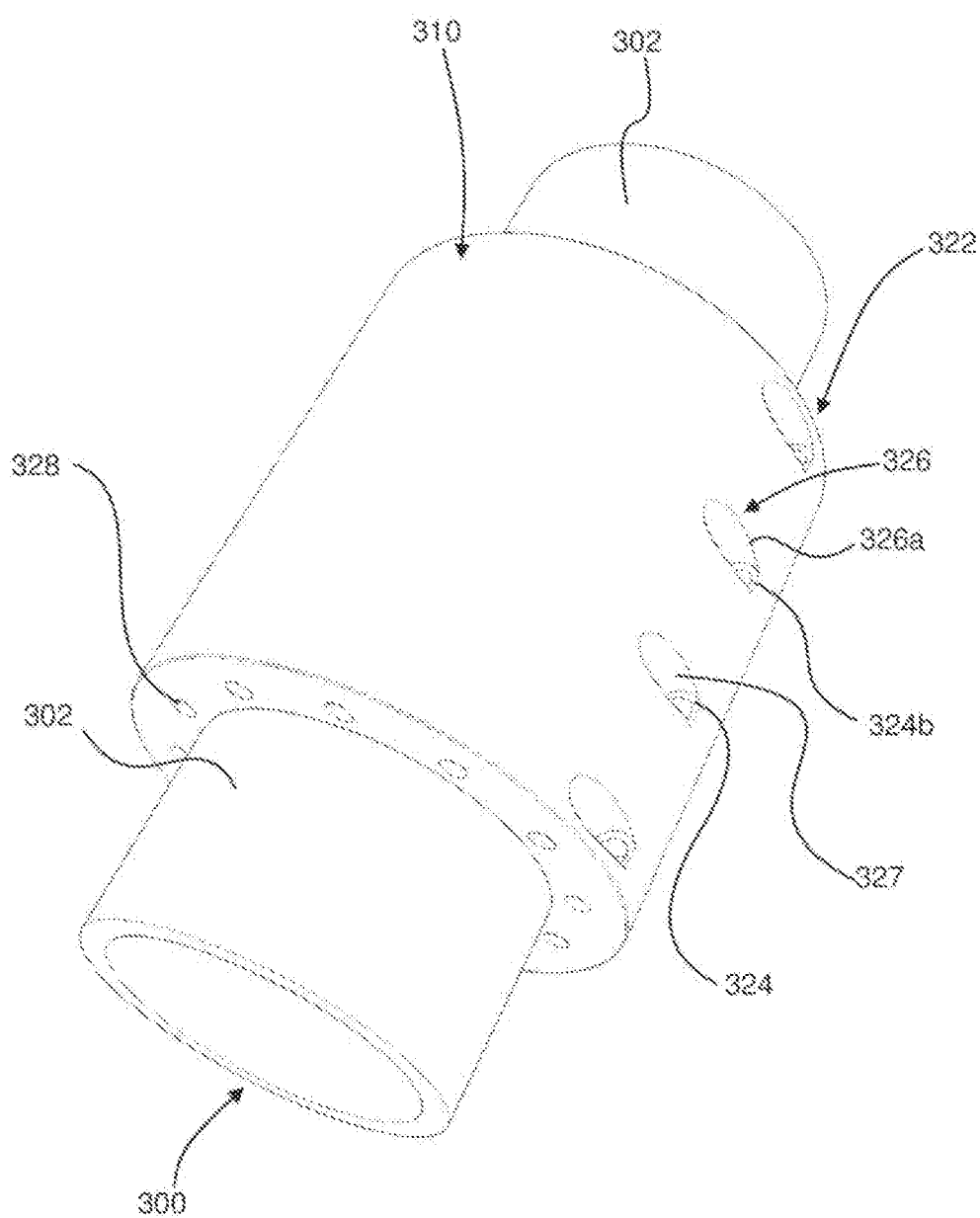
FIG. 13 is a perspective view of a pipe assembly according to an aspect of the invention.
Figure 14:
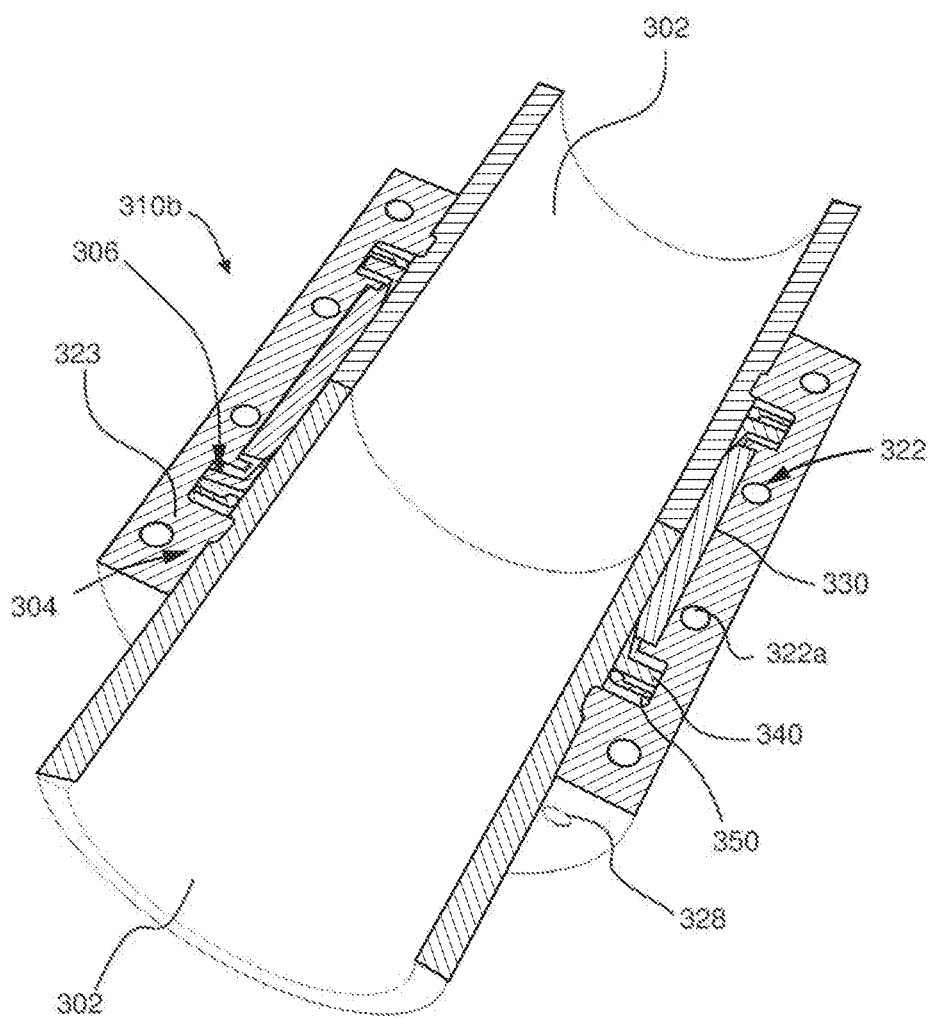
FIG. 14 is a cut-away perspective view of the pipe assembly of FIG. 13 through a horizontal plane, showing the components that make up the pipe assembly.
Figure 15:
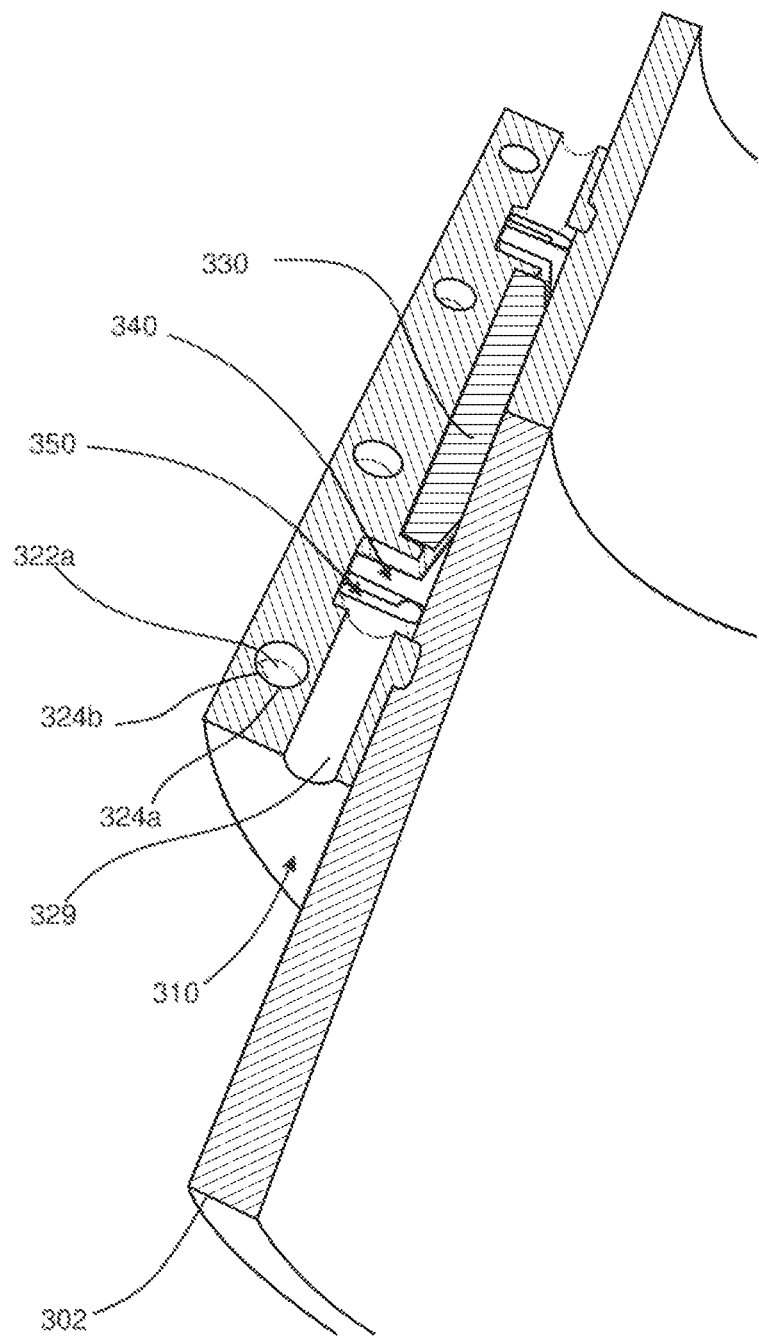
FIG. 15 is a close-up view of the pipe assembly of FIG. 13.

Referring now to FIGS. 13 to 15, a connector assembly connecting two pipes in fluid communication is indicated generally at 300.

The assembly is suitable for a range of fluids, both liquid and gas, for example oil, foodstuffs and other applications that the skilled person would appreciate. The assembly includes two pipes 302, bridged by a split housing, which is a connector body 310 in this embodiment. The connector body 310 is configured to accept the two pipes 302.

As will be described in more detail below, axial movement of the pipes 302 relative to the connector body 310 is prevented or limited by a mechanical interlock arrangement 304. A mechanical seal arrangement 306 provides a seal between the pipes 302 and the connector body 310. The mechanical seal arrangement 306 includes metallic elements such as, in this embodiment, a sleeve 330 and metal olive 340. In this embodiment, a compressive force is provided on the olive 330, in use, creating a seal between the olive 340 and the sleeve 330.

Figure 16A:
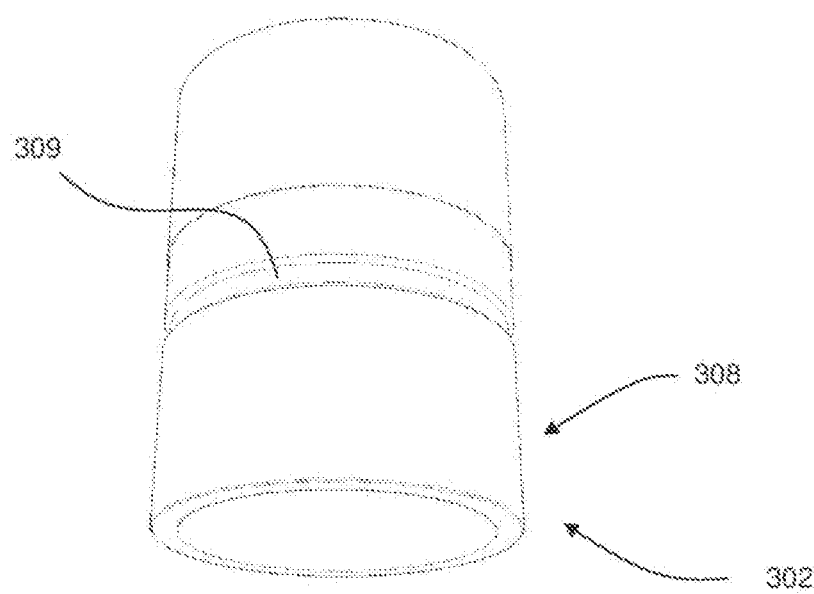
FIG. 16A is a perspective view of a pipe, a component of the pipe assembly of FIG. 13.
Figure 16B:
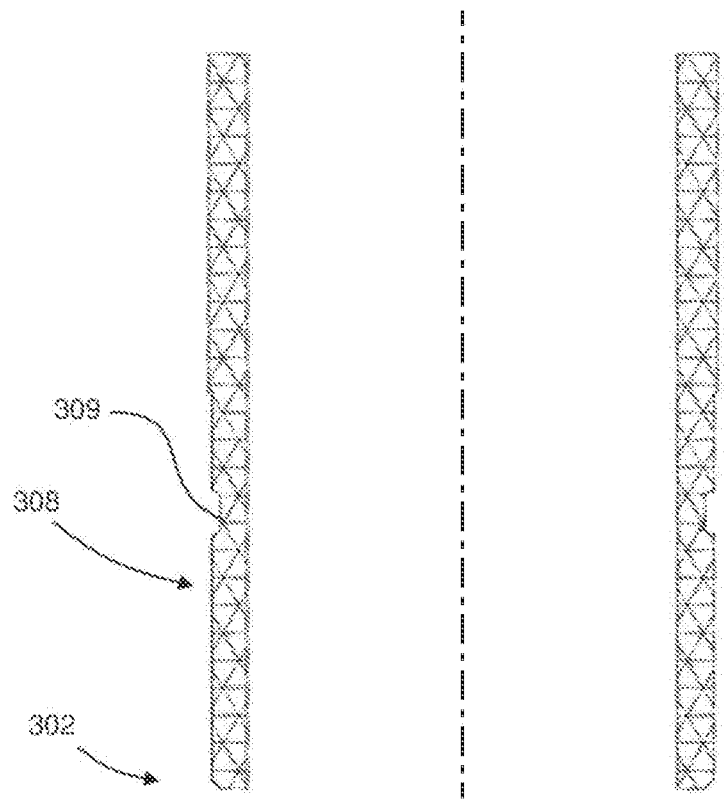
FIG. 16B is a cross-sectional view of the pipe of FIG. 16A.

In this embodiment, each pipe 302 is approximately 300 mm in diameter (i.e. a relatively large diameter pipe suitable for transporting oil, or the like, at high pressure). As shown in FIGS. 16A and 16B, each pipe 302 has a machined portion 308. In this embodiment, the machined portion 308 extends approximately 90 mm in a longitudinal direction from the free end of each pipe. It is generally of a lower external diameter than the remainder of the pipe, e.g. in this embodiment the external diameter of the machine portion is 113 mm, compared to the stock external pipe diameter of 114.8 mm. A groove 309 is provided in each pipe 302. Each groove 309 extends around an entire external circumference of the pipe 302. The grooves 309 are generally rectangular in cross-section and can be formed by any suitable method, such as machining. In this embodiment, the groove 309 is 10.5 mm wide in cross-section, with a 2 mm radius on each corner. The radius enables a corresponding projection to be easily inserted into the groove (described in more detail below). It will be appreciated, however, that each groove 309 may be of any suitable shape in cross-section and may only extend for a partial external circumference of the pipe. The external edge of the free end of each pipe 302 is also chamfered, with a 0.5 mm chamfer in this embodiment. The chamfer helps to break up the edge of the pipe, and can help prevent build up on the edge of the pipes, e.g. in the pipes are being used in applications that are required to be sanitary. The smaller gap can also help to prevent corrosion.

Figure 17C:
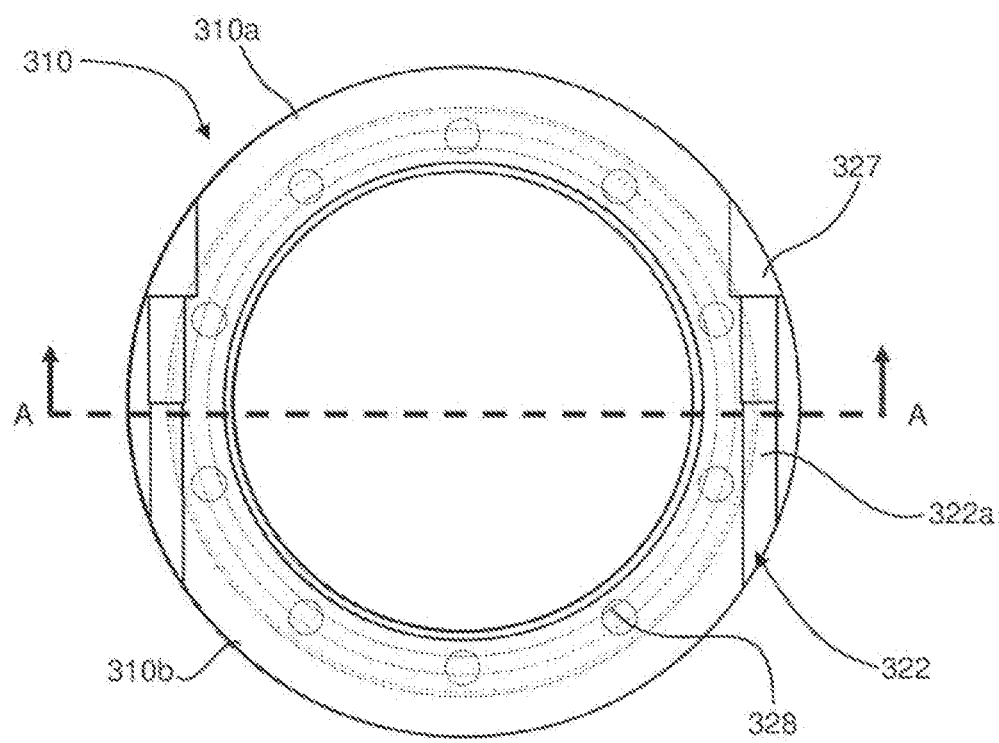
FIG. 17C is a front view of the connector body of FIG. 17A.

Referring now to FIGS. 17A to 17D, the connector body 310 is in the form of a generally hollow cylinder having opposing open ends. In this embodiment, the pipe connector is approximately 175 mm in length. Although generally a hollow cylinder, the connector body 310 is manufactured in two parts. The connector body 310 is split in two along a horizontal plane A-A extending in the direction of the longitudinal axis of the connector body 310, as illustrated in FIG. 17C. In practice, this means the two halves of the connector body 310 can be brought together in order to surround two pipes 302. The internal surface of the connector body 310 includes a plurality of projections and recesses that help form the mechanical interlock arrangement 304, as well as accommodate the mechanical seal arrangement 306 (described in more detail below).

The connector body 310 is symmetrical across a transverse central axis. Therefore, the connector body 310 will be described starting from one longitudinally outer end, the left end as shown in FIG. 17B.

An outer portion 312 of the connector body 310 includes a front surface 312a, substantially perpendicular to the longitudinal axis of the connector body 310 in this embodiment, and an external surface 312b, parallel to the longitudinal axis of the connector body 310, and substantially extending between the two opposing front surfaces 312a. More specifically, each surface 312a is connected to the surface 312b by a radiused corner, a 2 mm radius in this embodiment. The outer portion 312 also has an internal surface 312c, which is concentric with the external surface 312b. The connector body 310 can house the two pipes 302 with, at most, a very small clearance. In this embodiment, the external surface 312b has a bore of between 113 mm and 113.3 mm.

Adjacent the outer portion 312 is an inwardly projecting portion 314. The projecting portion 314 has an internal surface 314c parallel with the longitudinal axis of the connector body, defining a 109.2 mm bore through this section of the connector body, in this embodiment. The internal surface 314c is connected to the internal surface 312c by a radiused corner, with a 2 mm radius in this embodiment. The projecting portion 314 is dimensioned to correspond to the groove 309 provided in each pipe 302, such that the projecting portion 314 fits in the groove 309.

Adjacent the projecting portion 314 is a channel 316. The channel 316 is generally rectangular, in this embodiment, and is intended to accommodate components that contribute to the mechanical seal arrangement 306 (described in more detail below). The channel 316 has a front surface 316a, that is parallel to the front surface 312a, and is connected to the internal surface 314c by a radiused corner, with a 2 mm radius in this embodiment. The front surface 316a extends outwardly to meet an internal surface 316c, which is concentric with the external surface 312b. Adjacent the internal surface 316c is a rear surface 316d, which is parallel with the front surface 316a but extends inwardly to a lesser degree than the surface 316a. Connecting the front surface 316a and the internal surface 316c is a radiused corner, with a radius of 1 mm in this embodiment. Similarly, the internal surface 316c is connected to the rear surface 316d with a radiused corner, also with a radius of 1 mm in this embodiment.

The rear surface 316d defines a front surface of a shoulder 318. The internal surface 318c is concentric with the external surface 312b, and defines a bore in this section of 120.5 mm in this embodiment. A rear surface 318d of the shoulder 318 is parallel with the rear surface 316d, but extends downwardly from the internal surface 318c to a lesser amount than the rear surface 316d extends downwardly from the internal surface 318c.

Between the two rear surfaces 318d therefore, a recess 320 is defined. An internal surface 320c connects the two rear surfaces 318d to each other, and forms a section with a bore of about 129 mm in this embodiment. The recess 320 is dimensioned such that it can seat the sleeve 330 (described in more detail below).

Figure 17D:
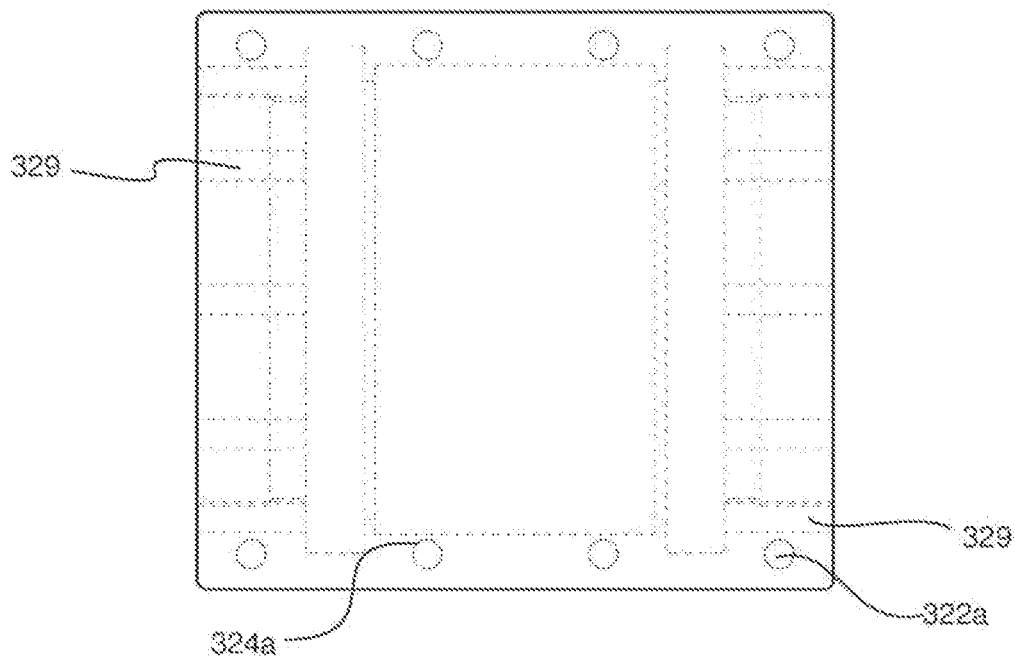
FIG. 17D is a plan view of the connector body of FIG. 17A.

As shown most clearly in FIG. 17C, the connector body 310 is divided into two halves 310a, 310b that can be brought together, and coupled, to surround the pipes 302. As shown in FIG. 17D, each half 310a, 310b of the connector body 310 includes a plurality of apertures 322. When the two halves 310a, 310b of the connector body 310 are brought together, each aperture 322 on the first half 310a lines up with a corresponding aperture 322 on the second half 310b. This arrangement of the apertures defines a plurality of bores 322a that extend in a direction perpendicular to the plane A-A (shown in FIG. 17C), and also in a direction perpendicular to the flat internal surfaces 323 of each connector body half (shown in FIG. 14).

The bores 322a extend from the external surface 312b of the first half of the connector body 310a to the external surface 312b of the second half of the connector body 310b. If a bolt, for example, is placed through the bore 322a, it can be seen that the first and second halves 310a, 310b would be substantially secured from relative movement in a transverse and longitudinal direction.

In this embodiment, when the connector body 310 is viewed in plan as in FIG. 17D, the apertures 322 are distributed longitudinally along the outer peripheries of the connector body halves 310a, 310b. In this embodiment, there are eight apertures 322 on the first half 310a (four on each side), corresponding to eight apertures 322 on the second half 310b, such that a plurality of bores 322a are defined through the connector body, as described above.

As can also be seen in FIG. 17C, the apertures 322 are configured differently on the first half of the connector body 310a than the second half of the connector body 310b. A planar annular surface 324 is provided that surrounds an opening of the bore 322a. It will be appreciated that the annular surface 324 may be provided on the first or second halves 310a, 310b of the connector body 310. The plane of the annular surface 324 is perpendicular to the direction of the bore 322a of the aperture 322. It provides a surface to be engaged by a connecting member, e.g. the head of a bolt, when the first and second halves of the connector body 310a, 310b are coupled. When viewed in plan, the annular surface 324 is shaped like a cut-off circle, with a circular portion 324a and a flat edge 324b. The flat edge 324b is parallel with the longitudinal axis of the connector body 310 and is adjacent a traverse edge of the connector body 310, when viewed in plan, as in FIG. 17C.

A substantially tear shaped groove 326 is defined around the annular surface 324. The groove 326 follows the profile of the external surface 312b of the connector body 310, i.e. it curves around the connector body circumferentially. The outline of the groove 326 is a cut-off ellipse, with an elliptical portion 326a extending from the flat edge 324b of the annular surface 324. The elliptical portion 326a of the groove 326 (shown in FIG. 13) connects to the circular portion 324*a* of the annular surface 324 by a generally concave internal surface 327. Therefore, it can be seen that a void is defined between the annular surface 324 and the external surface 312*b* of the connector body 310. This enables a connecting member, such as a bolt, to be easily inserted by a user during installation. It also enables a bolt head, for example, to sit flush with the annular surface 324 in use, securing the first and second halves of the connector body 310*a*, 310*b* together strongly.

Distributed evenly on the front surface 312*a*, on an appropriate pitch circle, are a plurality of circular apertures 328. The openings of the apertures 328 are flush with the front surface 312*a*. The apertures 328 extend longitudinally through the outer portion 312 and the projection 314 to the front surface of the channel 316, creating a plurality of channels 329 through the depth of the outer portion 312 and projection 314 of the connector body 310. In this embodiment, there are ten apertures 328 on each front surface 312*a*, but it will be appreciated that any appropriate number of apertures may be provided, for example eight, or twelve.

Figure 18A:
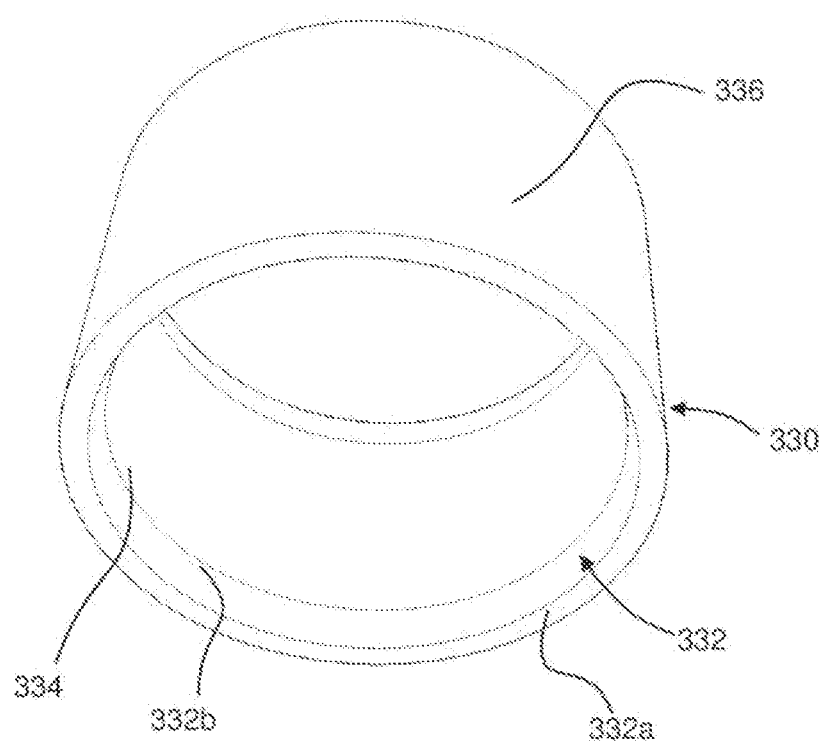
FIG. 18A is a sleeve, a component of the pipe assembly of FIG. 13.
Figure 18B:
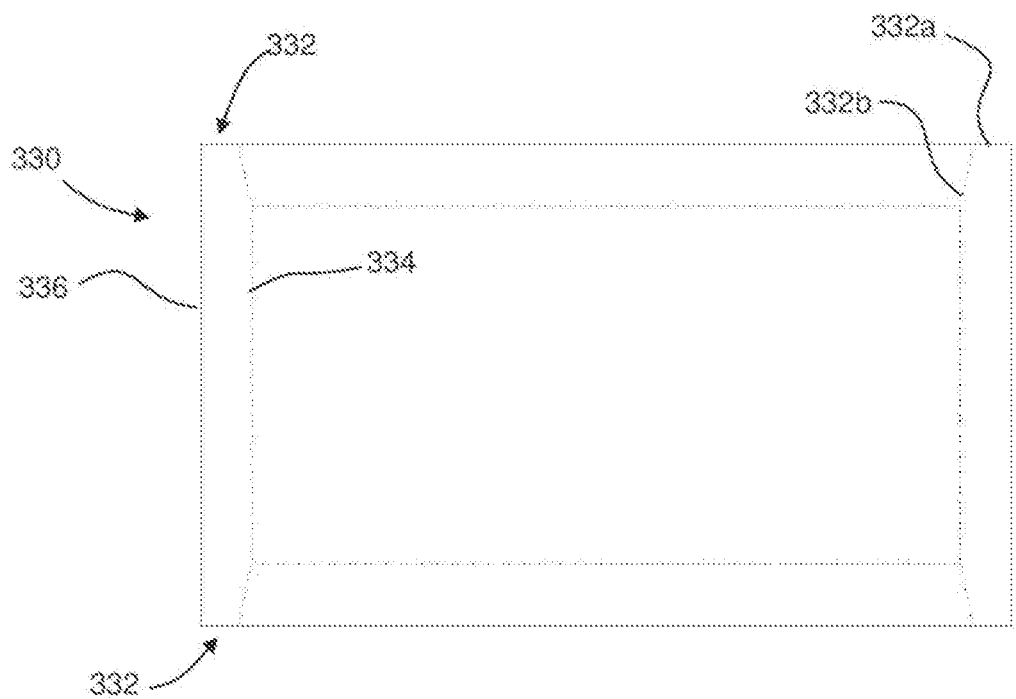
FIG. 18B is a cross-sectional view of the sleeve of FIG. 18A.
Figure 19A:
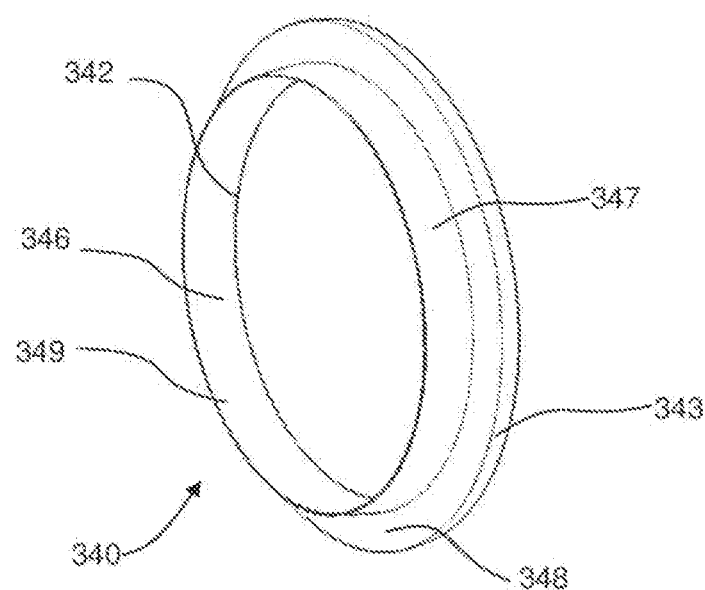
FIG. 19A is a perspective view of an olive, a component of the pipe assembly of FIG. 13.
Figure 19B:
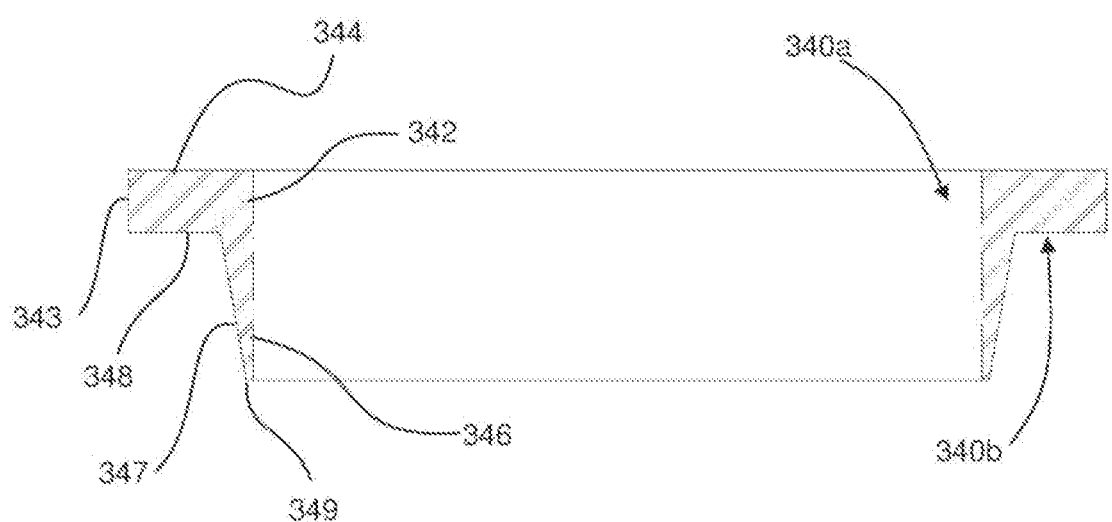
FIG. 19B is a cross-sectional view of the olive of FIG. 19A.

Seated within the recess 320 of the connector body 310 is the sleeve 330. As shown in FIGS. 18A and 18B, the sleeve 330 is generally a hollow cylinder with opposing end surfaces 332. The sleeve 330 has an internal surface 334 and an external surface 336. The external surface 336 is dimensioned such that the sleeve 330 can fit within the recess 320 with a small clearance, e.g. in this embodiment the longitudinal length of the external surface 336 is 76.8 mm. As can be seen most clearly from FIG. 18B, the end surfaces 332 of the sleeve 330 are made up of a first surface portion 332*a* and a second surface portion 332*b*. The surface portion 332*a* is radial, i.e. it projects in a substantially perpendicular direction to the longitudinal axis of the sleeve 330, and is substantially flat in this embodiment. Connecting the surface portion 332*a* to the internal surface 334 is the surface portion 332*b*. The surface portion 332*b* is angled, having an angle of approximately 12° to the longitudinal axis of the sleeve 330 and 24° inclusive in this embodiment. The angled surface portion 332*b* is substantially flat in this embodiment.

Referring to FIGS. 18A and 18B, the olive 340 is composed of two annular portions 340*a* and 340*b*. The annular portion 340*a* is generally rectangular in cross section, i.e. an internal surface 342 and an external surface 343 of the annular portion 340*a* are parallel. The annular portion 340*a* has a front surface 344 that connects the internal surface 342 and the external surface 343. Projecting in a generally perpendicular direction from the front surface 344 is the annular portion 340*b*. The annular portion 340*b* is generally tapered. The annular portion 340*b* has a smaller external diameter than the annular portion 340*a*. The annular portion 340*b* has an internal surface 346 that is coplanar to the internal surface 342, such that the two surfaces form a continuous planar surface, creating a constant bore through the olive 340. The annular portion 340*b* also has an external surface 347. The external surface 347 is angled, at approximately 10° to the plane of the internal surface 346 and 20° inclusive in this embodiment, to create the taper of the annular portion 340*b*. The external surface 347 is generally flat. Connecting the external surface 347 to the external surface 343 is a first rear surface 348 of the olive 340. Connecting the internal surface 346 to the external surface 347 is a second rear surface 349 of the olive 340. The first rear surface 348 and the second rear surface 349 both project in a substantially perpendicular direction to the longitudinal axis of the olive 340. The first rear surface 348 and the second rear surface 349 are both flat surfaces in this embodiment.

In this embodiment, the assembly 300 further includes a resilient washer 350, with an appropriate internal diameter such that a washer 350 fits on each pipe 302 with a very small clearance, e.g. in this embodiment, the internal diameter is 113 mm. Referring now to FIGS. 20A to 20C, the washer 350 is a spring washer. The washer 350 is annular, with a generally 'b/p shaped' cross section. It has a front surface 352 and a rear surface 354. The front surface 352 and the rear surface 354 are connected by two substantially curved transitions. At the radially outer edge of the washer 350, the front surface 352 is connected to the rear surface 354 by a first curved transition 358 that defines the outer diameter of the washer. Looking in cross-section, the curved transition 356 is made up of a flat surface 356*b*, and two curved surfaces, 356*a* and 356*c*. The flat surface 356*b* is perpendicular to the front surface 352 and the rear surface 354. The flat surface 356*b* is 1 mm long in this embodiment. Connecting the flat surface 356*b* to the front surface 352 is the curved surface 356*a*. Connecting the flat surface 356*b* to the rear surface 354 is the curved surface 356*c*. The curved surfaces 356*a* and 356*c* are both convex, and have a radius of 0.5 mm in this embodiment. At the radially inner edge of the washer 350, the front surface 352 is connected to the rear surface 354 by a second curved transition 358 that defines the inner diameter of the washer. Looking in cross-section, the curved transition 358 is made up of two flat surfaces, 358*b* and 358*d*, and four curved surfaces 358*a*, 358*c*, 358*e*, and 358*f*. The flat surface 358*b* is perpendicular to the front surface 352 and the rear surface 354. The flat surface 358*b* is 0.2 mm long in this embodiment. The flat surface 358*d* is parallel to the front surface 352 and the rear surface 354. The flat surface 358*d* is 1.2 mm long in this embodiment. Connecting the flat surface 358*b* to the front surface 352 is the curved surface 358*a*. Connecting the flat surface 358*b* to the flat surface 358*d* is the curved surface 358*c*. The curved surfaces 358*a* and 358*c* are both convex, and have a radius of 1.9 mm in this embodiment. Connecting the flat surface 358*d* to the rear surface 354 are two curved surfaces, 358*e* and 358*f*. The curved surface 358*e* is adjacent the flat surface 358*d* and is convex, with a radius of 1.5 mm in this embodiment. The curved surface 358*f* is adjacent the rear surface 354 and is convex, with a radius of 0.5 mm in this embodiment. The washer 350 is typically made of metal, such as steel. Preferably a sprung steel will be used, with a high yield strength and high elastic modulus, such as medium/high carbon-steel, but any suitable material can be used. It will also be appreciated that any suitable type of resilient washer may be used. It will be appreciated that the 'springiness' shape is a function of both the described geometrical shape of the washer and the material the washer is made from.

To assemble the components of the assembly 300, firstly the free end of each pipe 302 is machined to form the machined portions 308, and the grooves 309 in the appropriate places on the pipes 302. Then, taking each pipe 302 individually, the washer 350 is slid on to the free end of the pipe 302. The olive 340 is then slid on to the free end of the pipe 302. The sleeve 330 is slid on to the pipe 302 next. At this point, the two pipes 302 are brought together, such that the sleeve 330 bridges the gap between the pipes.

The two halves 310*a*, 310*b* of the connector body 310 are brought around the pipes 302, the sleeve 330, the olives 340, and the washer 350. The projections 314 of the connector body 310 correspond with the grooves 309, so engage the grooves 309 of the pipes 302, to prevent or limit axial movement of the connector body 310 relative to the free end of the pipes 302. The washer 350 and the olive 340 are accommodated within the channel 316. The washer 350 is dimensioned to have an internal diameter similar to the external diameter of the pipe 302 and an external diameter similar to the bore of the internal surface 316c. Therefore, the washer 350 fits in the channel 316 and contacts the front surface 316a of the channel 316. The front surface 344 of the annular portion 340a of the olive 340 contacts the washer 350. The washer 350 is arranged such that the curved transition 358 of the washer 350 abuts the front surface 344 of the olive 340 in use. This enables the washer to deflect to sustain any force that is applied and substantially limit the movement of the olive 340.

To couple the first and second halves 310a, 310b of the connector body 310, connecting members are threaded through the apertures 322. For example, a plurality of threaded bolts (not shown) could be used. The body of the bolt will pass through the void created by the groove 326, and the bore 322a, of the aperture 322 and the head of the bolt will engage the annular surface 324. The body of the bolt will protrude from the opposing open end of the aperture 322 where a nut can be threaded on the body of the bolt. This substantially secures the first and second halves 310a, 310b of the connector body from relative movement in a transverse or longitudinal direction.

A plurality of bolts (not shown) are then inserted through the apertures 328 from the front surface 312a in the direction of the channel 316 of the connector body 310. They pass through the channels 329 and contact the washer 350, which is located adjacent the openings of the channels 329 in the surface 316a, as shown most clearly in FIG. 15. The bolts may have an external thread and the channels 329 may have an internal thread. As the bolts are tightened, a force is therefore applied to the washer 350 and is transferred to the olive 340. The washer 350 advantageously ensures that the force applied is maintained in use, as it can account for any natural 'flex' that may occur, as well as any decrease in the force applied by bolts over time, or if they loosen in use. It also protects the olive 340 from abrasive damage from the bolts.

The force applied by the bolts acts on the olive 340 in the direction of the sleeve 330. Specifically, the angled surface 347 of the olive 340 engages the angled surface 332b of the sleeve 330. The angled surfaces interface and the olive 340 conforms to the greater angle of the surface 332b of the sleeve 330. This creates a strong mechanical seal between the sleeve 330 and the olive 340.

Therefore, in use, oil can pass from one pipe 302 to another pipe 302 under high pressure with a very low risk of leakage due to the strong mechanical seal created by the assembly 300.

Figure 21:
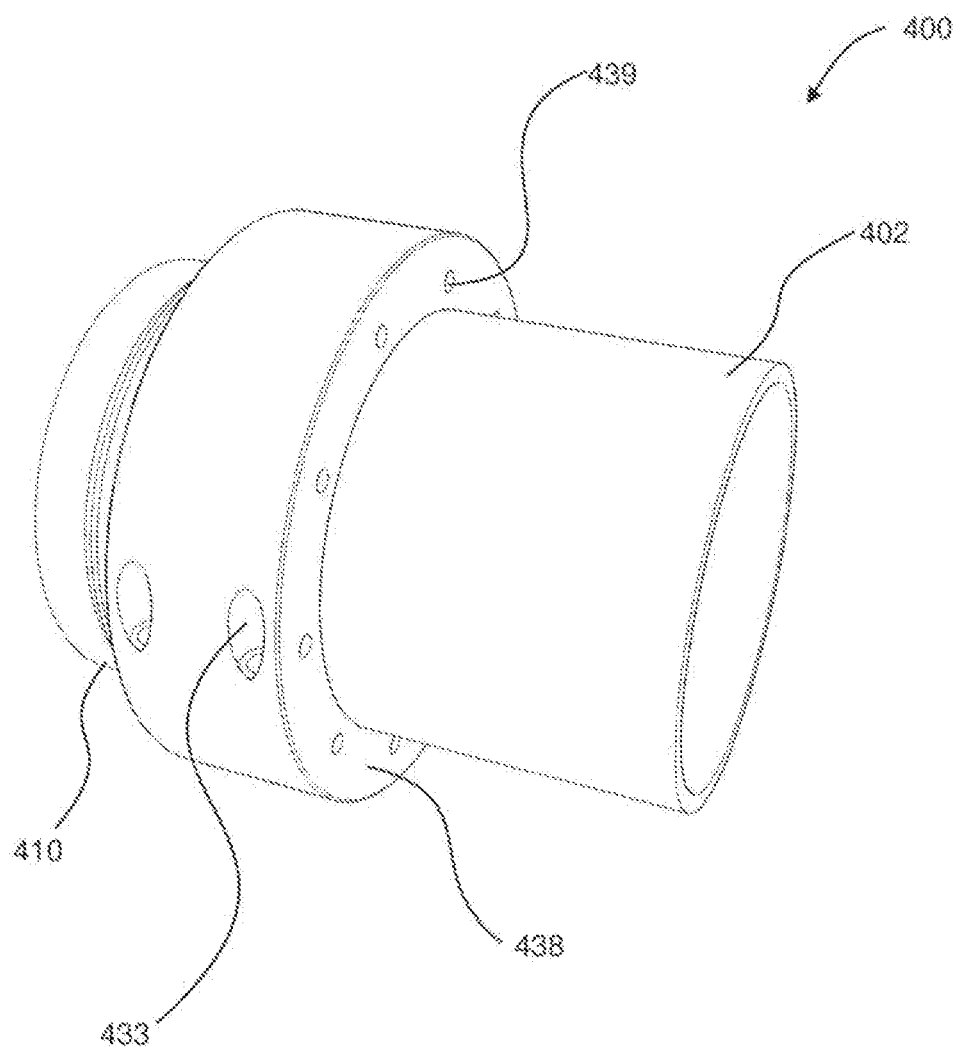
FIG. 21 is a perspective view of a further aspect of the invention, showing a coupling arrangement, located between a pipe and a connector.
Figure 22:
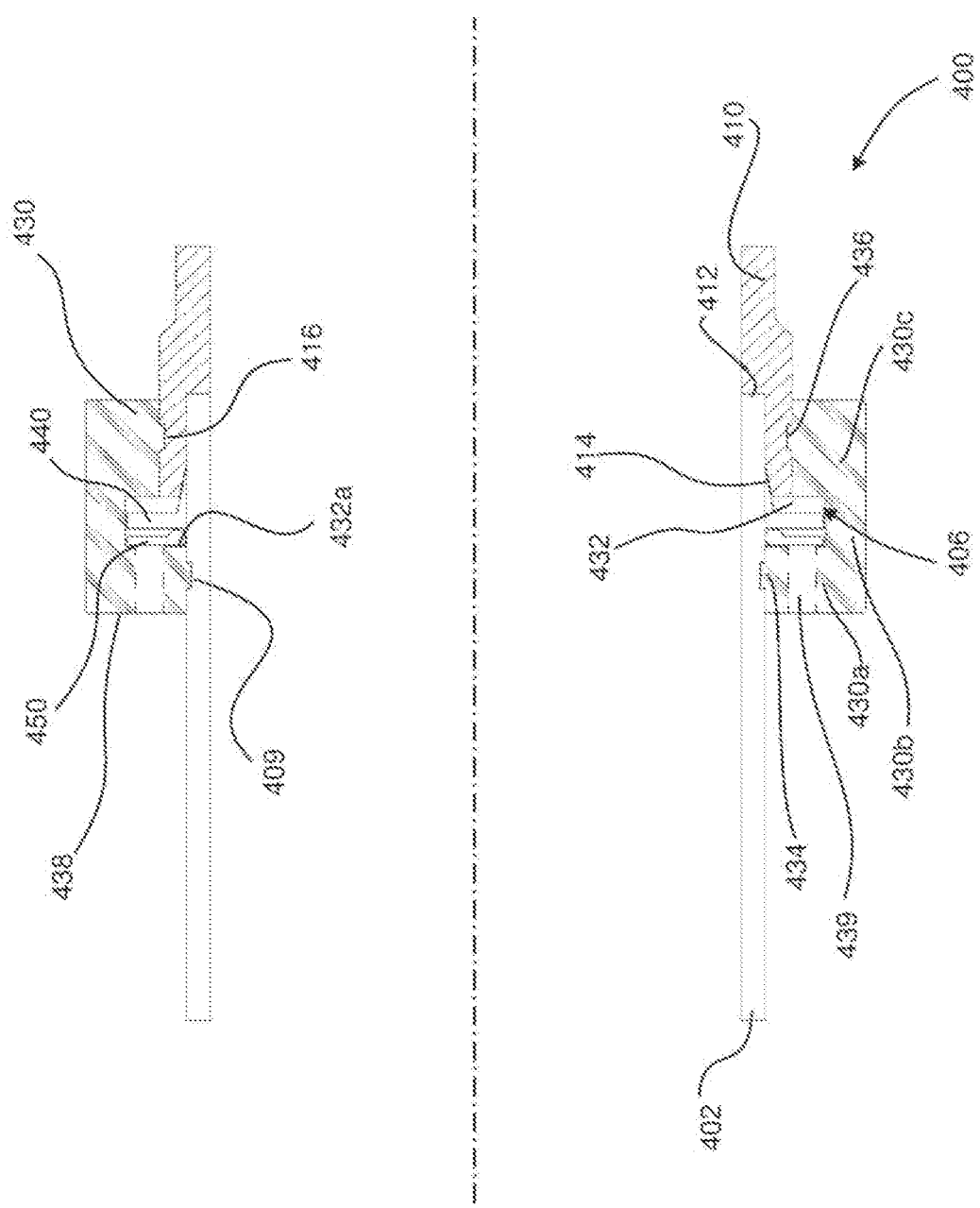

Referring now to FIGS. 21 and 22, a coupling arrangement is indicated generally at 400. The coupling arrangement 400 utilises the same mechanical seal arrangement 406 as described for the previous embodiments, except the connector body (110 of the previous embodiment) is now a connector 410 having a female open end configured to receive a male free end of a pipe 402. The connector 410 can be any type of connector that is configured to receive a pipe, such as a general pipe joint, a flexible connection, a valve, or a pipe reducer. The skilled person will appreciate any other appropriate applications of the coupling arrangement 400.

The connector 410 has an open end that receives the pipe 402. The pipe 402 includes a circumferential groove 409. In this embodiment the connector 410 has a radial internal surface 412 that engages the free end of the pipe 402. The radial internal surface 412 provides a stop for the pipe 402 when it is inserted into the open end of the connector 410 during assembly of the coupling arrangement 400.

The connector 410 also includes an internal angled surface 414. The angled surface 414 is equivalent to the surface portion 132b of the first embodiment, and is intended to engage a corresponding angled surface of an olive 450 to create a metal-to-metal seal (described in more detail below). The angled surface 414 has an angle of approximately 12° to the longitudinal axis of the connector 410, and 24° inclusive in this embodiment.

The connector 410 also includes a circumferential groove 416, with dimensions that are equivalent to the groove 409 of the pipe 402.

Axial movement of the connector 410 relative to the pipe 402 is substantially prevented or limited by a mechanical interlock arrangement. In this embodiment, a cap 430 encircles a portion of the pipe 402 and the connector 410 to help prevent separation of the pipe 402 and the connector 410 in use. As shown most clearly in FIG. 22, the cap 430 has a constant external diameter but a varying internal diameter such that three portions of the cap are defined. Starting from the left in FIG. 22, the first portion 430a has an internal diameter substantially equal to the external diameter of the pipe 402 such that the cap fits over the pipe 402 with a small clearance. The second portion 430b has a greater internal diameter 430b such that a cavity 432 is defined between the external surface of the pipe 402 and the internal surface of the second cap portion 430b. The cavity 432 is dimensioned such that it can house an olive 440 and a washer 450 of the mechanical seal arrangement 406 (described in more detail below). The third portion 430c has an internal diameter substantially equal to the external diameter of the connector 410 such that the cap 430 fits over the connector 410 with a small clearance.

A circumferential projection 434 projects from the internal surface of the first cap portion 430a. The projection 434 corresponds to the groove 409 in the pipe 402, such that the projection 434 and the groove 409 engage in use, substantially preventing relative axial movement. A circumferential projection 436 also projects from the internal surface of the third cap portion 430c. The projection 436 corresponds to the groove 416 in the connector 410, such that the projection 436 and the groove 416 engage in use, substantially preventing relative axial movement. It will be appreciated that other methods of substantially preventing relative axial movement could be used. For example, corresponding threaded surfaces could be provided, e.g. such that the cap is 'screwed' on during assembly. A front surface 438 of the cap 430 includes a plurality of apertures 439 that pass through the entire depth of the first cap portion 430a, from the front surface 438 to the cavity 432, such that openings are provided into the cavity 432 that are substantially adjacent the olive 440 and the washer 450 in use. The apertures 439 are equivalent to the circular apertures 328 of the previous embodiment, and will be not be described in any more detail.

Figure 23:
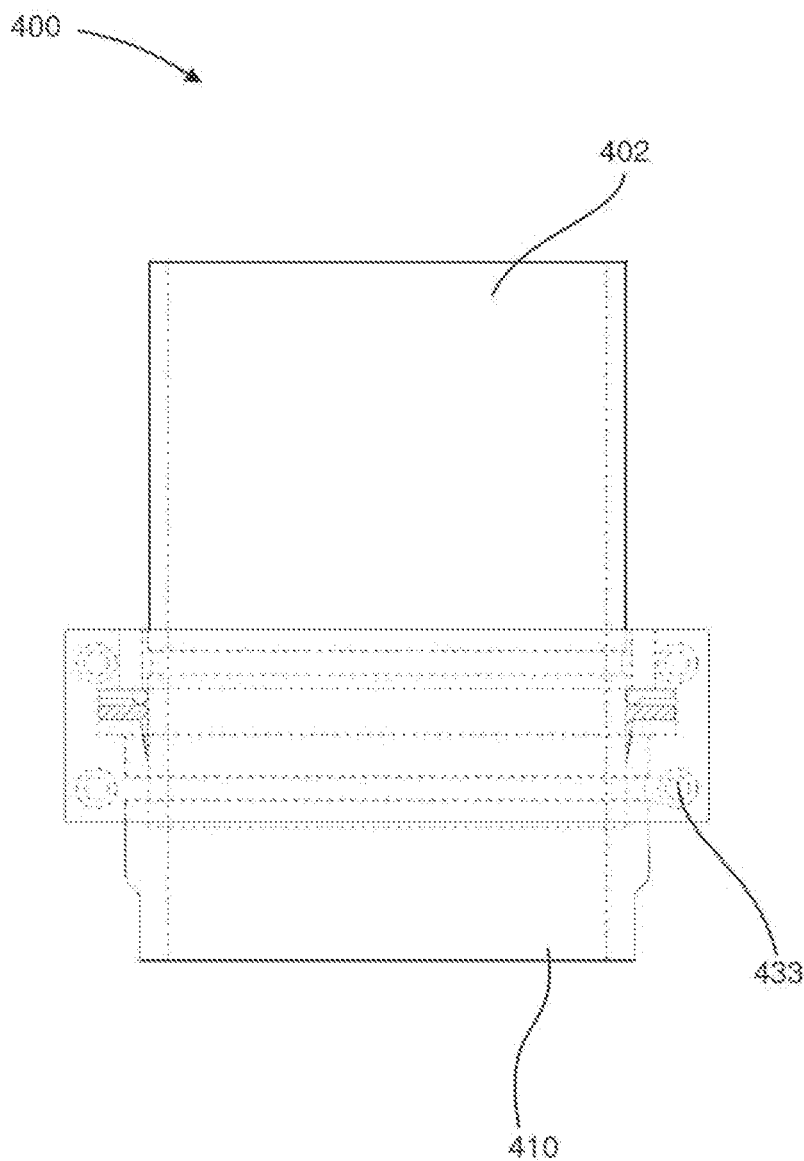
FIG. 23 is a plan view of the coupling arrangement of FIG. 21.

The cap 430 is split in two halves along a horizontal plane (not shown in Figures), equivalent to the split of the connector body 110 of the first embodiment. This enables the two halves of the cap 430 to be brought together to encircle a portion of the pipe 402 and a portion of the connector 410 during assembly of the coupling arrangement 400. It can be seen from FIG. 23 that a plurality of apertures 433 are included in the external surface of the cap 430 to enable the two halves of the cap 430 to be secured together in an equivalent way to how the two halves of the connector body 310 are secured together in the first embodiment.

The olive 440 and washer 450 are as described in the first embodiment herein.

To assemble the coupling arrangement 400, the grooves 409, 416 are made in the pipe 402 and the connector 410 respectively. The pipe 402 is then slid inside the open end of the connector 410 such that the free end of the pipe 402 engages the radial internal surface 412 of the connector 410. The olive 440 is then slid on to the pipe 402, such that the angled surface of the tapered portion of the olive 440 engages the angled surface 414 of the connector 410. The washer 450 is then slid on to the pipe 402. The two halves of the cap 430 are brought together around the pipe 402 and the connector 410, and connecting members are threaded through the apertures 433. The projections 434, 436 engage the grooves 409, 416 respectively. The olive 440 and the washer 450 are received within the cavity 432 of the cap 430.

A plurality of bolts (not shown) are then inserted through the apertures 439 from the front surface 438 in the direction of the cavity 432 of the cap 430. They pass through channels in the first cap portion 430a and contact the washer 450, which is located adjacent the openings in a front surface 432a of the cavity. The bolts may have an external thread and the channels may have an internal thread. As the bolts are tightened, a force is therefore applied to the washer 450 and is transferred to the olive 440.

The force applied by the bolts acts on the olive 440 in the direction of the connector 410. Specifically, an angled surface 447 of the olive 440 engages the angled surface 414 of the connector 410. The angled surfaces interface and the olive 440 conforms to the greater angle of the surface 414 of the connector 410. This creates a strong mechanical seal between the connector 410 and the olive 440.

Therefore, in use, fluid can pass from the pipe 402 to the connector 410 under high pressure with a very low risk of leakage due to the strong mechanical seal created by the coupling assembly 400.

A further embodiment of the invention is shown in FIGS. 24 to 28. Features corresponding to those of the two previous embodiments have been given corresponding reference numbers with the additional prefix "5". Only features that differ from those of the previous embodiments are discussed in detail.

Figure 24:
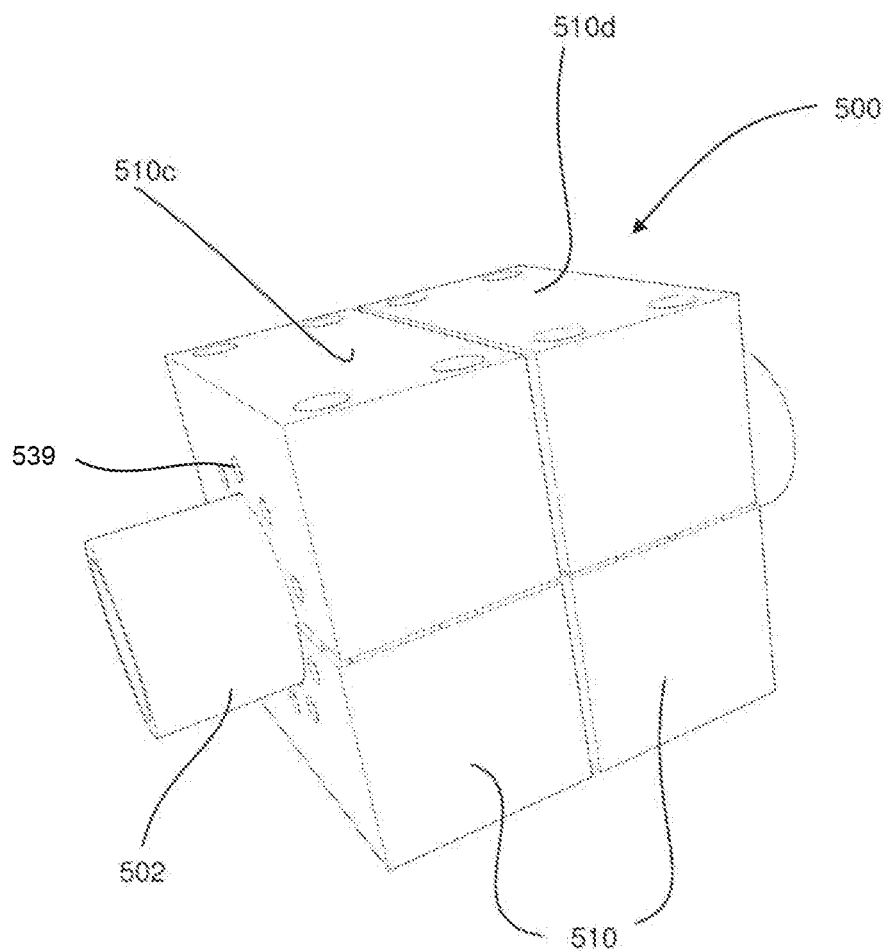
FIG. 24 is a perspective view of a pipe assembly according to an aspect of the invention.

With reference to FIG. 24, a coupling arrangement is indicated generally at 500. The coupling arrangement 500 utilises a similar mechanical seal arrangement 506 to that described in the previous embodiments. The assembly 500 is discussed by way of example as connecting two pipes 502 in fluid communication. However, the assembly 500 can also be used in connecting a pipe to a connector in fluid communication.

With reference to FIG. 25, the connector body 510 of this embodiment comprises a mechanical engagement arrangement 570 configured to parent or limit axial movement of the pipe 502 in relation to the connector body 510. The engagement arrangement 570 of this embodiment comprises two barbs saw teeth 511. The barbs 511 are circumferential and project from an internal wall of the connector body 510. The barbs 511 of this embodiment comprise a tapered ridge, with the taper increasing in height towards the connector body end proximal the free end of the pipe 502, for ease of assembly. The barbs 511 are hardened by some suitable method to facilitate their engagement with the pipe 502.

In alternative embodiments the barbs 511 may be of some other suitable shape. In alternative embodiments, some other suitable number of barbs may be provided, e.g. 1 barb or 3 or more barbs.

The barbs 511 are pressed into the pipe 502 by the force of bolts that are used to connect the two parts of the connector body 510, and thus prevent or limit axial movement of the connector body 510 relative to the pipe 502.

The barbs 511 provide an interference fit with the pipe 502, and remove the need for machining or welding of the pipe 502. Fitting of the connector assembly 500 is thus simplified.

Figure 26A:
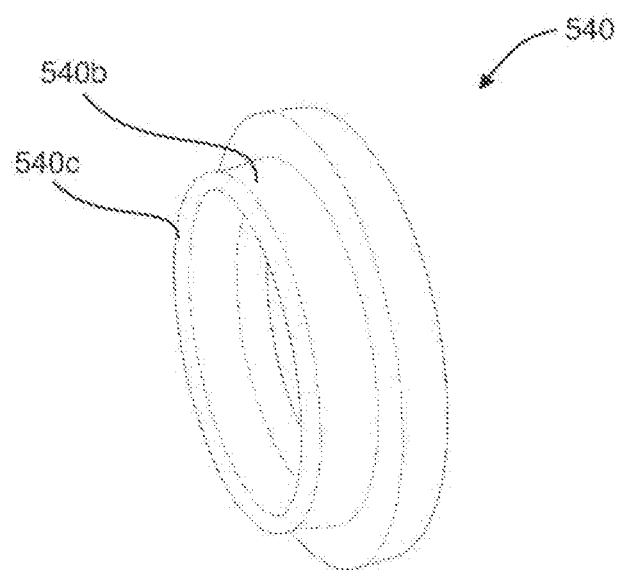
FIG. 26A is a perspective view of a seal element or olive, a component of the pipe assembly of FIG. 24.
Figure 26B:
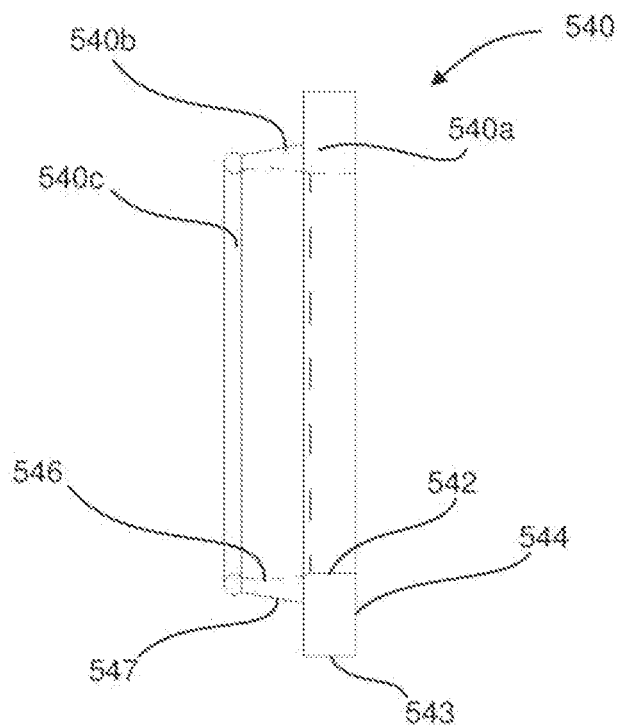
FIG. 26B is a side view of the seal element or olive of FIG. 26A.

As shown in FIGS. 25, 26a and 26b, the olive of the previous embodiments is replaced in this embodiment with an annular seal element 540. The seal element 540 comprises three annular portions 540a, 540b and 540c. In this embodiment the three annular portions 540a, 540b, 540c are integral to one another.

The base annular portion 540a is generally rectangular in cross section, i.e. an internal surface 542 and an external surface 543 of the annular portion 540a are parallel. The annular portion 540a has a front surface 544 that connects the internal surface 542 and the external surface 543. The front surface 544 provides a loading surface configured to, in use, receive the axial force provided by bolts (not shown).

Projecting in a generally perpendicular direction, i.e. coaxial to the longitudinal axis of the pipe, from the front surface 544 is the intermediate annular portion 540b. The intermediate portion 540b is generally tapered, decreasing in width away from the front surface 544. The intermediate portion 540b has a smaller external diameter than the base portion 540a. The intermediate portion 540b of this embodiment has a concave internal surface 546. Force is transmitted from the loading surface 544 via the intermediate portion 540a to the contact portion 540c.

The annular portion 540b also has an external surface 547. The external surface 547 is angled, at approximately 10° to the longitudinal axis, to create the taper of the annular portion 540b. The external surface 547 is generally flat in profile.

The seal element 540 has an annular contact portion 540c at the free end of the intermediate portion 540b. The contact portion 540c is configured to provide a seal between the pipe 502 and the sleeve 530. The contact portion 540c projects radially beyond the intermediate portion 540b. In this embodiment, the contact portion 540c projects beyond the intermediate portion 540b in both radial directions. In other embodiments (not shown), the contact portion 540c may project beyond the intermediate portion 540b in only one direction, i.e. radially inwardly or outwardly, or may project by different amounts in one or other direction.

In use, due to the projection of the contact portion 540c, it is the contact portion 540c that conforms to and seals against the sleeve 530 and the pipe 502 when an axial force is applied to the seal element 540 by bolts (not shown). The contact portion 540c contacts the pipe 502 and the sleeve 530 in a predetermined annular deformation region of relatively thin circumferential lines. The radial force created through the axial force pushing the seal element 540 is applied on these two narrow rings, creating maximum pressure at the point of sealing.

In this embodiment, the contact portion 540c is substantially circular in cross-section, so that suitable sealing is created. In alternative embodiments, some other suitable profile may be used, e.g. diamond shaped in profile with the vertices of a diamond shape projecting radially outwardly.

The concave profile of the intermediate portion 540b allows that portion 540b to act with a predetermined degree of resilience and can therefore flex to ensure that the contact portion 540c creates the desired annular seal with the pipe 502 and the sleeve 530 even if they are out of round to some extent.

The seal element 540 of this embodiment can be used in place of the olive of any of the previous embodiments.

The seal element 540 of this embodiment is metallic. In alternative embodiments, some other suitable material may be used.

In other embodiments, the base and intermediate portions of the seal element may not be visually distinct from one another as in this embodiment.

As can be seen in FIG. 25, no resilient washer is provided in this embodiment between the seal element 540 and bolts that apply pressure to the seal element 540. The resilience of the seal element 540 compensates for the washer. Such an arrangement may be used in the previous embodiments, or a resilient washer (not shown) may be used in the present embodiment.

Figure 27:
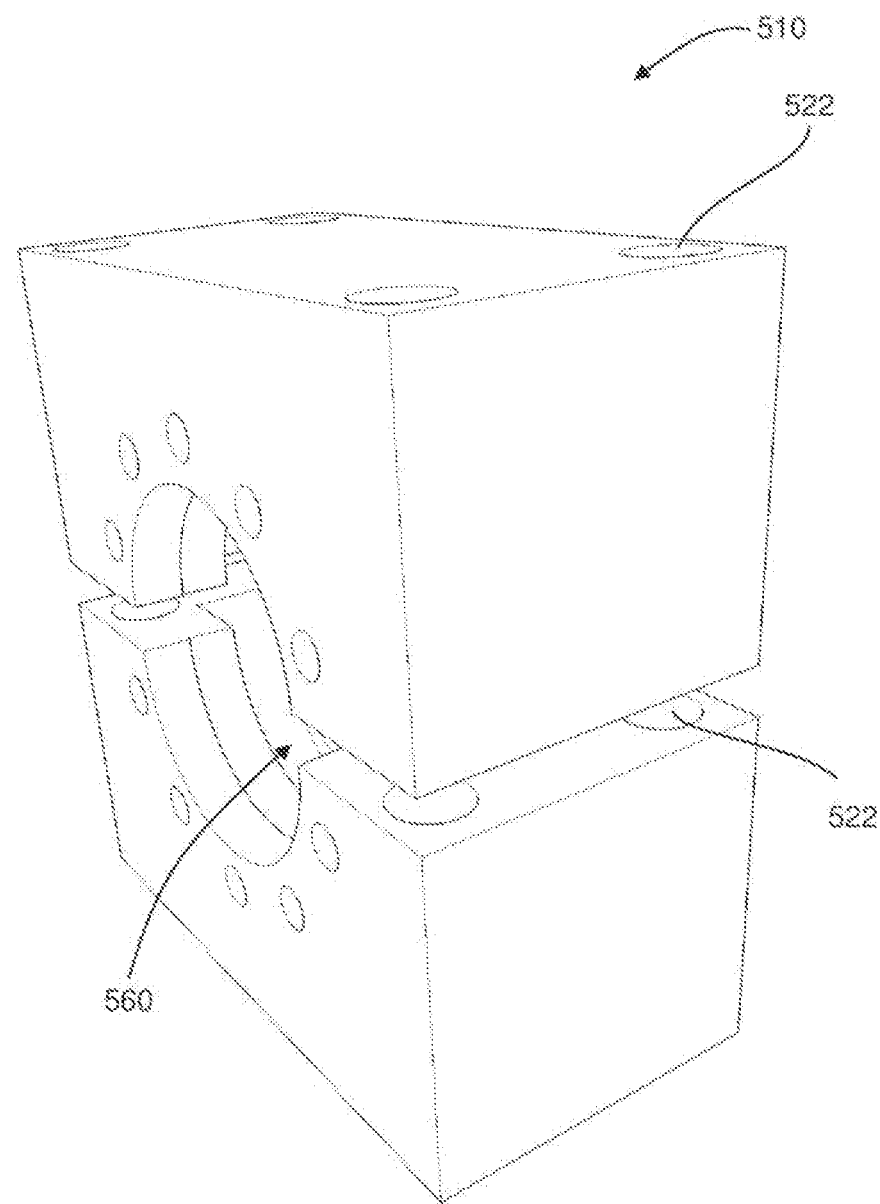
FIG. 27 is a perspective view of a connector body, a component of the pipe assembly of FIG. 24.
Figure 28:
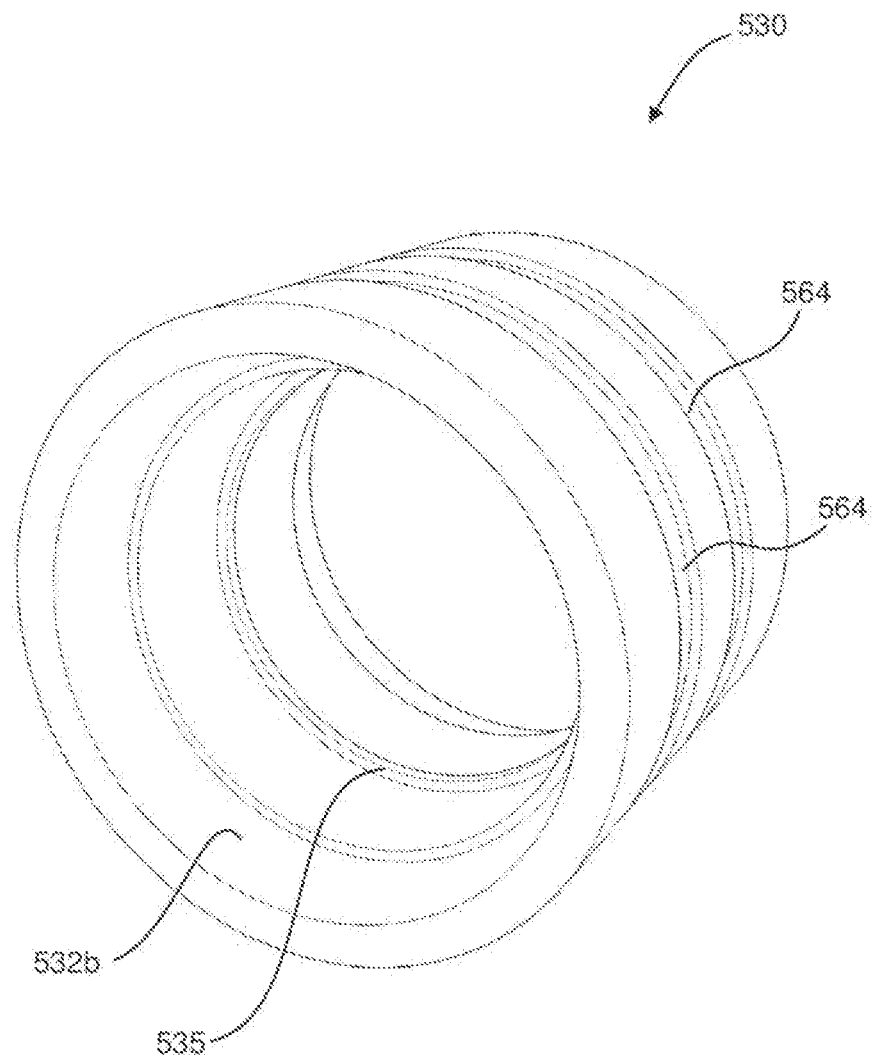
FIG. 28 is a perspective view of a sleeve, a component of the pipe assembly of FIG. 24.

With reference to FIGS. 24 and 27, the connector body 510 comprises housing ends 510c, 510d and the sleeve 530. The housing of the connector body 510 of this embodiment is substantially square in cross section along the longitudinal axis. The connector body 510 defines a central bore 560 configured to receive a pipe 502. As with the previous embodiments, the housing of the connector body 510 is manufactured in two parts, and is split in two along the horizontal plane extending in the direction of the longitudinal axis. In this embodiment, the housing 510 is also split in two along the vertical plane perpendicular to the longitudinal axis to form two parts or ends 510c, 510d. Each of the ends 510c, 510d is split in two along the horizontal plane.

In this embodiment, the housing parts 510c, 510d and the sleeve 530 bridges the free ends of the pipes 502. In alternative embodiments, not shown, the connector body 510 may be used to attach a pipe connection in fluid communication with the pipe 502, by serving to connect that connection with the sleeve 530 and a mechanical seal arrangement 506.

The square profile of the connector body 510 provides increased strength. In this embodiment, in each end 510c, 510d, 14 mm bolts (not shown) are used to connect the two halves 510a, 510b together, providing suitable strength to resist the bending forces created. In other embodiments other suitable fasteners may be used.

As shown in FIG. 25, the central bore 560 of the connector body 510 defines a circumferential projection 562 configured to locate the sleeve 530 in relation to the connector body 510. To this end, the sleeve 530, as shown in FIG. 16, defines two circumferential grooves 564 corresponding to the projection 562. Each groove 564 is configured to receive the projection 562 of one connector body 510.

In this embodiment, the sleeve 530 defines a circumferential projection 535 extending inwardly from the internal surface of the sleeve. The projection 535, is substantially rectangular in profile. The projection 535 is centrally located along the longitudinal axis of the sleeve 530. The projection 535 is configured to extend into the chamfers at the free ends of the pipes 502.

Providing a part connector body 510c, 510d for each free end of a pipe or connector allows each connector body 510c, 510d to be lighter, and as such easier to fit. In addition, the connector body 510c, 510d can advantageously be used for multiple purposes, i.e. for a pipe free end or some other connector as described above. For example, the connector body could be used in connecting such items as valves, T-pieces or pipe bends without the need for welding.

The sleeve 530 of this or previous embodiments can be manufactured in various lengths for different applications, to bridge gaps of different sizes, and to act as a means of pipe repair.

The embodiments described above are suitable for use with fluids (i.e. liquids or gases) such as crude oil, natural gas, hydrocarbons, water or chemical injection, or other suitable fluids. By way of example, the embodiments described above are suitable for use at temperatures from 270K to 394K, or other suitable temperatures.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A connector comprising:
   a connector body having an open end configured for receiving a free end of a pipe; and
   a metal-to-metal seal arrangement for location within the connector body;
   wherein the metal-to-metal seal arrangement comprises:
      a first metallic element configured to fit around an annular surface of a pipe at a free end of said pipe; and
      an annular metallic seal surface provided inside the connector body;
      wherein the metal-to-metal seal arrangement is provided for creating a first annular metal-to-metal seal between the first metallic element and said annular surface of the pipe, and for creating a second annular metal-to-metal seal between the first metallic element and the annular metallic seal surface, under energisation of the first metallic element; and
   wherein the connector body comprises a coupling arrangement configured for coupling the connector body to the pipe, in order to prevent or limit axial movement of the connector body relative to the pipe when the first metallic element is under metal-to-metal seal conditions with said annular surface of the pipe and the annular metallic seal surface.

2. The connector of claim 1, wherein the coupling arrangement comprises a projection on an internal surface of the connector body for engaging an external surface of the pipe received in the open end of the connector body.

3. The connector of claim 2, wherein the projection extends circumferentially around the internal surface of the connector body.

4. The connector of claim 2, wherein the projection is generally rectangular in cross-section and is configured for engaging a corresponding groove on an external surface of the pipe received in the open end of the connector body to prevent or limit axial movement of the connector body relative to the pipe, in use.

5. The connector of claim 2, wherein the projection is a barb.

6. The connector of claim 2, wherein the connector body is provided as separate first and second parts, such that they can be brought together around the pipe, in use.

7. The connector of claim 6, wherein the connector body is split along a horizontal plane to define the first and second parts.

8. The connector of claim 7, wherein the first and second parts of the connector body comprise bores extending in a direction perpendicular to the horizontal plane, configured to accept connecting components, in order to couple the first and second parts of the connector body to one another.

9. The connector of claim 8, wherein each bore comprises an annular surface with a plane parallel to the horizontal plane, configured to be engaged by a connecting component in use.

10. The connector of claim 1, wherein the coupling arrangement comprises at least one circumferential groove on an internal surface of the connector body, intended for alignment with a corresponding groove on an external surface of the pipe to be inserted into the connector body, in order to define a bore or channel between the connector body and the pipe, for receiving a locking element in order to resist against separation of the pipe from the connector body.

11. The connector of claim 10, wherein the locking element comprises a length of wire, to resist against separation of the pipe from the connector body.

12. The connector of claim 1, wherein the connector body is provided as separate ends or parts, such that a first part is on or around the free end of the pipe and a second part is on or around a second pipe free end.

13. The connector of claim 12, wherein the connector body is split along a vertical plane.

14. The connector of claim 1, wherein the metal-to-metal seal arrangement further includes a second metallic element, configured to be located between the first metallic element and an internal surface of the connector body, wherein the annular metallic seal surface is part of the second metallic element such that the first annular metal-to-metal seal is created between the first and second metallic elements.

15. The connector of claim 14, wherein the second metallic element is a sleeve, configured to encircle the free end of the pipe, in use.

16. The connector of claim 15, wherein the connector body and the sleeve are configured such that the connector body is coupled to the sleeve for preventing relative axial movement between the connector body and the sleeve, in use.

17. The connector of claim 16, wherein the connector body comprises a projection and the sleeve comprises a corresponding groove, and wherein, in use, said projection is received in said corresponding groove such that the connector body is coupled to the sleeve.

18. The connector of claim 1, wherein the first metallic element is one or other of an olive including a tapered portion comprising an angled surface, the tapered portion configured to provide the first annular metal-to-metal seal with the annular surface of the pipe, and the second annular metal-to-metal seal with the annular metallic seal surface via the angled surface, or an annular seal element comprising a loading surface, an intermediate portion and a contact portion, the loading surface being configured to receive an axial force and transmit the axial force via the intermediate portion to the contact portion, and the contact portion being configured to provide the first annular metal-to-metal seal with the annular surface of the pipe, and the second annular metal-to-metal seal with the annular metallic seal surface.

19. The connector of claim 1, further comprising a mechanism for applying a force to the first metallic element to energise the first metallic element, in order to assure the first annular metal-to-metal seal and the second annular metal-to-metal seal.

20. A method of connecting a pipe to a connector, the method comprising:
    providing a pipe having a free end;
    locating a first metallic element around an annular surface of the pipe at the free end of the pipe;
    providing a connector body having an open end configured for receiving the free end of the pipe, the connector body comprising a coupling arrangement configured for coupling the connector body to the pipe, in order to prevent or limit axial movement of the connector body relative to the pipe;
    providing an annular metallic seal surface inside the connector body;
    locating the free end of the pipe and the first metallic element within the connector body;
    coupling the connector body to the pipe via the coupling arrangement to prevent or limit axial movement of the connector body relative to the pipe; and
    creating a first annular metal-to-metal seal between the first metallic element and the annular surface of the pipe, and creating a second annular metal-to-metal seal between the first metallic element and the annular metallic seal surface, under energisation of the first metallic element.

* * * * *